US012709397B2

(12) United States Patent
Harcup et al.

(10) Patent No.: US 12,709,397 B2

(45) Date of Patent: Aug. 18, 2026

(54) PASSENGER AIR SHIELD

(71) Applicant: Pexco Aerospace, Inc., Union Gap, WA (US)

(72) Inventors: Anthony Harcup, Edmonds, WA (US); Jesse Peck, Seattle, WA (US); James Mehlos, Everett, WA (US); Aldo Barletta, Marysville, WA (US); Chevy Ho, Seattle, WA (US); Edson Alexandrino, Mukilteo, WA (US); Elle Stapleton, Seattle, WA (US); Zach Snyder, Seattle, WA (US); Mark Hacker, Buckinghamshire (GB)

(73) Assignee: Pexco Aerospace, Inc., Union Gap, WA (US)

( * ) Notice: Subject to any disclaimer, the term of this patent is extended or adjusted under 35 U.S.C. 154(b) by 822 days.

(21) Appl. No.: 17/344,808

(22) Filed: Jun. 10, 2021

(65) Prior Publication Data

US 2021/0387737 A1 Dec. 16, 2021

Related U.S. Application Data

(60) Provisional application No. 63/078,161, filed on Sep. 14, 2020, provisional application No. 63/037,310, filed on Jun. 10, 2020.

(51) Int. Cl.

| | |
|---|---|
| ***B64D 13/08*** | (2006.01) |
| ***B64D 13/00*** | (2006.01) |
| ***F24F 13/02*** | (2006.01) |

(52) U.S. Cl.

CPC .......... *B64D 13/08* (2013.01); *F24F 13/0272* (2013.01); *B64D 2013/003* (2013.01)

(58) Field of Classification Search

CPC .. B64D 13/08; B64D 2013/003; B64D 13/00; B64D 2013/0655; B64D 2013/0692;

(Continued)

(56) References Cited

U.S. PATENT DOCUMENTS 2,056,757 A 10/1936 Adamcikas
2,714,808 A * 8/1955 Owen .................. B60H 1/3204 454/141

(Continued)

FOREIGN PATENT DOCUMENTS

AU 602964 B2 11/1990
CN 111267576 A * 6/2020 ............... B60H 1/00

(Continued)

OTHER PUBLICATIONS

Air Curtain System and Method for Interior Compartment of Vehicle CN-113879541-A Thomson et al (Year: 2022).*

(Continued)

*Primary Examiner* — Michael G Hoang
*Assistant Examiner* — Frances F. Hamilton
(74) *Attorney, Agent, or Firm* — Tucker Ellis LLP

(57) ABSTRACT

A method and apparatus for interfacing with an airplane interior air system to form an air curtain. An air directing device can include a housing with one or more inlets and one or more outlets. An engagement component can engage the air directing device with a PSU of an aircraft. The air directing device can receive air from the PSU and the air system through the inlet, and direct the air to the outlets. The outlets can include nozzles that output the air curtain.

14 Claims, 35 Drawing Sheets

(58) Field of Classification Search
CPC .. F24F 13/0272; F24F 2009/002; B60H 1/34; B60H 1/247
USPC .................................................... 454/189, 76
See application file for complete search history.

(56) References Cited

U.S. PATENT DOCUMENTS

| | | | | | |
|---|---|---|---|---|---|
| 2,755,729 | A | 7/1956 | Galbraith et al. | | |
| 3,330,506 | A * | 7/1967 | Robillard | B64D 11/00 | 244/118.5 |
| 3,913,470 | A * | 10/1975 | Cullen | F24F 13/02 | 454/64 |
| 4,117,773 | A * | 10/1978 | Johnson | B66C 13/54 | 454/64 |
| 4,233,889 | A * | 11/1980 | Nederman | F16L 41/18 | 454/64 |
| 4,646,993 | A * | 3/1987 | Baetke | B64C 1/18 | 454/76 |
| 4,742,760 | A * | 5/1988 | Horstman | B64D 13/00 | 454/76 |
| 4,819,548 | A * | 4/1989 | Horstman | B64D 13/00 | 454/76 |
| 4,881,456 | A * | 11/1989 | Yasuda | B60H 1/00742 | 165/41 |
| 5,556,332 | A * | 9/1996 | Schumacher | F16L 41/18 | 454/64 |
| 5,567,230 | A * | 10/1996 | Sinclair | B64D 13/00 | 55/504 |
| 5,570,717 | A * | 11/1996 | Stoll | F16L 41/00 | 137/580 |
| 5,695,396 | A * | 12/1997 | Markwart | B64D 13/00 | 454/71 |
| 5,765,635 | A * | 6/1998 | Rhee | B60H 1/00742 | 454/189 |
| 5,816,534 | A * | 10/1998 | Schumacher | B64D 11/0023 | 244/119 |
| 6,189,831 | B1 * | 2/2001 | Asai | B64D 11/0023 | 454/76 |
| 6,565,035 | B1 | 5/2003 | Kim et al. | | |
| 7,118,474 | B2 * | 10/2006 | Bjordal | F24F 3/167 | 454/238 |
| 7,122,066 | B2 * | 10/2006 | Avery | B01D 46/10 | 55/504 |
| 8,206,475 | B2 * | 6/2012 | Walkinshaw | F24F 5/0085 | 55/385.2 |
| 9,227,730 | B2 * | 1/2016 | Markwart | B64D 13/06 | |
| 9,329,156 | B2 * | 5/2016 | Nacson | G01N 1/2214 | |
| 9,499,271 | B2 * | 11/2016 | Walton | B64D 11/0023 | |
| 9,505,498 | B2 * | 11/2016 | Hlavka | B64D 13/00 | |
| 9,581,163 | B2 * | 2/2017 | Rivera | B64D 13/06 | |
| 9,889,939 | B2 * | 2/2018 | Zhang | B64D 13/08 | |
| 11,325,712 | B2 * | 5/2022 | Vandyke | F24F 9/00 | |
| 11,548,647 | B2 * | 1/2023 | Hirotsu | F24F 13/02 | |
| 11,730,847 | B2 * | 8/2023 | Blum | B01D 46/0043 | 422/119 |
| 11,859,864 | B1 * | 1/2024 | Nygaard | F24F 7/10 | |
| 2004/0003580 | A1 * | 1/2004 | Avery | B01D 46/10 | 55/385.1 |
| 2004/0211161 | A1 * | 10/2004 | Avery | B01D 46/10 | 55/385.1 |
| 2005/0282485 | A1 * | 12/2005 | Kato | B60H 1/243 | 454/136 |
| 2006/0116064 | A1 * | 6/2006 | Umebayashi | B60H 1/3407 | 454/143 |
| 2009/0163131 | A1 * | 6/2009 | Walkinshaw | B60H 3/0641 | 55/385.3 |
| 2009/0311951 | A1 * | 12/2009 | Walkinshaw | F24F 13/26 | 96/60 |
| 2010/0043794 | A1 * | 2/2010 | Saito | B64D 11/0632 | 128/204.22 |
| 2010/0081369 | A1 * | 4/2010 | Space | B60N 2/565 | 55/290 |
| 2012/0124808 | A1 * | 5/2012 | Landes | B64D 11/003 | 29/428 |
| 2012/0129438 | A1 * | 5/2012 | Grosse-Plankermann | B64D 13/00 | 454/76 |
| 2012/0199003 | A1 * | 8/2012 | Melikov | G16H 50/80 | 454/192 |
| 2012/0312921 | A1 * | 12/2012 | Grosse-Plankermann | B64D 11/00 | 244/118.5 |
| 2013/0149950 | A1 * | 6/2013 | Umlauft | B64D 13/00 | 454/76 |
| 2013/0327891 | A1 * | 12/2013 | Zhang | B64D 13/08 | 244/118.5 |
| 2014/0179212 | A1 * | 6/2014 | Space | B60N 2/5635 | 454/76 |
| 2015/0063995 | A1 * | 3/2015 | Rivera | B64D 13/06 | 415/207 |
| 2015/0232182 | A1 * | 8/2015 | Schneider | B64D 13/06 | 244/118.6 |
| 2016/0318614 | A1 * | 11/2016 | Bultemeier | F24F 13/06 | |
| 2016/0325839 | A1 * | 11/2016 | Wang | B60H 1/3414 | |
| 2017/0089471 | A1 | 3/2017 | Lucas | | |
| 2019/0077215 | A1 * | 3/2019 | Baek | B60H 1/246 | |
| 2020/0148367 | A1 * | 5/2020 | Vandyke | B64D 13/06 | |
| 2020/0254847 | A1 * | 8/2020 | Nakamura | B60H 1/00864 | |
| 2021/0070133 | A1 * | 3/2021 | Laux | B60H 1/00564 | |
| 2021/0348783 | A1 * | 11/2021 | Adkins | A61L 2/10 | |
| 2022/0001993 | A1 * | 1/2022 | Thomson | B64D 11/06 | |
| 2022/0041288 | A1 * | 2/2022 | Palanisamy | B64D 13/06 | |
| 2022/0054699 | A1 * | 2/2022 | Nakama | A61L 9/205 | |
| 2022/0057094 | A1 * | 2/2022 | Chinnappa Reddy | B60H 1/00371 | |
| 2022/0063814 | A1 * | 3/2022 | Vandyke | B60J 9/04 | |
| 2022/0063815 | A1 * | 3/2022 | Mitchell | B64D 13/00 | |
| 2022/0185059 | A1 * | 6/2022 | Terai | B60H 1/00028 | |
| 2022/0250443 | A1 * | 8/2022 | Tomizawa | B60H 1/00742 | |
| 2023/0339296 | A1 * | 10/2023 | Bobryshev | B60H 3/0608 | |

FOREIGN PATENT DOCUMENTS

| | | | | |
|---|---|---|---|---|
| DE | 3302424 | A1 * | 3/1985 | |
| DE | 102008044874 | A1 | 3/2010 | |
| DE | 102010012882 | B3 * | 7/2011 | B60H 1/00564 |
| DE | 102017003550 | A1 * | 10/2018 | B60H 1/00285 |
| EP | 688689 | A1 * | 12/1995 | B60H 1/00742 |
| EP | 2851298 | A1 | 3/2015 | |
| EP | 3932809 | A1 * | 1/2022 | B60Q 3/44 |
| EP | 3943394 | A1 * | 1/2022 | B64D 11/003 |
| JP | 611528 | | 1/1986 | |
| JP | 0840046 | | 2/1996 | |
| JP | 0921553 | | 1/1997 | |
| JP | 1159597 | | 3/1999 | |
| JP | 2001299891 | | 10/2001 | |
| JP | 2004268773 | | 9/2004 | |
| JP | 2011030719 | | 2/2011 | |
| JP | 2011030719 | A * | 2/2011 | |
| KR | 101438093 | | 9/2014 | |
| WO | WO-8909143 | A * | 10/1989 | B60H 1/00371 |
| WO | 2020016587 | | 1/2020 | |
| WO | WO-2020108856 | A1 * | 6/2020 | B60H 1/00357 |
| WO | WO-2020108860 | A1 * | 6/2020 | B60H 1/00357 |

OTHER PUBLICATIONS

U.S. Appl. No. 63/037,310, U.S. Provisional Patent Application, filed Jun. 10, 2020, Titled: Passenger Air Shield.
U.S. Appl. No. 63/078,161, U.S. Provisional Patent Application, filed Sep. 14, 2020, Titled: Passenger Air Shield.
Avakian, "Why You Should Think Twice Before Turning Off the Air Vent Above You on Your Next Flight", Aug. 27, 2017. 3 pages.

* cited by examiner

PASSENGER AIR SHIELD

CROSS-REFERENCES TO RELATED APPLICATIONS

This application claims the benefit of U.S. Provisional Application No. 63/037,310, filed Jun. 10, 2020, and U.S. Provisional Patent Application No. 63/078,161, filed Sep. 14, 2020, the entire contents of both of which are hereby incorporated by reference in their entireties for all purposes.

FIELD

Embodiments described herein relate generally to a fluid directing device and, more particularly, to devices that generate air curtains on an aircraft.

BACKGROUND

Passengers traveling in close contact, for example, in an aircraft, can spread pathogens by coughing, sneezing, breathing, and/or talking. The spread of pathogens, for example bacteria and viruses, can cause the spread of infectious diseases, for example the coronavirus disease (COVID-19). Physical barriers can be placed between passengers to reduce the spread of pathogens, however, these barriers can cause discomfort to passengers, impede walkways, and become contaminated, which can infect other travelers who come in contact with the barriers. It can be desirable to have a directed air that reduces the spread of pathogens without having to place a physical object between passengers.

BRIEF DESCRIPTION OF THE DRAWINGS

Various embodiments in accordance with the present disclosure will be described with reference to the drawings, in which.

DETAILED DESCRIPTION

Figure 1:
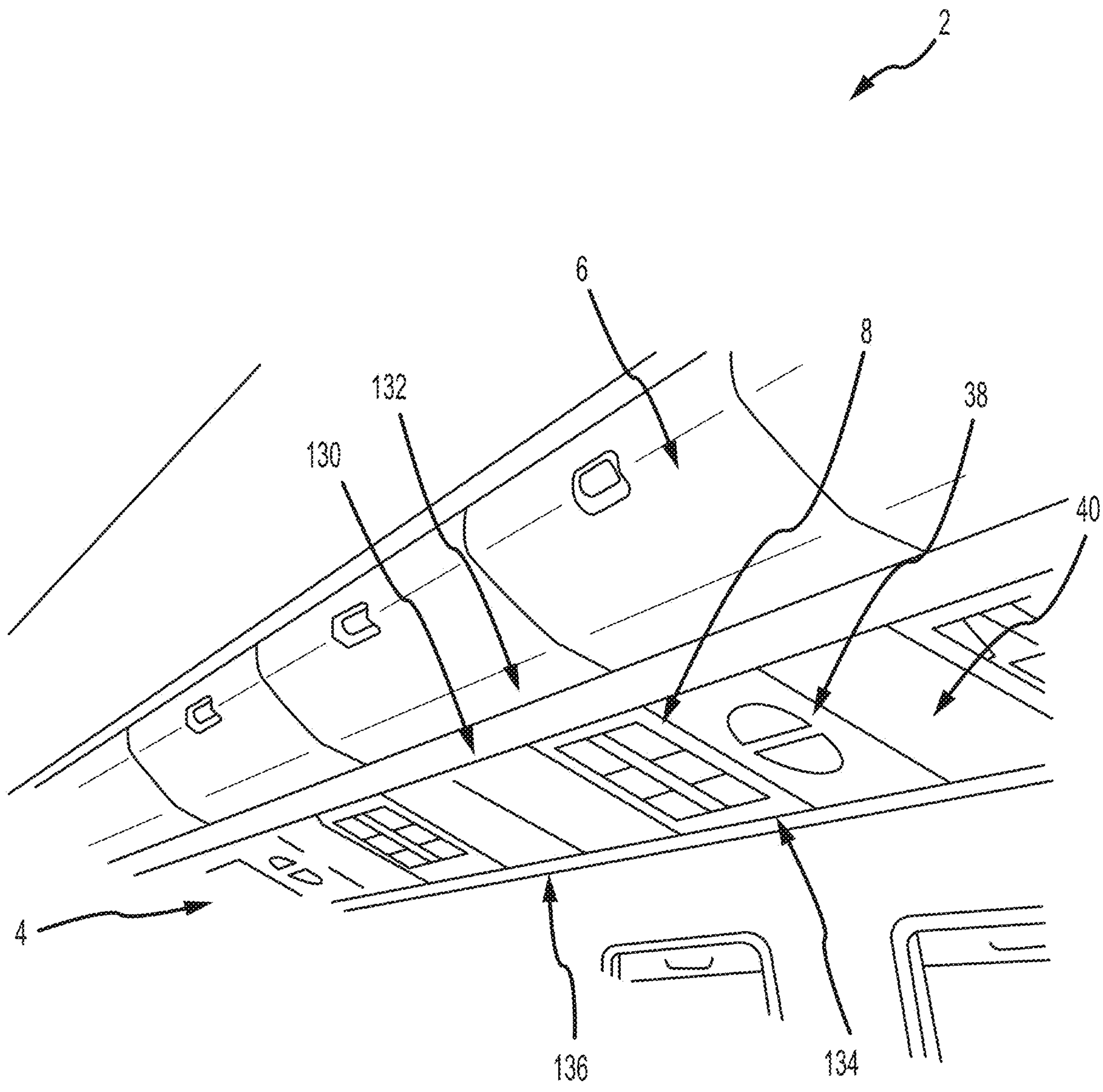
FIG. 1 is a perspective view of a portion of a passenger aircraft, showing overhead panels and storage compartments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

During air travel, passengers can be positioned in close proximity to one another which may lead to the spread of pathogens. For example, aircraft seats can be positioned in rows with some room between passengers seated in a row. Due to the limited space, placing physical barriers (e.g., plastic, Plexiglas, and/or barriers made of similar material) between seats to limit the spread of pathogens can cause discomfort to the passengers. Additionally, physical barriers can become contaminated which can cause passengers to become infected.

A non-physical barrier can provide the benefits of a physical barrier without causing discomfort and/or becoming contaminated. An air curtain is an example of non-physical barrier that can be positioned between passengers on an aircraft to prevent the spread of pathogens. For example, an air curtain can be positioned between passengers seated in the same row, passengers seated in different rows, passengers seated across aisles, and/or passengers seated in different sections of an aircraft.

Air curtains have been proposed as an alternative to physical barriers, often to separate smokers from non-smokers, define different temperature zones, and sometimes to impede the spread of bacteria or viruses. One such representative proposal is disclosed in JPH1159597, which proposes using the air curtain to separate a group of seats intended for smokers from a group of seats intended for non-smokers, but this proposal suffers from a variety of problems, including difficulty and invasiveness of installation, inability to separate passengers within a given one of the groups, and others. Another representative proposal to separate smokers from non-smokers is disclosed in JPS611528, which proposes using air curtains blowing in an upward direction and exhaust vacuums disposed above the air curtains to discharge the air through the vehicle's trunk, but this proposal also suffers from a variety of problems, including difficulty and invasiveness of installation, large power consumption on a per-passenger basis, potentially increasing the amount of time that droplets remain suspended in the air by blowing them upward, and others. A further representative proposal is disclosed in JP2011030719, which proposes using ozone or charged air curtains to reduce transmission of bacteria or viruses between passengers in a public transportation vehicle, but this proposal also suffers from a variety of problems, including difficult and invasiveness of installation, large power consumption on a per-passenger basis, insufficient protection to passengers, and others.

Examples herein are directed to, among other things, systems and techniques relating to an air directing device that can interface with an aircraft to form an air curtain. The techniques described herein may be implement by any air directing device, but particular examples described herein include an air directing device having a housing with one or more inlets and one or more outlets. An engagement component can be positioned on the exterior of the housing to engage the air directing device with a passenger service unit (PSU) of an aircraft. The air directing device can receive air from the PSU in the inlet and direct the air to the outlet. The outlet can be or include a nozzle that can output an air curtain. The air curtain can extend, for example, between passengers positioned beneath the air directing device.

Turning now to a particular example, in this example, the air directing device can include a housing that defines an interior volume. The housing can include an upper surface defining a first upper aperture, a lower surface defining a first lower aperture, and curved sidewalls extending between the upper and lower surfaces. The first lower aperture can include an interior side with a sloped edge and an exterior flange extending from the lower surface around a periphery of the first lower aperture to form a blade nozzle. The air device can also include an interface coupled with the upper surface and configured to engage the upper surface with a PSU such that the upper aperture can receive a portion of the PSU.

While exemplary embodiments are described with reference to aircraft, and the like, the systems and techniques described herein are also applicable to any other vehicles (e.g., cars, buses, trains, and other similar vehicles).

Figure 2:
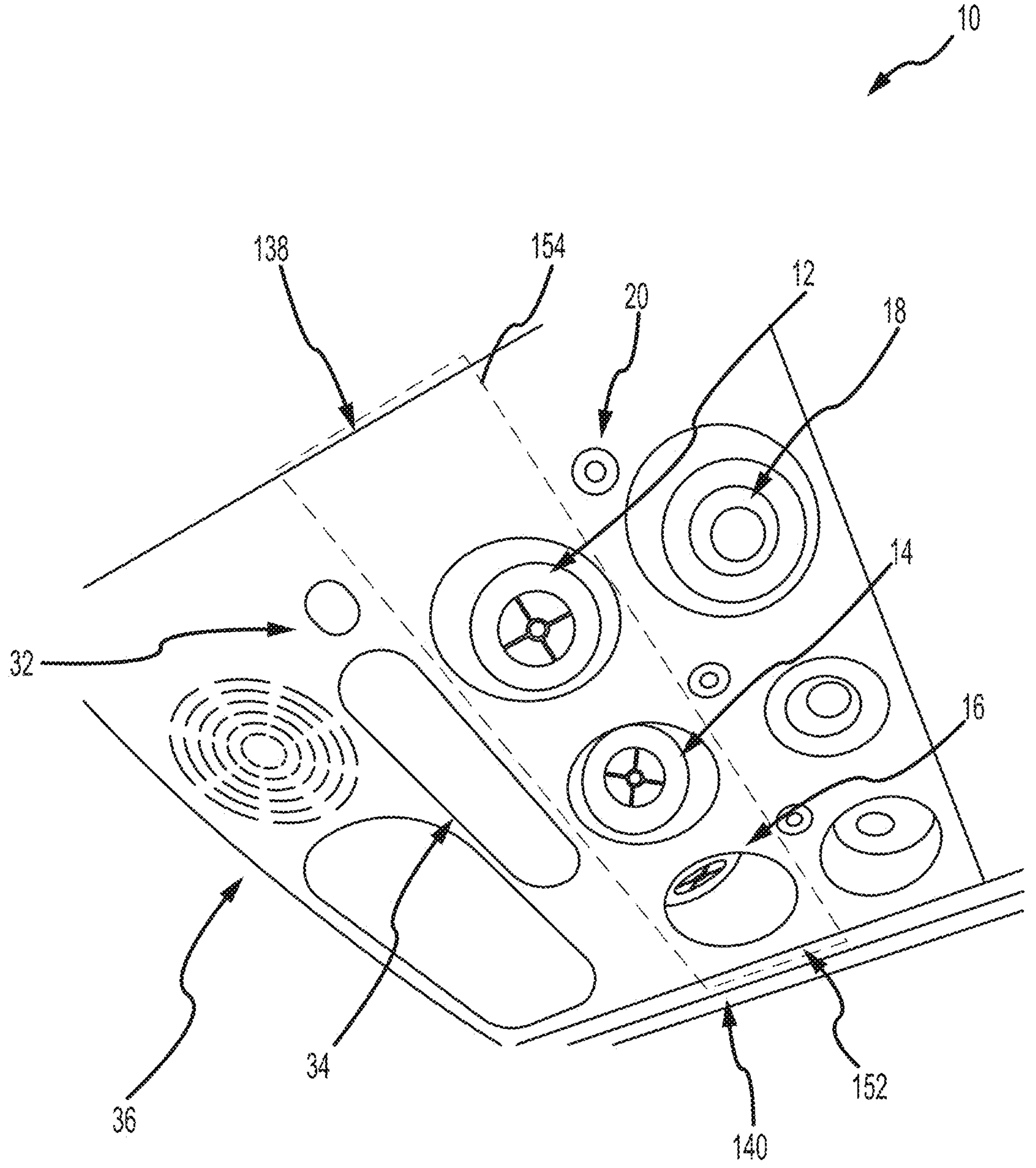
FIG. 2 is a perspective view of another version of overhead panels in a passenger aircraft.

As shown in FIG. 1, passenger compartments of vehicles, such as the passenger compartment 2 of an aircraft, often have an array 4 of panels disposed overhead of passenger seats or standing positions. In aircraft, the panel array 4 is typically disposed below overhead storage compartments, such as a storage compartment 6. In some aircraft, the panel array 4 includes a passenger service unit (PSU), such as a PSU 8, for each passenger seat or set of passenger seats in a row on one side of an aisle or between aisles. As shown in FIG. 2, a PSU 10 typically includes one or more passenger vents that have vent covers or valves, such as gasper vents 12-16, (typically one per passenger seat). The PSU 10 may also include other features, including lights such as a reading light 18, passenger interface controls such as a reading light control 20 or an attendant-call control 32, passenger notification indicators such as a no-smoking indicator 34, speakers such as a speaker 36, or others. As shown in FIG. 1, some airplane configurations implement one or more of such features on other panels, such as speaker panels. Speaker panels and blank panels, such as a speaker panel 38 and a blank panel 40, may be interspersed between the PSUs in the array (see FIG. 1).

Figure 3:
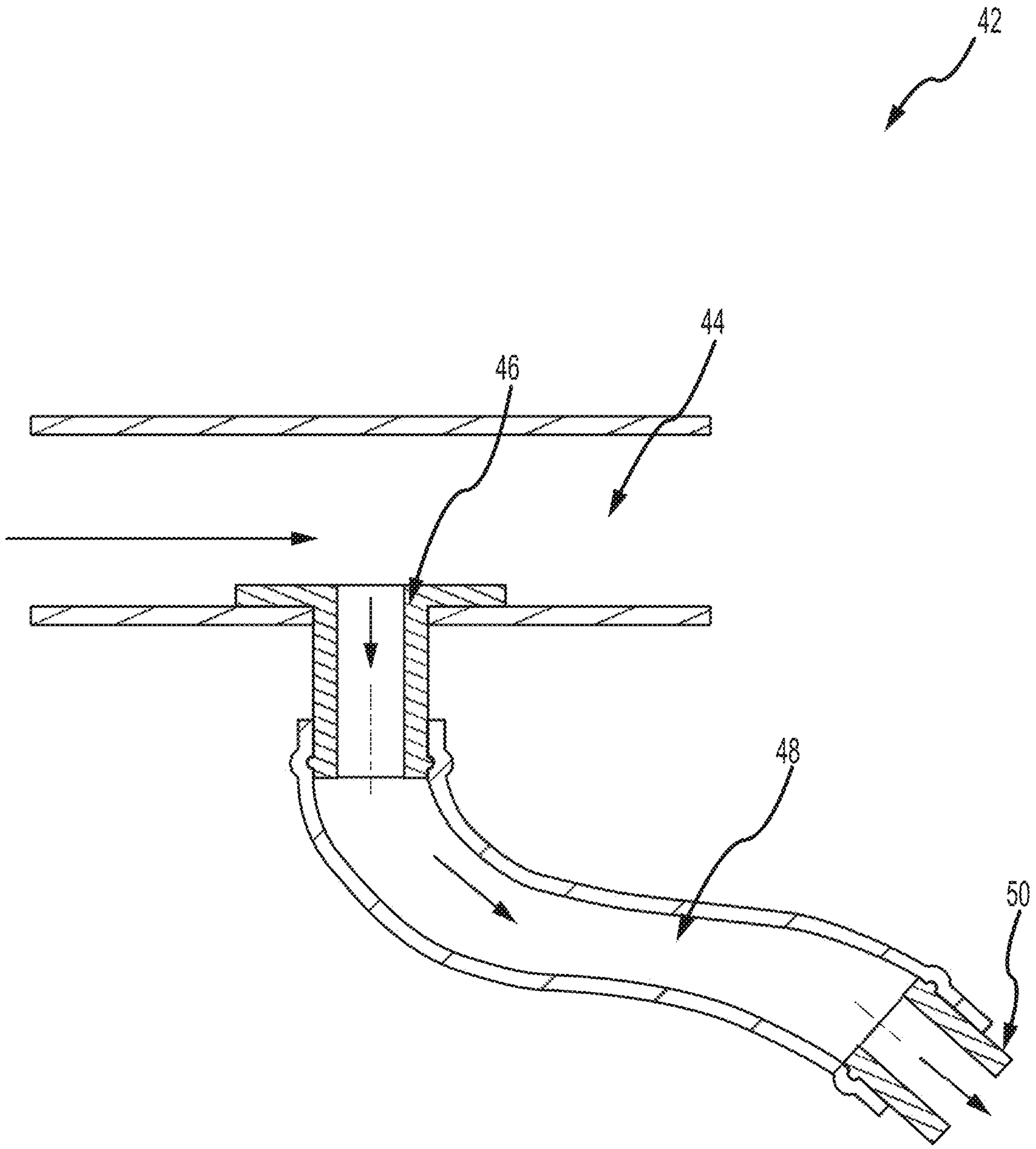
FIG. 3 is a schematic cross-sectional view of a portion of a passenger air-conditioning duct circuit and corresponding air flows.

Passenger vents in vehicles typically exhaust temperature-controlled air flows from one or more portions of environmental control systems of the vehicles, such as air conditioning pack exhaust systems. As shown in FIG. 3, an air conditioning pack exhaust system in an aircraft typically includes a duct system 42 that delivers temperature-controlled air flows to the passenger vents, such as gasper vents 12-16. The duct system 42 typically includes a main duct such as an upper duct 44, duct branches such as a duct branch 46 that fluidly couples the upper duct 44 to a branch duct such as a flexible hose 48, and a vent duct such as a gasper duct 50 disposed opposite the branch duct from the duct branch. The passenger or gasper vents are typically coupled to the gasper ducts to facilitate distributing the air flows in the air conditioning pack exhaust system (represented by arrows in FIG. 3) to the passengers. The distributed air is typically exhausted from the passenger vents in a solid frustum shape, such as a solid conical frustum or solid pyramidal frustum.

Figure 4:
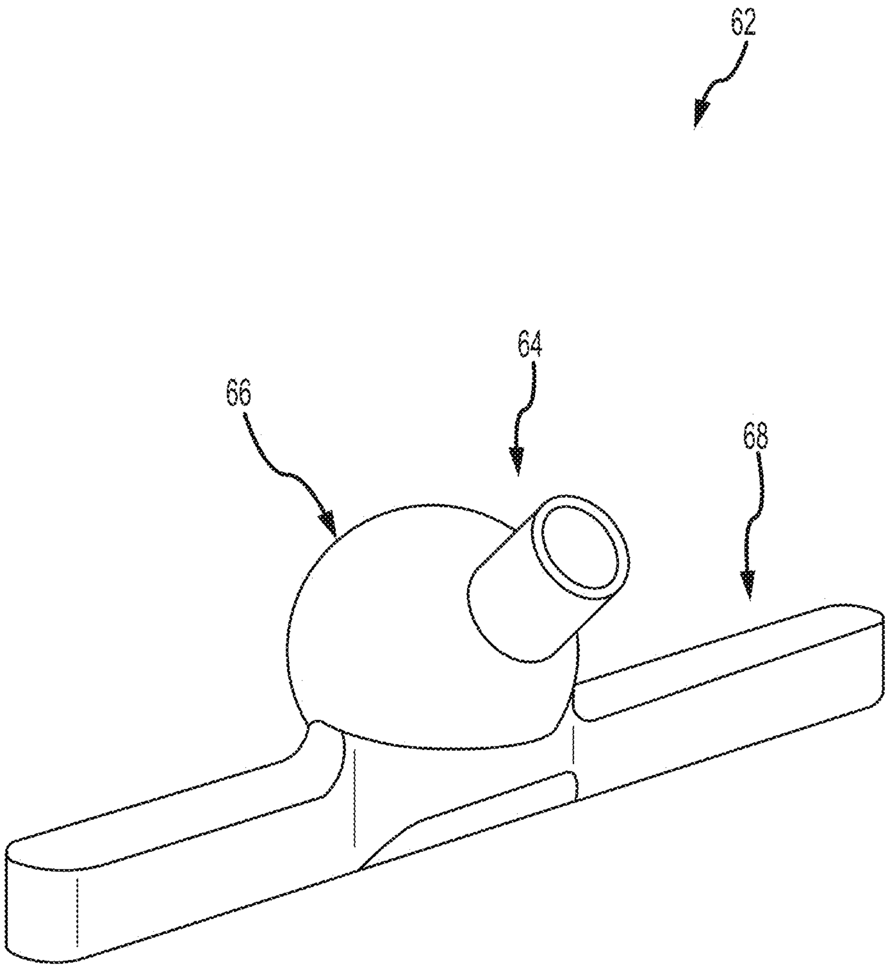
FIG. 4 is an isometric perspective view of an example vent adapter that transforms the air flows of FIG. 3 into an air curtain.
Figure 5:
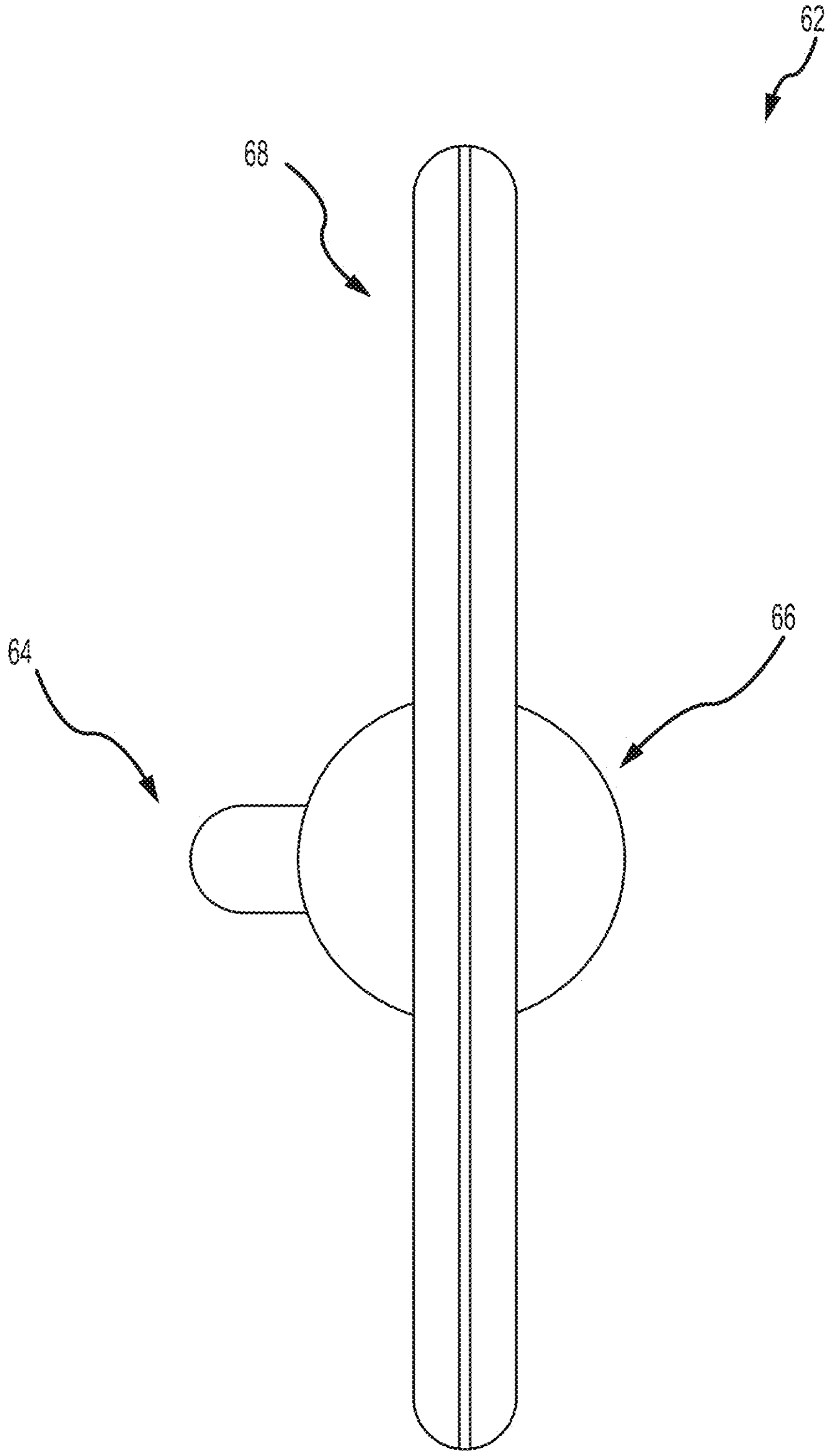
FIG. 5 is an isometric bottom-plan view of the vent adapter of FIG. 4.
Figure 6:
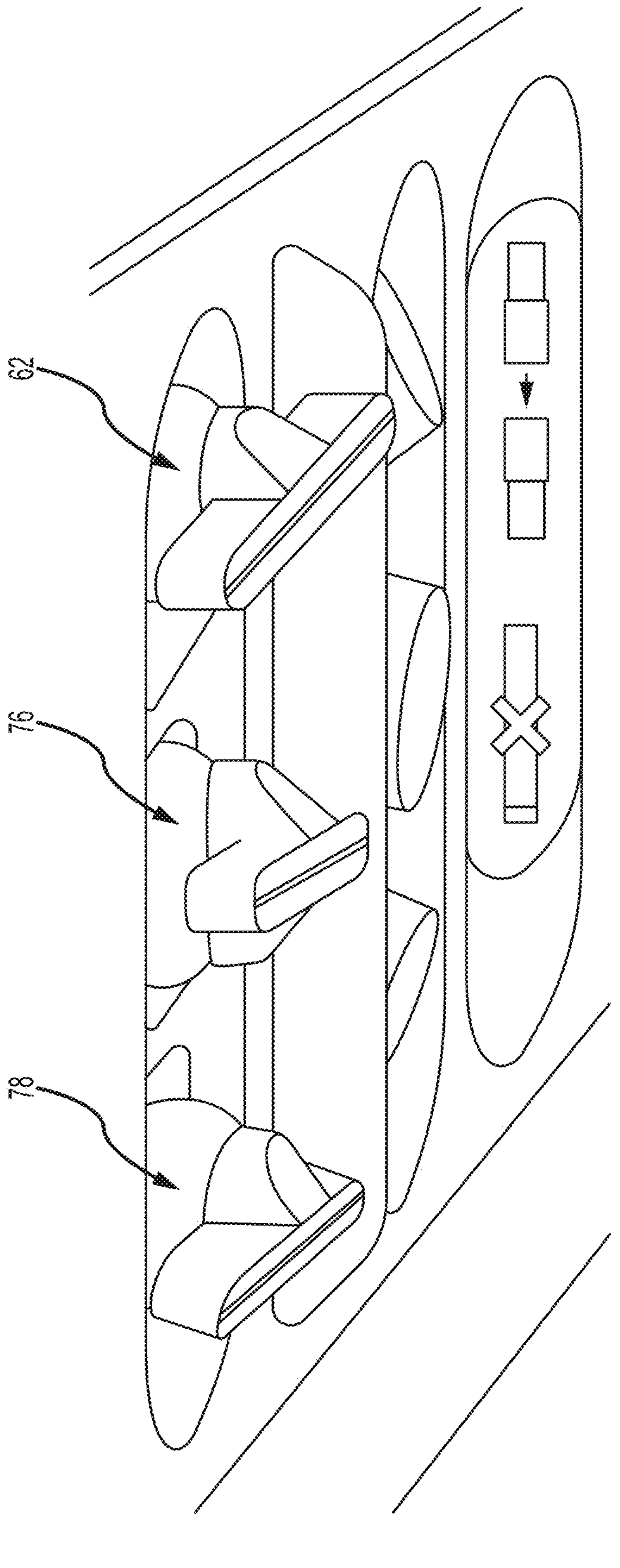
FIG. 6 is a perspective view of the vent adapter of FIG. 4 installed in an overhead panel in a passenger aircraft.

An example vent adapter 62 is shown in FIG. 4. The vent adapter 62 can be configured to replace a vent cover or valve, such as a gasper vent, and transform air flows typically delivered to the vent cover or valve such as the air flow of FIG. 3 into an air curtain. As shown in FIG. 4, the vent adapter 62 preferably includes an air-supply interface such as a gasper-air-supply interface 64, a vent mechanical interface such as a gasper mechanical interface 66, and a blade nozzle 68. As shown in FIG. 5, the outlet of the blade nozzle 68 is schematically represented by a white line and can be configured to transform an air flow received by the vent adapter 62 into an air curtain. The blade nozzle 68 can be designed based on a computational fluid dynamics analysis of the particular model of vehicle in which the vent adapter 62 is intended to be installed. In other versions, the blade nozzle 68 is designed for universal implementation across many or all models of vehicles in which the air-supply interface 64 and the vent interface 66 fit. The air-supply interface 64 is configured to mate with a vent duct such as the gasper duct 50. The mechanical interface 66 is configured to couple to a vent cover, valve, or valve receiver of the vent. Preferably, the mechanical interface 66 is configured to be received by a gasper socket disposed in a PSU. Accordingly, as shown in FIG. 6, a gasper vent may be removed from a previously installed PSU in an aircraft, and the gasper-vent adapter 62 may be installed in the PSU to facilitate quick, inexpensive, and simple installation and also to facilitate transforming the air flows previously delivered to the gasper vent into an air curtain between adjacent seats without interfering with other features or access to such features in the vehicle.

Figure 7:
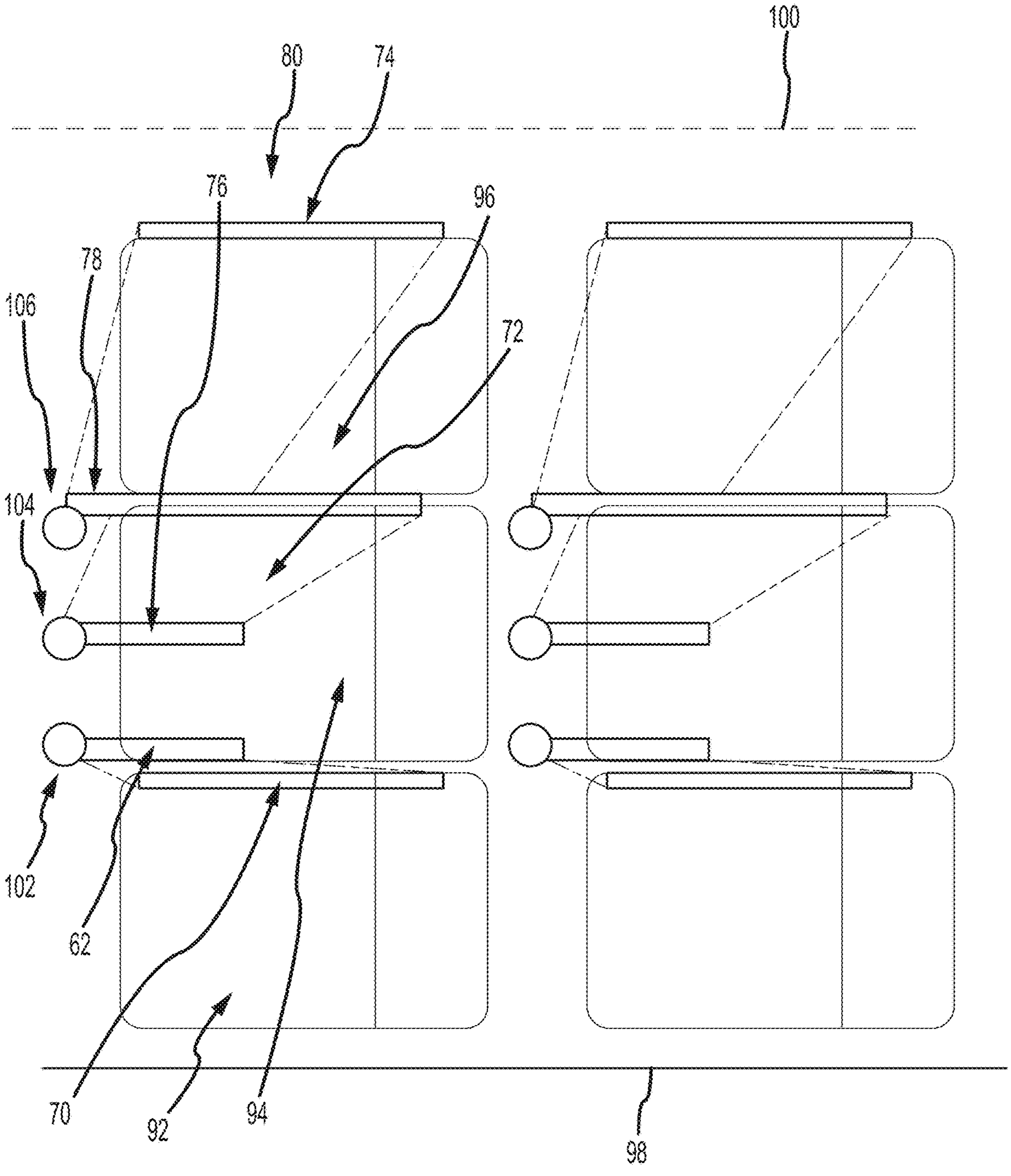
FIG. 7 is a schematic overhead plan view of the vent adapter of FIG. 4 installed in the overhead panel and the air curtain generated by the vent adapter.

FIG. 7 provides a schematic representation of air curtains 70-74 generated by vent adapters such as vent adapters 62, 76, 78 installed in a vehicle such as an aircraft. As shown in FIG. 7, the vehicle may have rows of passenger seats such as row 80, which includes seats 92-96 disposed between an exterior wall 98 of the vehicle and an aisle schematically represented by line 100. The vent adapters 62, 76, 78 are preferably fluidly coupled to passenger vents 102-106 and transform the air flows from the passenger vents 102-106 into the air curtains 70-74. Accordingly, the vent adapters 62, 76, 78 facilitate protecting passengers in adjacent seats in a given row from each other by pushing droplets emitted by the passengers downward, thereby decreasing the distance that the droplets travel and the time that the droplets are airborne. The air curtains 70-74 facilitate greater protection than the frustum emitted by the typical passenger vent such as a gasper vent because the vent adapters 62, 76, 78 concentrate the air flows into planar air flows instead of the entire volume of the frustum, thereby increasing the velocity of the air in the air curtains 70-74 compared to the velocity of the air in the frustum. Moreover, such protection is provided without directing the air flows directly at the faces of the passengers, thereby facilitating greater passenger comfort and decreased disturbance of passenger property such as papers.

Figure 8:
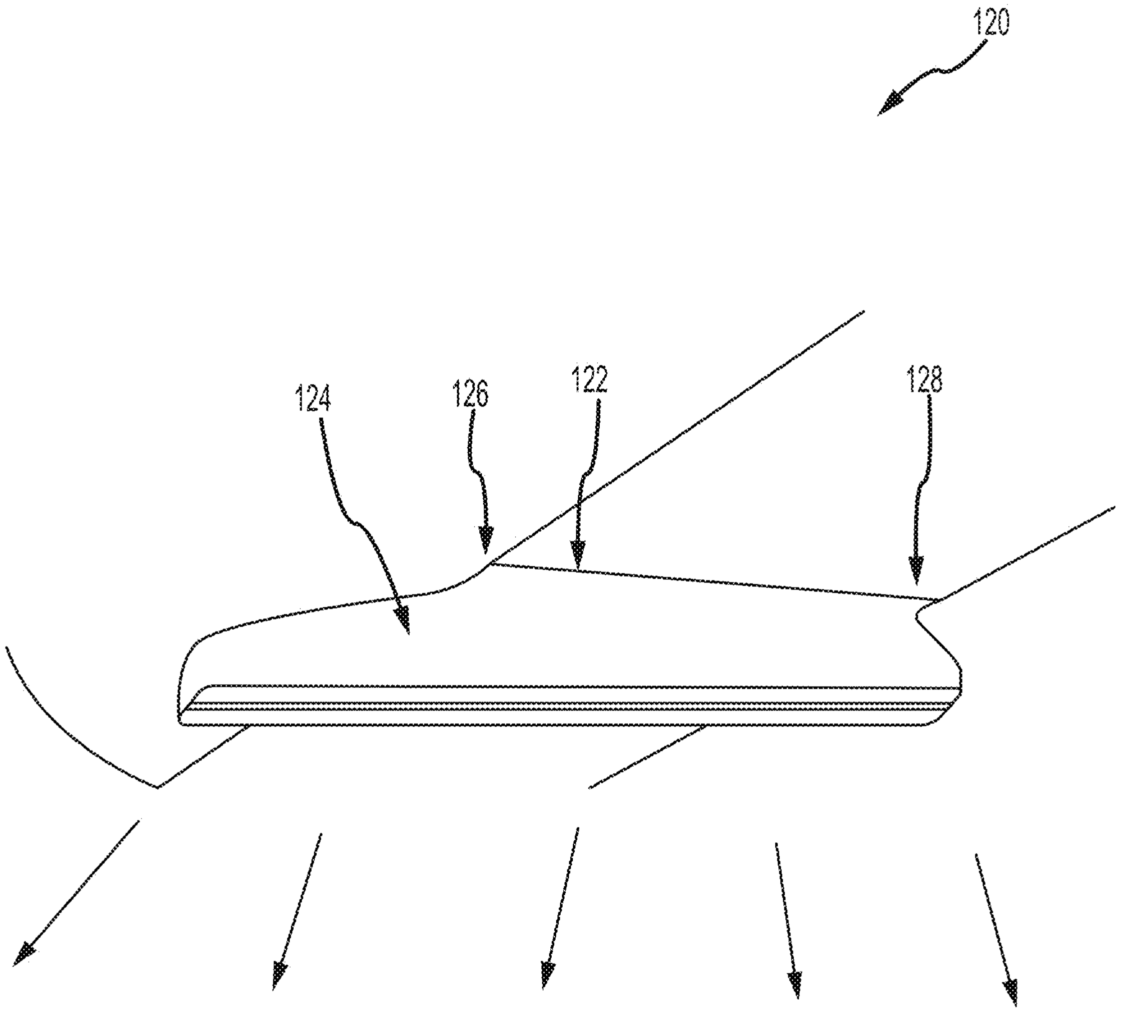
FIG. 8 is a perspective view of another example vent adapter that transforms the air flows of FIG. 3 into an air curtain.

Another example event adapter 120 is shown in FIG. 8. The vent adapter 120 can be configured to transform air flows of one, two, three, or more vents into an air curtain to thereby reduce transmission of bacteria or viruses between rows of seats in a vehicle. As shown in FIG. 8, the vent adapter 120 preferably includes an air-supply interface such as a gasper-air-supply interface 122 and a blade nozzle 124. As shown in FIG. 8, the outlet of the blade nozzle 124 is schematically represented by a white line and can be configured to transform an air flow received by the vent adapter 120 into an air curtain. The air-supply interface 122 can be configured to cover the one or more vents, vent covers, or valves to transmit the air flows to the blade nozzle 124. In some implementations, the vent covers or valves such as the gasper valves are removed prior to installing the vent adapter 120, but in other implementations, the vent covers or valves are left in place and hand controls of such covers or valves manipulated to full-open with the vent adapter 120 installed over the vent covers or valves. In other versions, the air-supply interface 122 includes a number of vent couplers such as the same number as the number of vents covered by the air-supply interface 122. Such vent couplers are preferably configured to mate with respective vent ducts such as the gasper duct 50 in the same or similar manner as the gasper-air-supply interface 64.

The vent adapter 120 preferably has one or more mechanical interfaces that facilitate coupling the vent adapter 120 to the vehicle, such as a PSU. The mechanical interfaces preferably include one or more hooks or clamps opposite the air-supply interface 122 from each other, such as at end portions 126, 128. The mechanical interfaces are preferably configured to be received in respective slots in the vehicle (preferably on opposite sides of the passenger service unit), such as one or both of slots 130, 132 in FIG. 1 and one or both of slots 134, 136 in FIG. 1 or such as slot 138 in FIG. 2 and one or both of slots 140, 152 in FIG. 2. In versions without vent couplers, the top of the air-supply interface 122 can be open and preferably has a gasket disposed on the top of the perimeter lip of the air-supply interface 122 that defines such opening. Accordingly, the top lip of the air-supply interface 122 preferably presses the gasket against the bottom surface of the PSU to prevent air flow from escaping prior to reaching the blade nozzle 124. In other versions, the mechanical interfaces are the same as or similar to the mechanical interface 66 and are configured to couple to a vent cover or valve receiver of the vent, such as a gasper socket disposed in a PSU. In some versions, the mechanical interfaces include fasteners such as screws that extend through the top lip of the air-supply interface 122, such as an outwardly extending flange about the top perimeter of the air-supply interface 122, and into the PSU. In other versions, the vent adapter 120 is coupled to the PSU by adhesive applied to the top lip of the air-supply interface 122.

The vent adapter 120 can be configured to cover only the vents in the PSU. The vent adapter 120 preferably has a form factor schematically represented by dashed line 154 in FIG. 2. Accordingly, the vent adapter 120 facilitates quick, inexpensive, and simple installation without interfering with other features or access to such features in the vehicle while also facilitating transforming the air flows previously delivered to the gasper vents into an air curtain between adjacent rows of seats.

Figure 9:
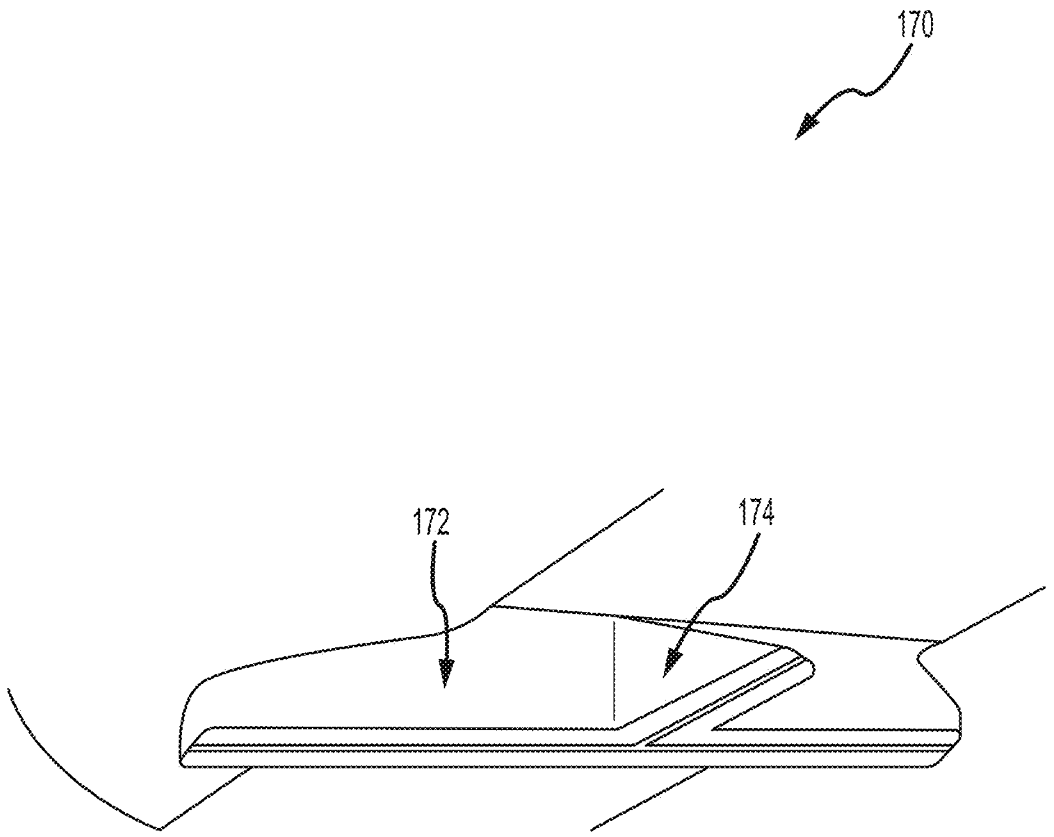
FIG. 9 is a perspective view of another example vent adapter that transforms the air flows of FIG. 3 into an air curtain.

Another example vent adapter 170 is shown in FIG. 9. The vent adapter 170 can be the same as or similar to the vent adapter 120, except the blade nozzle of the vent adapter 170 includes at least two transversely disposed blade portions, such as a blade portion 172 that is the same as or similar to the blade nozzle 124 and a blade portion 174 that is coupled to the blade portion 172, with the outlet of the blade portion 174 oriented transverse to the outlet of the blade portion 174. As shown in FIG. 9, the blade portion 174 extends in one direction from a middle portion of the blade portion 172. In some versions, the blade portion 174 extends from an end portion of the blade portion 172, such as an aisle-end portion of the blade portion 172. In other versions, the blade portion 174 extends from the middle portion of the blade portion 172 and another one or more blade portion extend from one or both end portions of the blade portion 172 and have one or more respective outlets that are oriented transverse to the outlet of the blade portion 172. In some versions, the blade portion 174 extends from a middle portion of the blade portion 172 and another blade portion also extends from a middle portion of the blade portion 172 but is spaced apart from the blade portion 174, with the outlet of the other blade portion oriented transverse to the outlet of the blade portion 172.

Figure 10:
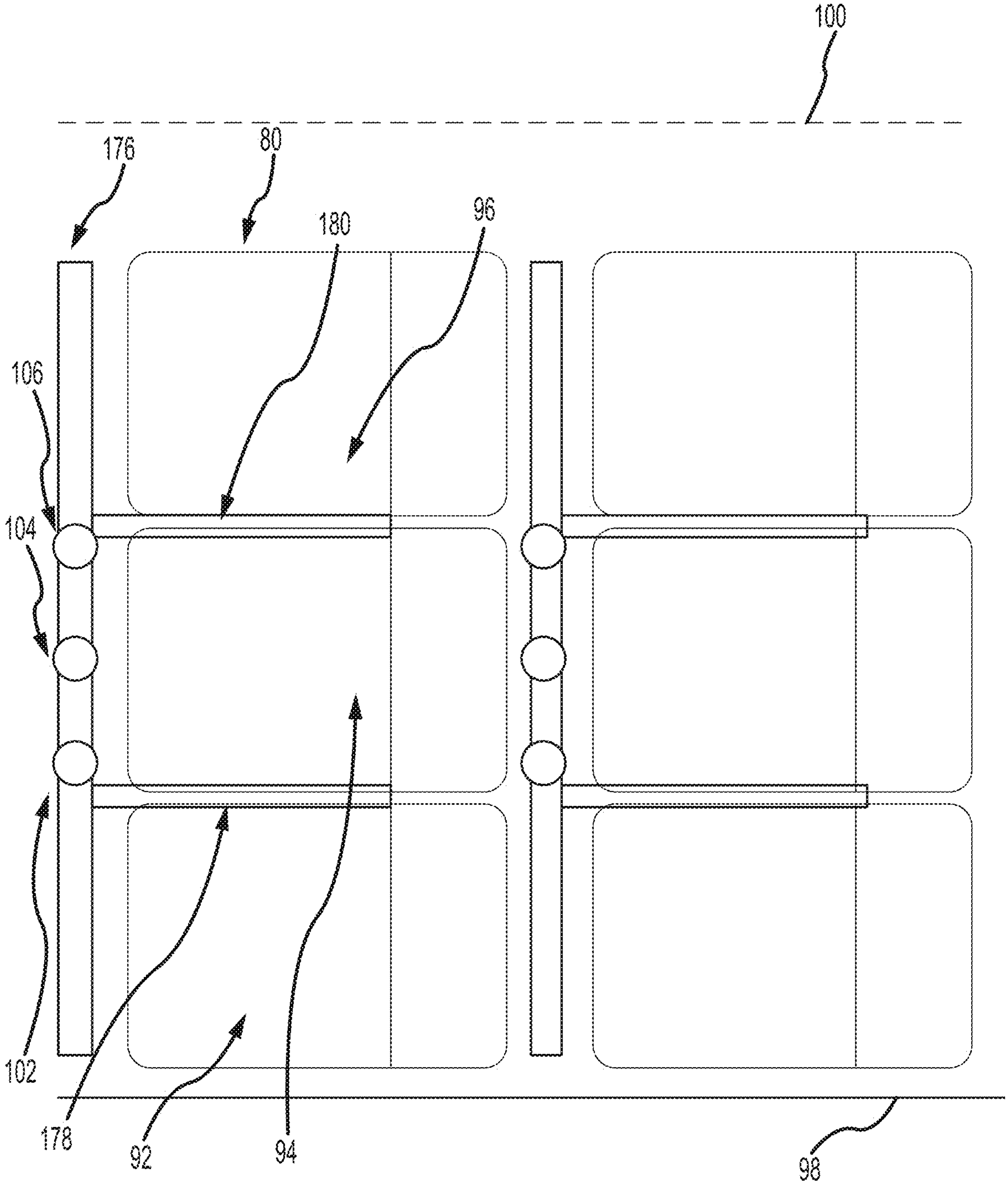
FIG. 10 is schematic overhead plan view of an example vent adapter installed in an overhead panel in a passenger aircraft and the air curtain generated by the vent adapter.

FIG. 10 provides a schematic representation of air curtains 176-180 generated by a version of the vent adapter 170 that has a blade nozzle with two blade portions disposed in a middle portion of the blade portion 172. The vent adapter 170 can be fluidly coupled to the passenger vents 102-106 and transforms the air flows from the passenger vents 102-106 into air curtains 176-180. In some versions, a third blade portion that has its outlet oriented transverse to the outlet of the blade portion 172 is disposed on the aisle-end portion of the blade portion 172 to facilitate generating an air curtain on the aisle side of the seat 96. As shown in FIG. 10, the air curtains 176-180 are discrete air curtains that may overlap but are generated by separate and distinct outlets. In some versions, the outlets connect and thus form a single air curtain that has the shape of the air curtains 176-180. Accordingly, the passenger-vent adapter 170 facilitates protecting passengers in adjacent seats in a given row from each other and also facilitates protecting passengers in adjacent rows from each other.

Figure 11:
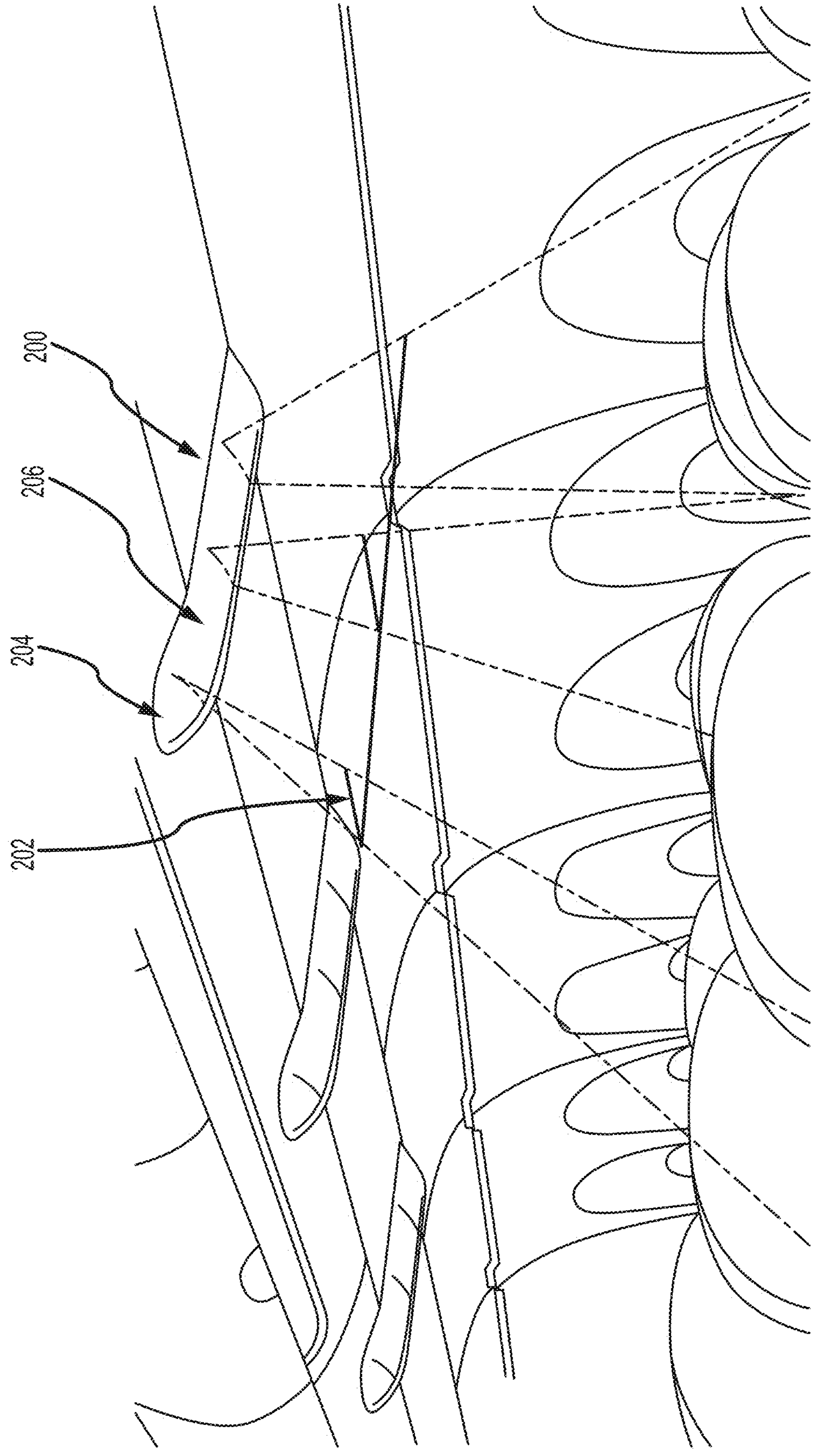
FIG. 11 is perspective view of another example vent adapter that transforms the air flows of FIG. 3 into an air curtain.

Another example vent adapter 200 is shown in FIG. 11. As indicated by the line 202, the shape of the air curtain generated by the vent adapter 200 is the same as or similar to the one or more air curtains generated by the vent adapter 170. The vent adapter 200 can be the same as or similar to the vent adapter 170, except that the vent adapter 200 has a different body shape and that the vent adapter 200 covers or blocks access to one or more features in the vehicle and duplicates or passes through one or more of such covered or blocked features. The body shape of the vent adapter is rounded to facilitate providing enhanced deflection of impacts to the body relative to the body of the vent adapter 170, thereby decreasing the likelihood that the vent adapter 200 is damaged or removed by impacts from passenger heads or personal assets such as bags or suitcases. As shown in FIG. 11, the vent adapter 200 duplicates or passes through covered or blocked features such as an illuminated row identifier 204 and illuminated seat identifiers such as illuminated seat identifier 206. In some versions, the connection from the vehicle to a covered or blocked feature is separated from such feature and connected to a corresponding duplicated feature in the vent adapter 200. For example, power supply wires may be removed from the illuminated row identifier in the PSU and connected to the illuminated row identifier in the vent adapter 200. In other versions, the vent adapter 200 passes through the feature. For example, the vent adapter 200 may provide a window that provides visual access to the covered feature. In another example the vent adapter 200 may include a push button on its exterior surface, which manipulates a plunger disposed interior to the body of the vent adapter 200, and the plunger is configured to manipulate a user interface control on the PSU such as the reading light control 20 or the attendant-call control 32 in FIG. 2.

Figure 12:
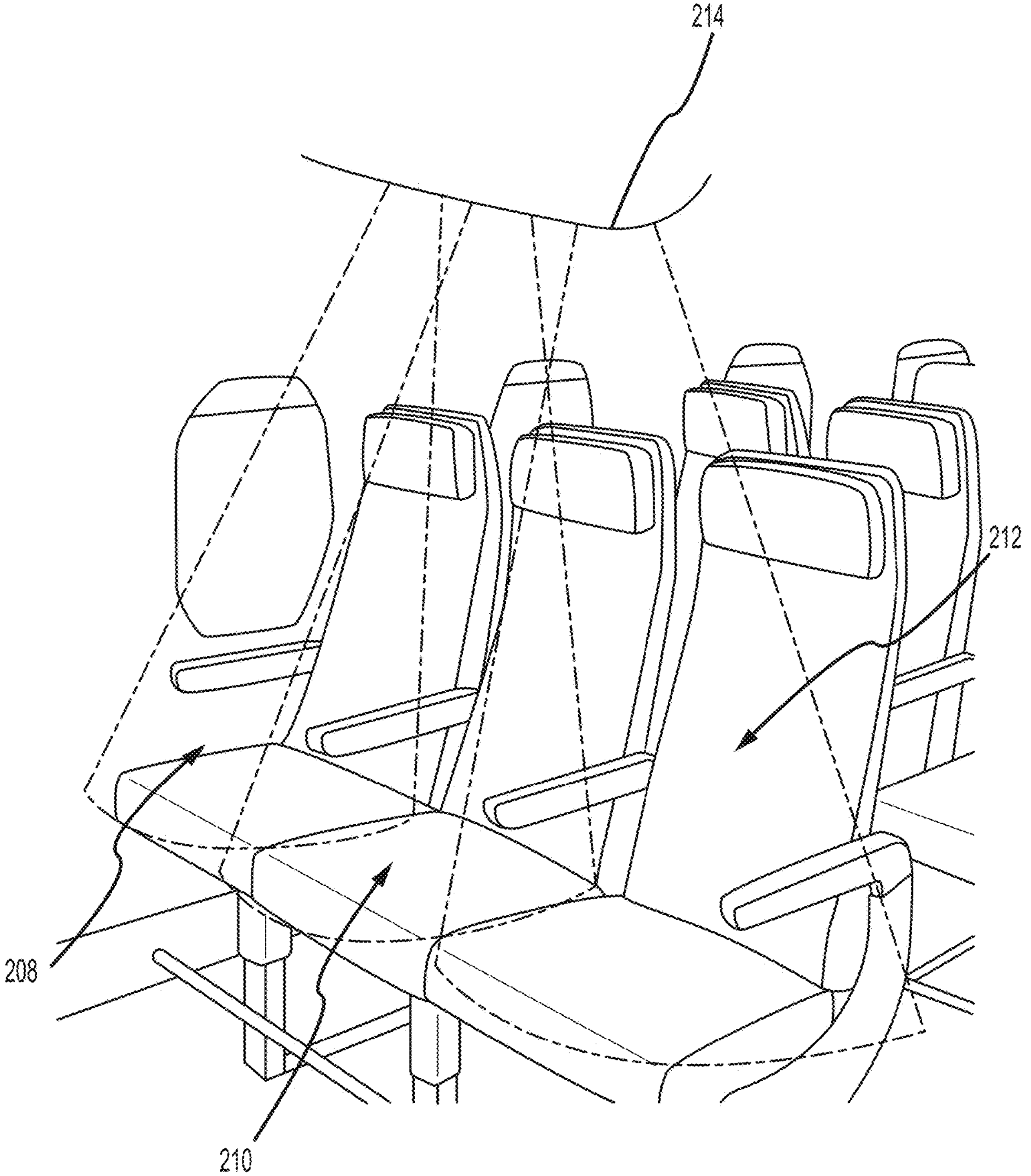
FIG. 12 is a perspective view of air curtains generated by one or more example vent adapters.

FIG. 12 provides a schematic representation of air curtains 208-212 generated by a version of the vent adapter that has three curved blade nozzle outlets, which are schematically represented by line 214. The blade-nozzle outlets that generate the air curtains 208-212 preferably provide approximately 180° coverage. The air curtains 208-212 are preferably at least partially curved or entirely curved in horizontal cross-section. In some versions the air curtains 208-212 are C-shaped or U-shaped in horizontal cross-section. In some versions, the window-seat blade-nozzle outlet that generates the air curtain 208 provides approximately 90° coverage that is at least partially curved or entirely curved in horizontal cross-section because the window-side of the window seat is already protected by the exterior wall of the aircraft, which facilitates increasing the velocity of air flow through the outlets by eliminating the cross-sectional surface area of the air curtains. In some versions, the air curtain 208 is J-shaped in horizontal cross-section.

Figure 13:
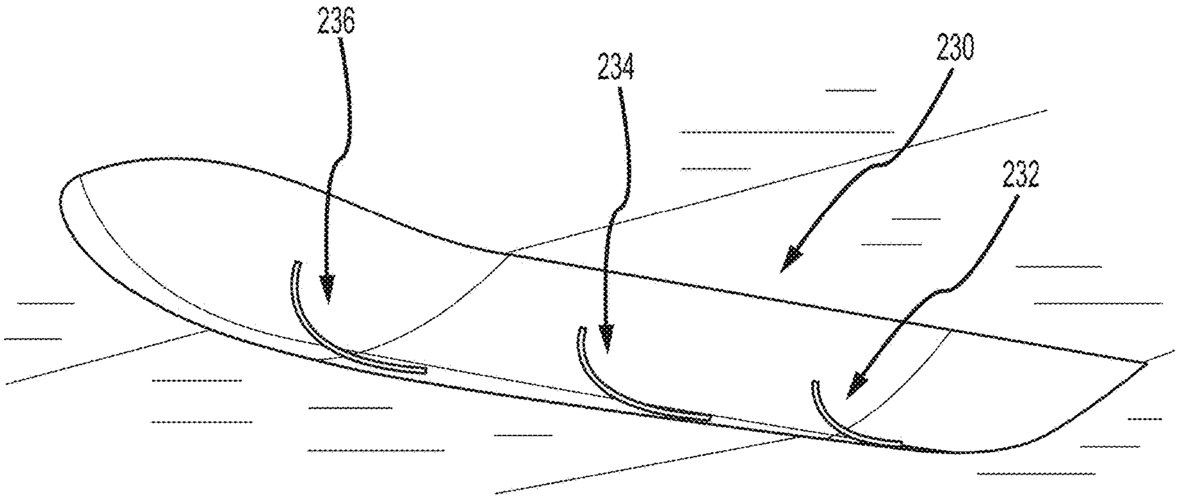
FIG. 13 is a perspective view of another example vent adapter that transforms the air flows of FIG. 3 into air curtains.
Figure 14:
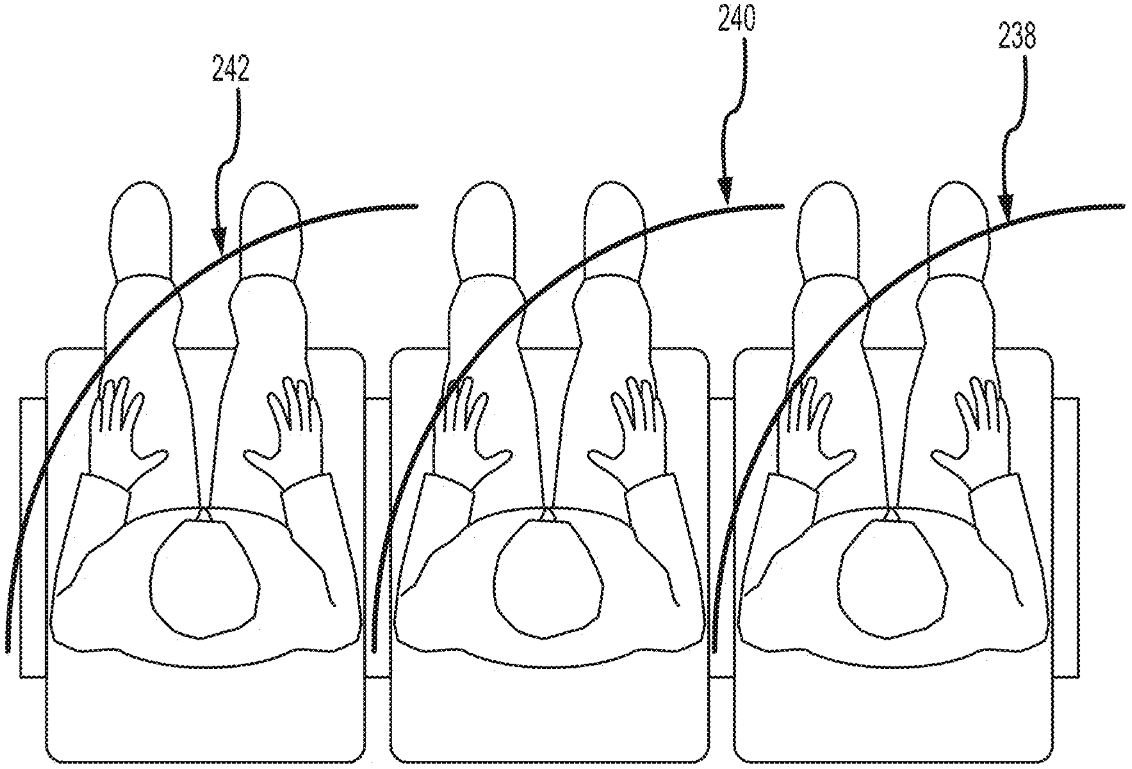
FIG. 14 is a schematic overhead view of air-curtain projections generated by the vent adapter of FIG. 13.

Another example vent adapter 230 is shown in FIG. 13. The vent adapter 230 can be the same as or similar to the vent adapter 200, except that the vent adapter 230 defines outlets 232-236 that are configured to generate air curtains that respectively provide approximately 90° coverage to facilitate increasing the air flow velocity of the air curtains by eliminating duplication of coverage by air curtains generated by the same vent adapter 230. The generated air curtains are preferably at least partially curved or entirely curved in horizontal cross-section. In some versions, the generated air curtains are J-shaped. In some versions, the vent adapter 230 is configured to provide protection for a set of seats disposed between two aisles, and the outlet 232 is configured to provide approximately 180° coverage. The air curtains generated by the outlets 232-236 preferably contact each other or overlap to provide complete coverage forward of the passengers in the corresponding seats. In other versions, the air curtains generated by the outlets 232-236 do not contact each other or overlap (see projections 238-242 in FIG. 14 or projections 244-254 in FIG. 15). As shown in FIG. 13, the outlets 232-236 are separate and distinct from each other, but in some versions, the outlets 232-236 form a single integral outlet.

The inventor discovered that implementing blade nozzles defining outlets that generate curved air curtains facilitates using air flows of smaller magnitude flow rates (for example, volume of air moved per minute) to generate the same air velocity as air curtains that have multiple straight sides joined at perpendicular angles (or facilitate higher velocities with air flows of the same magnitude). For example, using the same air flow magnitudes, the vent adapter 230 facilitates generating air curtains having greater air velocity than does the vent adapter 200. The inventor also discovered that implementing blade nozzles defining outlets that generate curved air curtains facilitates reducing spread of bacteria or viruses through the air curtains because droplets that are projected through such air curtains generally cross through greater lengths of the air curtains compared to straight air curtains, thereby facilitating increased time that the droplets encounter downward force from the curved air curtains.

The inventor also discovered that configuring one vent adapter to generate one or more air curtains from multiple discrete air vents facilitates improving consistency of air velocity in the effective portions of the air curtains, such as those portions of the air curtains that are at or below the faces of the passengers when sitting or normally positioned within the air curtains. In some versions, one or more of the passenger-vent adapters described herein have one or more partition fins disposed inside the body or air-supply interface configured to direct one or more portions of air flows from one or more vents toward one or more remote portions of the blade nozzle to control air pressure therein and thus velocity of each portion of the air curtain. For example, an aisle-side portion of an air curtain that extends across three seats may be farther from the closest vent than a middle portion of the air curtain, and the one or more partition fins facilitate directing increased amounts of the air flows toward the portion of the outlet that generates the aisle-side portion of the air curtain to provide the aisle-side portion of the air curtain with the same emission velocity as the middle portion of the air curtain. In other versions, the partition fins provide greater emission air velocities to some portions of the air curtain than to others to compensate for the greater distance that some portions of the air curtain must travel before contacting a solid surface. For example, the aisle-side portion of the air curtain may be oriented transverse to vertical, and there may be a greater distance between the aisle-side arm rest and the outlet than between a middle arm rest and the outlet, so the partition fins may supply greater air flows to the aisle-side outlet. Although both examples include providing increased air flows toward an outlet that generates an aisle-side of an air curtain, such partition fins may direct increased air flows toward any other portion of one or more outlets that define one or more air curtains depending on the particular environment in which the vent adapter is installed or intended to be installed. As another example, another fluid other than air may be employed, such as water.

Figure 15:
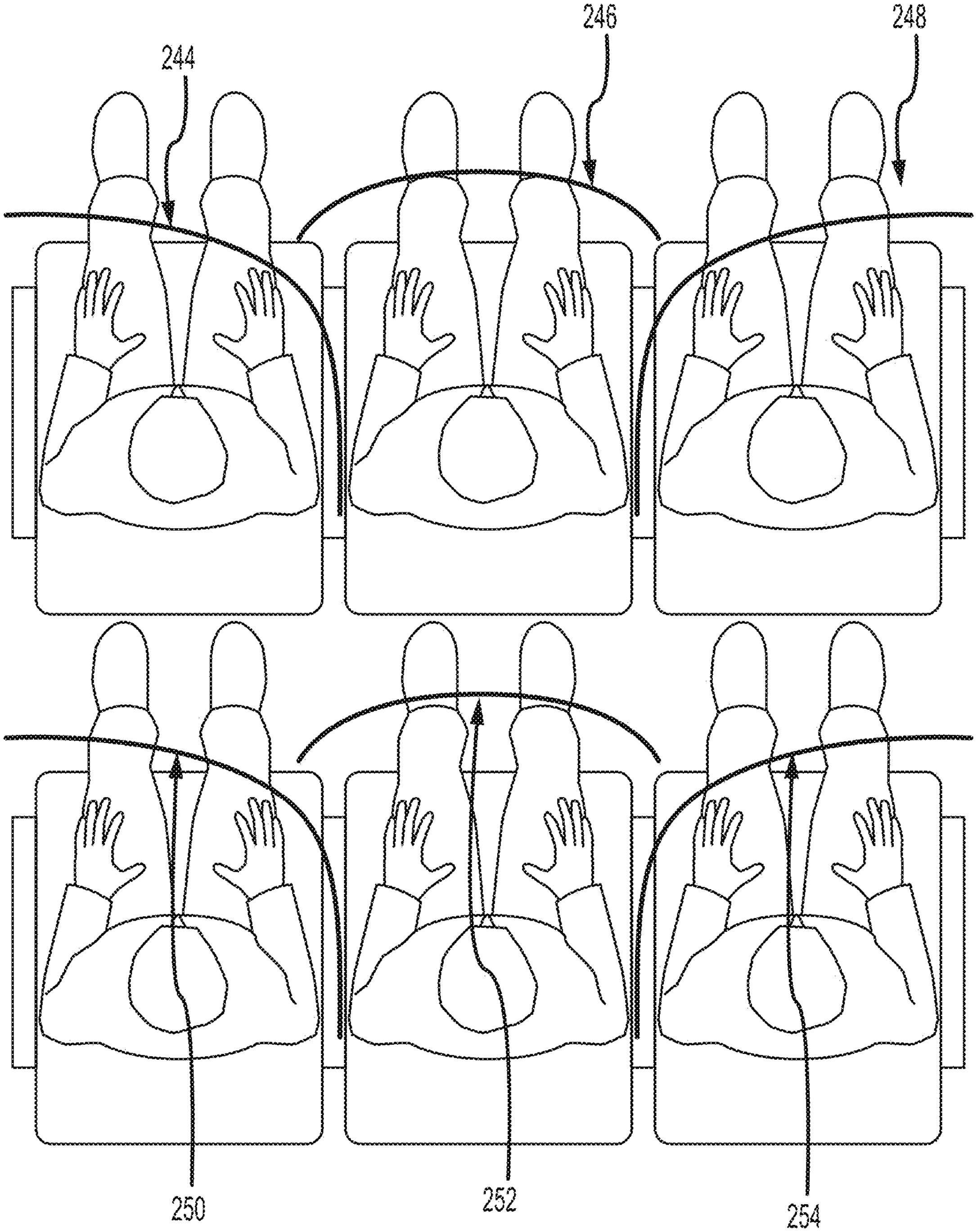
FIG. 15 is a schematic overhead view of air-curtain projections generated by an example vent adapter.

The vent adapter 230 preferably has one or more lights such as one or more lasers that generate projections such as projections 238-242 that indicate the locations and shapes of the air curtains generated by the vent adapter 230. The lights are preferably disposed inside the body of the vent adapter 230 and emit the projections through the outlets 232-236. In other versions, the lights are disposed in or on the body of the vent adapter 230 near the outlets 232-236. Another version of curtain shapes generated by one of the vent adapters disclosed herein is shown in FIG. 15 and illuminated by projections 244-254 (the right seats being window seats, and the left seats being aisle seats in FIG. 15). In some versions, multiple smaller curtains may be spaced apart from each other but arranged side-by-side to form a larger curtain. For example, instead of an air curtain extending in a continuous manner along projection 252, multiple air curtains may be arranged along projection 252 and spaced apart from each other to form a larger air directing along projection 252.

Figure 16A:
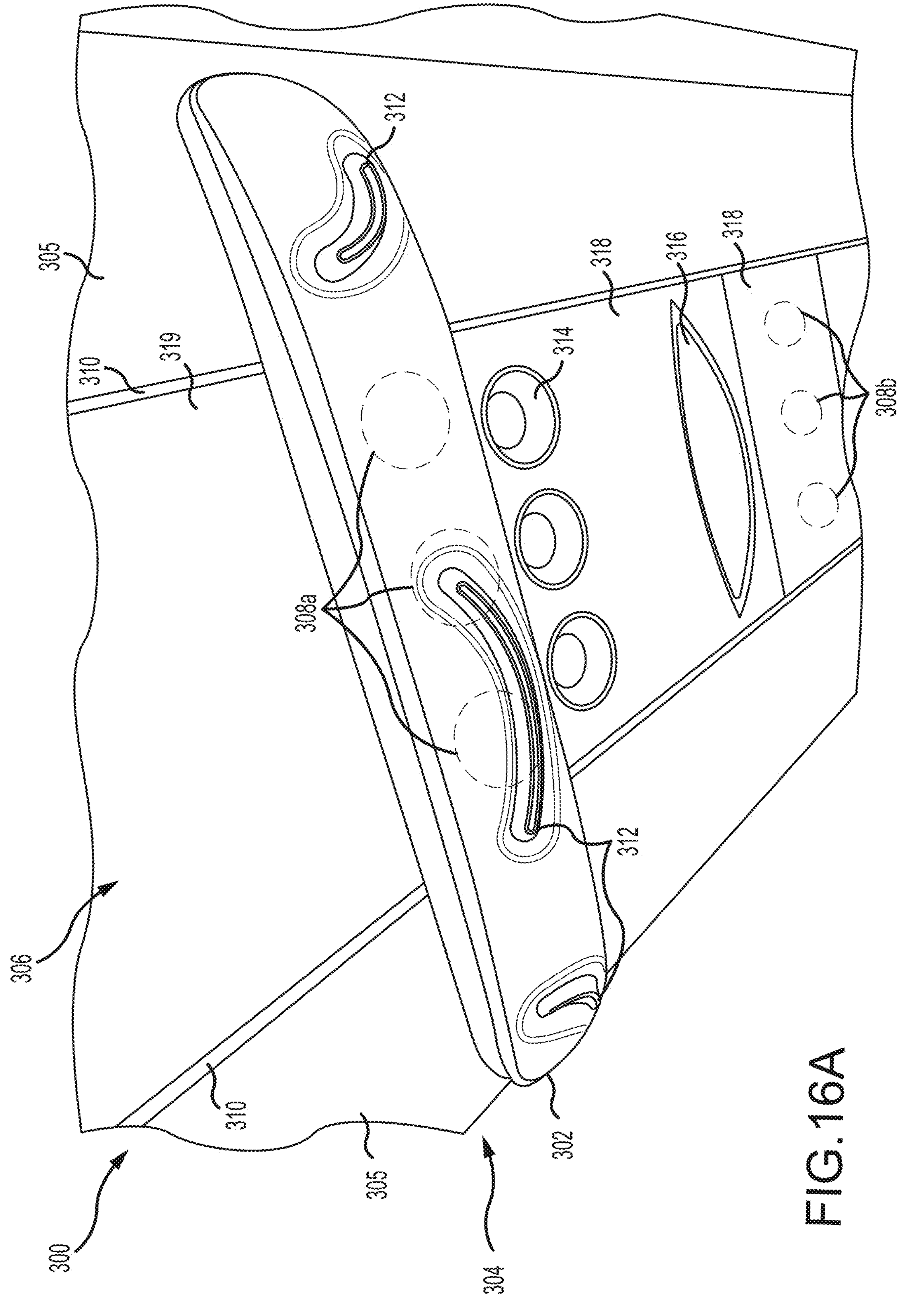
FIG. 16A illustrates a portion of an aircraft environment including an example air directing device, in accordance with embodiments.

Turning now to FIG. 16A a portion of an aircraft environment 300 is shown including an example air directing device 302. The aircraft environment 300 can include overhead panels 304 positioned above passenger seats (not pictured). The overhead panels 304 can include a passenger service unit (PSU) system 306 that can run along the length of a cabin of the aircraft. The PSU system 306 can include PSUs 318 and blank panels 319. The PSUs 318 can be or include panels that are located above a passenger (e.g., above a row of passengers) and/or include components that provide a service to a passenger. In various embodiments, the PSU system 306 can run along the length of the aircraft and can be centrally located on the overhead panels 304 with one or more side panels 305 positioned on each side (e.g., left and right sides) of the PSU system 306. There can be a gap 310 between the PSU system 306 and the side panels 305. The gap 310 can be used to mount one or more components. For example, the gap 310 can be used to mount the air directing device 302.

The PSU system 306 can include one or more PSUs 318. The PSUs 318 can include various components, for example, the air outlets 308, lights 314, and/or passenger notification indicators 316. In the interest of brevity, when referring to a PSU 318, it should be understood that it is a PSU 318 that includes air outlets 308. The PSUs 318 can be separated by one or more blank panels 319. The PSUs 318 can be spaced at regular intervals along the length of the aircraft. For example, the PSUs 318 can be spaced such that the components are positioned with each passenger having their own light 314 and/or each passenger or row of passengers having their own air outlet 308. In various embodiments, the air outlets 308 can include covers, such as gasper vents, that allow a passenger to control the direction and/or intensity of the air. The air outlets 308 can be connected to an air distribution system (e.g., an air conditioning system) to distribute air in the aircraft environment 300. For example, the air outlets 308 can extend through a PSU 318 and connect with a portion of the air conditioning system positioned above the overhead panels 304.

The air directing device 302 can be positioned over the air outlets 308 with an upper surface of the air directing device 302 contacting the PSU 318 and/or side panels 305 (e.g., the air directing device 302 can be in engaged with the PSU 318 and extend to the left and right to contact the side panels 305). The air directing device 302 can be mounted using gaps 310 (e.g., using gaps between the PSU 318 and the side panels 305 and/or using gaps between a PSU 318 and a blank panel 319). In various embodiments, a portion of the air directing device 302 can extend through gaps 310 and engage with a support structure (e.g., the support structure used to support overhead panels 304 and/or the PSU system 306). The air directing device 302 can direct air from the air outlets 308 to one or more blade nozzles 312. The blade nozzles 312 can output an air curtain (not depicted) into the aircraft environment 300 (as discussed in reference to FIG. 17).

The air directing device 302 can include a housing that forms an air reservoir to receive the air and direct it out of blade nozzles 312. The blade nozzles 312 can be positioned on the air directing device 302 to output the air curtains 400, for example, between passengers seated below the PSUs 318. Air directing devices 302 may be positioned over some or all of the air outlets 308 (e.g., engaged with PSUs 318). For example, as shown in FIG. 16A, an air directing device 302 is positioned over air outlets 308*a* and no directing device is positioned over air outlets 308*b*.

Figure 16B:
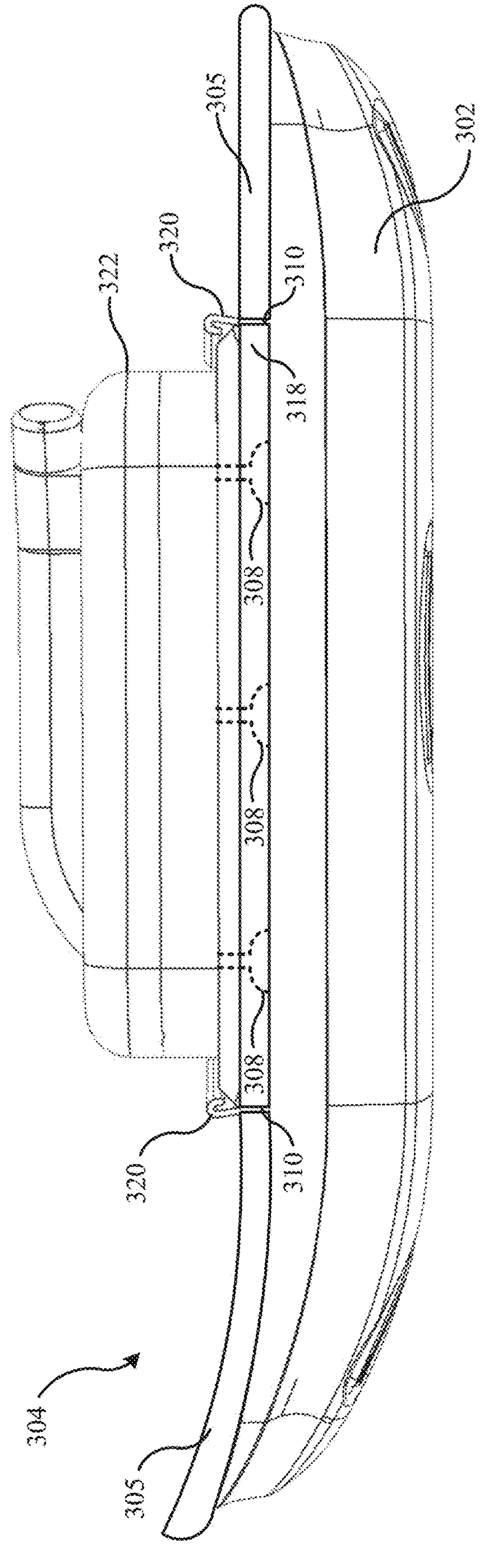
FIG. 16B illustrates an example installation of the example air directing device of FIG. 16A.

FIG. 16B illustrates an example installation of the example air directing device 302 of FIG. 16A. The air directing device 302 can be installed in the aircraft environment 300 such that the air directing device 302 is in fluid communication with the air distribution system to the cabin of the aircraft. For example, the air directing device 302 can receive air from a distributor 322 that is part of the air distribution system (e.g., the air directing device 302 can receive air from the distributor 322 through air outlets 308).

The air directing device 302 can include a vent mechanical interface 320 that can be used to install the air directing device 302. The vent mechanical interface 320 can extend through a gap 310 (e.g., a gap between a PSU 318 and side panels 305). The vent mechanical interface 320 can engage with a portion of the air distribution system. For example, the vent mechanical interface 320 can engage with the distributor 322 of the air distribution system. However, the vent mechanical interface 320 may additionally or alternatively engage with a support structure positioned above the overhead panels 304 (e.g., a frame and/or railing where the overhead panels 304 attached to the aircraft).

In various embodiments, the PSU 318 can be removed to install the air directing device 302 (as described herein in reference to FIGS. 31A through 34). The PSU 318 can be removed and the air directing device 302 can be installed to engage directly with the distributor 322. The air directing device 302 can engage with the distributor 322 such that the distributor 322 does not receive a portion of the air directing device 302. However, the distributor 322 may receive a portion of the air directing device 302 (e.g., a portion of air directing device 302 that can direct air toward blade nozzles 312. The air directing device 302 can be attached to distributor 322 using one or more attachment mechanisms. For example, the air directing device 302 can be attached using any and/or all of the attachment techniques described herein and/or using fasteners.

In various embodiments, the PSU 318 and the distributor 322, described herein in reference to FIGS. 16A and 16B, can be included in one or more aircraft overhead systems. The aircraft overhead system can be used to install the air directing device 302. For example, the air directing device 302 can be installed to receive a portion of the aircraft overhead system (e.g., the PSU 318 and/or the distributor 322). The air directing device 302 can be installed using the PSU 318. Using the PSU 318 to install the air directing device 302 can allow for a quicker installation than installing the air directing device 302 with another portion of the aircraft overhead system (e.g., the distributor 322). Using the PSU 318 to install the air directing device 302 can additionally or alternatively necessitate relatively less change to the aircraft overhead system and/or the air distribution system (e.g., the air directing device 302 can be installed with the PSU 318 as a retrofit system where a portion of the aircraft overhead system does not need to be removed for installation of the air directing device 302). In comparison, when the distributor 322 is used for installation of the air directing device 302, a more flushed installation is possible which can avoid encroaching into the overhead space of the passengers seated below (e.g., the air directing device 302 may not protrude beyond the bottom surface of the blank panels 319). However, installation of the air directing device 302 may necessitate removal of a portion of the aircraft overhead system (e.g., removal of a PSU 318). The air directing device 302 can be installed with the distributor 322 as part of a retrofit to the aircraft overhead system or as part of an in-line installation.

Figure 17:
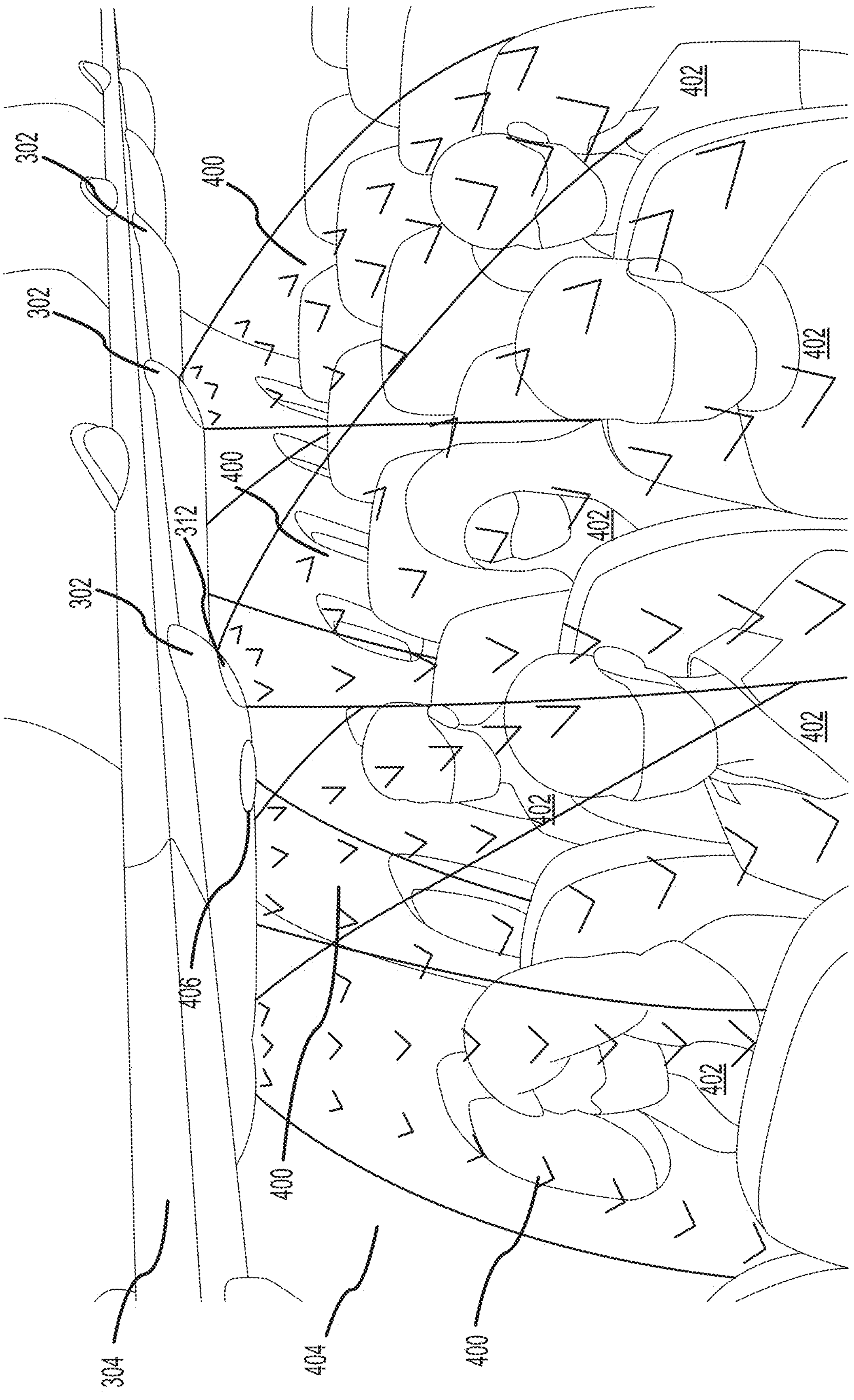
FIG. 17 illustrates various air shield projections generated by the example air directing device of FIG. 16A.

FIG. 17 illustrates various air curtains 400 generated by the example air directing device 302 of FIG. 16A. As shown in FIG. 17, a single air directing device 302 can be installed above a row of seats (e.g., the air curtains 400 for a row of seats are output from the same air directing device 302). However, multiple air directing devices 302 can be installed over a row of seats (e.g., the air curtains 400 for a row of seats can be output by multiple air directing devices 302). The air curtains 400 can be output (e.g., formed) by the blade nozzles 312. The air curtains 400 can be formed between passengers 402 sitting in the same row, between a passenger 402 and a sidewall of the aircraft 404 (e.g., an interior sidewall of the aircraft), between passengers 402 sitting in different rows and/or aisles, and/or between passengers 402 and a walkway through the aircraft. In various embodiments, the air directing device 302 can be controllable such that air curtains are not formed in empty rows and/or rows where only a single passenger is sitting. The air directing device 302 can include a controllable outlet valve that can stop or reduce the flow of air from exiting the blade nozzles 312 and/or a controllable inlet valve that can stop or reduce the flow of air into the air directing device 302. In some embodiments, the PSU 318 can have a valve that can stop or reduce the flow of air from the air outlets 308 (e.g., into the air directing device 302).

In further embodiments, the air directing device 302 can include features that allow a passenger to control the flow of air. For example, the air directing device 302 can include a louver and/or a similar device that can allow a passenger 402 to control the air flowing out of the blade nozzles 312. The louver can be used to adjust the intensity of the blade nozzles 312. For example, the louver can stop the air flowing out of the blade nozzles 312. In some embodiments, the air directing device 302 may include an outlet that directs air towards a passenger. For example, the air directing device 302 may include a vent that directs air towards the face and/or body of a passenger 402. The vent can be controlled by the same louver that controls the airflow out of the blade nozzles 312. However, the vent can be controlled by a separate louver.

In various embodiments, the air directing device 302 can include multiple louvers. For example, the air directing device 302 can include a louver per passenger seat (e.g., each passenger 402 can adjust the airflow out of the air directing device 302). However, the air directing device 302 can include a louver that controls the airflow out of multiple blade nozzles 312. For example, a louver can reduce the airflow of all of the blade nozzles of the air directing device 302.

In some embodiments, the louver can include a user interface. The user interface can include an input that can be used to control the air flowing out of the blade nozzles 312. For example, the user interface can be or include a mechanical, electrical, or electromechanical interface which a passenger 402 can use to control the air flowing out of the blade nozzles 312.

Figure 18A:
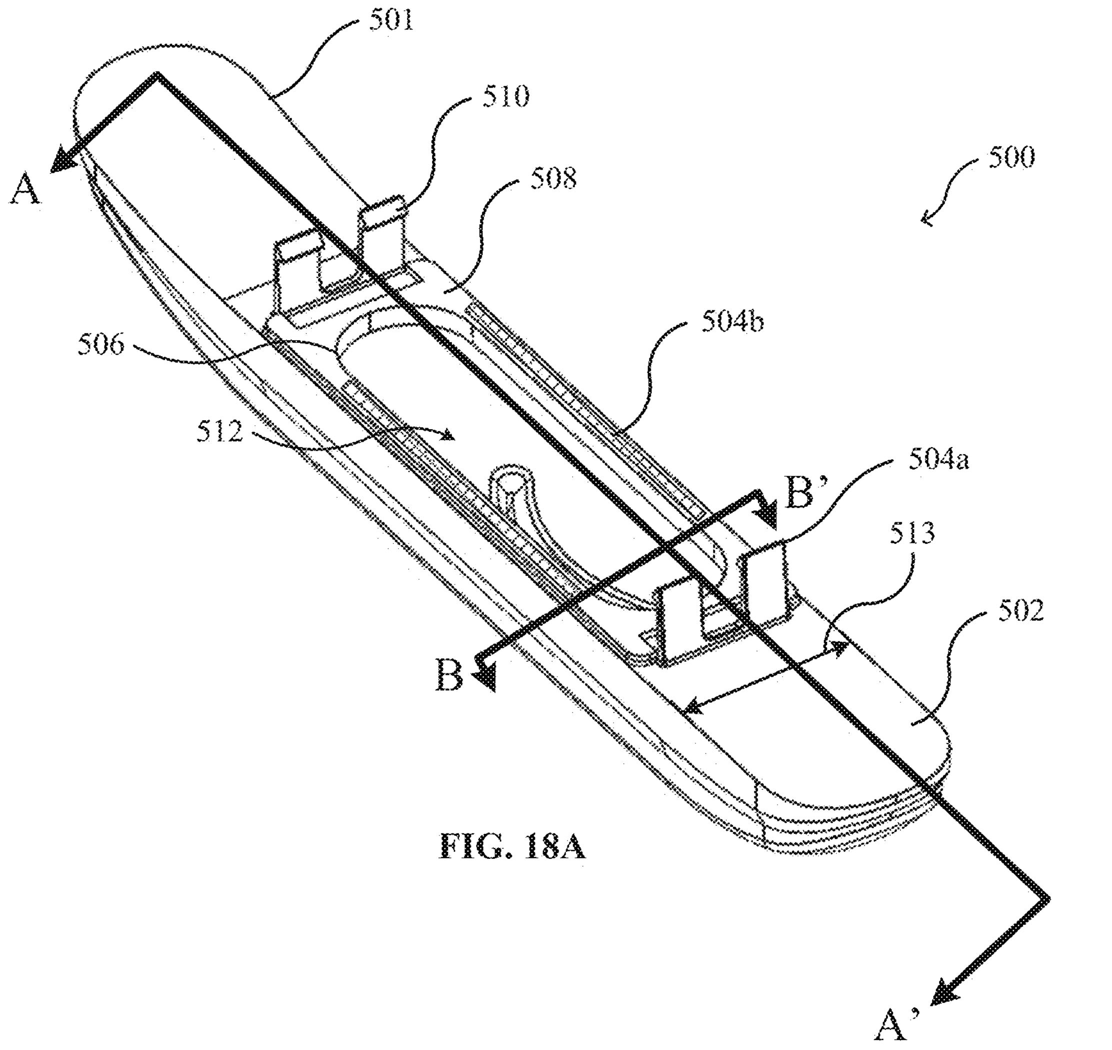
FIGS. 18A, 18B, 18C, and 18D show various views of an example air directing device that can be included in particular embodiments of the aircraft environment of FIG. 16A.
Figure 18B:
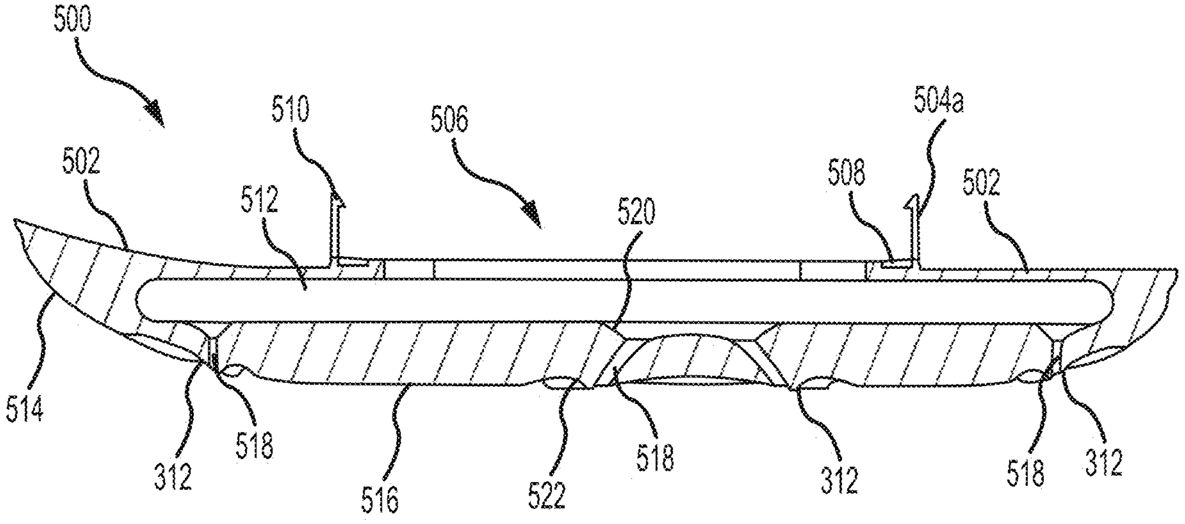

FIGS. 18A, 18B, 18C, and 18D show various views of an example air directing device 500 that can be included in particular embodiments of the aircraft environment 300 of FIG. 16A. The air directing device 500 can be the same as or similar to the air directing device 302 of FIG. 16A, however, the air directing device 500 can have additional and/or alternative components. FIG. 18A is a simplified perspective view of the air directing device 500. The air directing device 500 can include a housing 301 with an upper surface 502, a vent mechanical interface 504, an upper aperture 506, and a seal 508. The housing 301 can include multiple walls surrounding an air reservoir 512. The upper surface 502 (e.g., a top surface or a first surface) can interface with the PSU system 306 (e.g., the PSUs 318). The upper surface 502 can have a width 313 in a range between 2 inches (5 cm) and 5 inches (13 cm) (e.g., 2 inches, 3 inches, 4 inches, 5 inches) (5 cm, 6 cm, 7 cm, 8 cm, 9, cm, 10 cm, 11 cm, 12 cm, 13 cm). For example, the upper surface 502 can have a width of 3.1 inches. A portion of the upper surface 502 can be shaped to engage with the shape of the overhead panels 304 and/or the PSU system 306. For example, a portion of the upper surface 502 can have a sloped section (as shown in FIG. 18B) that interfaces with a curved section of the overhead panels 304 and/or the PSU system 306.

The vent mechanical interface 504 can be connected to the upper surface 502 and engage with the PSU system 306 (e.g., the vent mechanical interface 504 can be or include a means for engaging the air device with the PSUs 318). For example, in embodiments where the vent mechanical interface 504 can be or include a clip, the vent mechanical interface 504 can engage with gaps 310 (e.g., such as railing in the overhead area above the PSU system 306). In some embodiments, the vent mechanical interface 504 can be or include an attachment mechanism that can engage with a lower surface of the PSU system 306 (e.g., the PSUs 318). In various embodiments, the vent mechanical interface 504 can be or include adhesives, tape, adhesive foam, hooks, clips, and/or similar attachment mechanisms. In various embodiments, the vent mechanical interface 504 can be or include one or more clips 504*a* extending from the air directing device 500. The clips 504*a* can have a width with a thickness equal to or less than the width of the gaps 310 (e.g., the clips 504*a* can be inserted into the gaps 310).

In some embodiments, a portion of the clips 504*a* can temporarily increase the size of gaps 310 to allow the clips 504*a* to be inserted into the gaps 310. For example, the upper portion of the clips 504*a* can include a protrusion with a sloped surface 510. The upper portion of the clips 504*a* can have a width larger than the starting width of the gaps 310 and can temporarily increase the width of the gaps 310 (e.g., when the upper portion of the clips 504*a* is inserted into the gaps 310). The lower portion of the protrusion can have a width that is equal to or less than the starting width of the gaps 310. The upper portion of the clips 504*a* can be inserted into the gaps 310 until the gaps 310 return to their starting width (e.g., the lower portion of the clips 504*a* having a width equal to or less than the starting width of the gaps 310 can allow the gaps 310 to return to their starting width). The upper portion of the clips 504*a* having a width larger than the starting width of the gaps 310 can prevent the clips 504*a* from being easily removed from the gaps 310. The clips 504*a* can flex to be inserted into the gaps 310 and hold the air directing device 500 in position, for example, in position beneath the air outlets 308. In some embodiments, the clips 504*a* can include multiple protrusions (e.g., a protrusion on opposing sides of the clips 504*a*). The multiple protrusions can engage with multiple portions of the overhead panels 304, the PSU system 306, the PSUs 318, the blank panels 319, and/or overhead aircraft structures (e.g., overhead railings). For example, the multiple protrusions can be inserted into gaps 310 and engage with an upper side of the PSU system 306 (e.g., the PSUs 318). The clips 504*a* can be or include plastic, metal, silicon, rubber, and/or any material with similar properties.

In some embodiments, the vent mechanical interface 504 can be or include hook and loop connectors 504*b*. The hook and loop connectors 504*b* can be positioned around upper aperture 506 and engage with opposing hook and loop connectors 504*b* positioned on the PSU system 306 (e.g., on the PSUs 318). The hook and loop connectors 504*b* can hold the air directing device 500 in place after installation and prevent the air directing device 500 from moving, for example, in response to movement of the aircraft.

The upper surface 502 can include the upper aperture 506 that forms an opening through the upper surface 502. The upper aperture 506 can be proportioned (e.g., sized and shaped) to receive a portion of the PSU 318 (e.g., the upper aperture 506 can be or include a means for receiving the air from the air outlets 308 of the PSU 318). For example, the upper aperture 506 can receive a portion of one or more of the air outlets 308. In various embodiments, the upper aperture 306 has dimensions equal to or larger than dimensions of the portion of the PSU 318 such that the upper aperture 506 is proportioned to receive a portion of the air outlets 308. The seal 508 can be positioned around at least a portion of the periphery of the upper aperture 506. The seal 508 can be or include compressible material that can be compressed between the upper surface 502 and the overhead panels 304 and/or the PSU system 306 (e.g., the PSUs 318). The seal 508 can aid in preventing air from the air outlets from flowing out between the upper surface 502 and the PSUs 318. In some embodiments, the seal 508 can be positioned between the upper surface 502 and the vent mechanical interface 504. For example, the seal can be positioned between the upper surface 502 and the hook and loop connectors 504*b*. The seal can be or include rubber, foam, silicone, or any compressible material that is suitable for forming a seal.

Figure 18C:
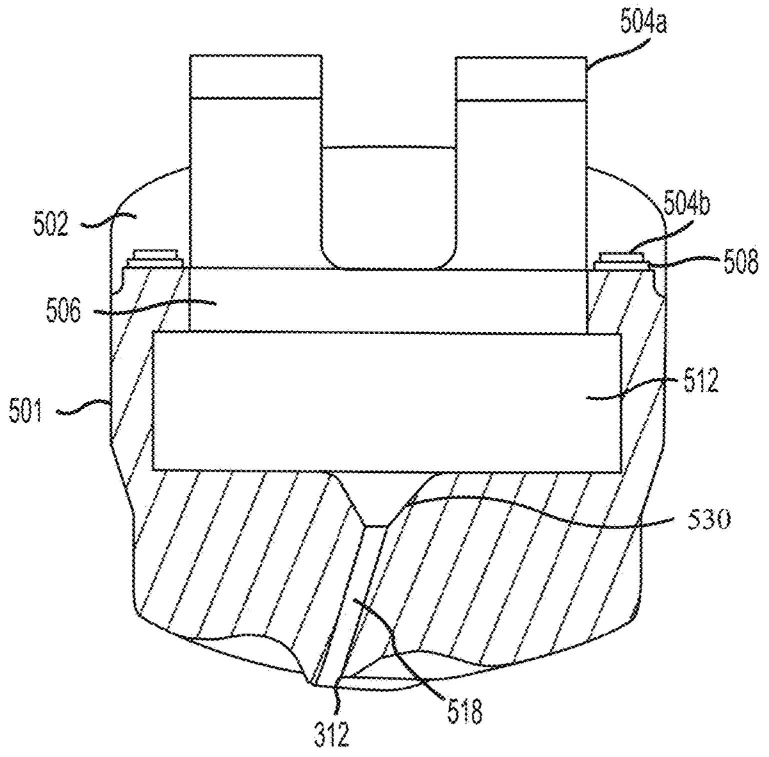

FIGS. 18B and 18C are simplified cross-sectional views of the air directing device 500. FIG. 18B is taken through line A-A' and FIG. 18C is taken through line B-B'. As shown in FIG. 18B, the housing 301 can surround air reservoir 512 and include sidewalls 514 extending between the upper surface 502 and a lower surface 516 (e.g., a bottom surface or a second surface). In various embodiments, the air reservoir 512 can receive air through the upper aperture 506 (e.g., from the air outlets 308).

The air reservoir 512 can receive air from the air outlets 308 and direct the air to one or more lower apertures 518 (e.g., the air reservoir 512 can be or include a means for directing the received air to the blade nozzles 312). The lower apertures 518 can be an outlet for the air reservoir 512. An interior edge of the lower apertures 518 can include a curved edge 530 (e.g., a portion that slopes toward the lower apertures 518). The curved edge 530 can aid in direction air into the lower apertures 518. The exterior edge of the lower apertures 518 can include a sloped portion 522 that forms a protrusion (e.g., a wall or nozzle tips) that extends away from the lower surface 516. The exterior edge of the lower apertures 518 can have a shape that aids in the formation of the air curtain (as described further in reference to FIG. 23). In various embodiments, the lower apertures 518 can be or include the blade nozzles 312 (e.g., the exterior edge of the lower apertures 518 can be the blade nozzles 312).

Figure 18D:
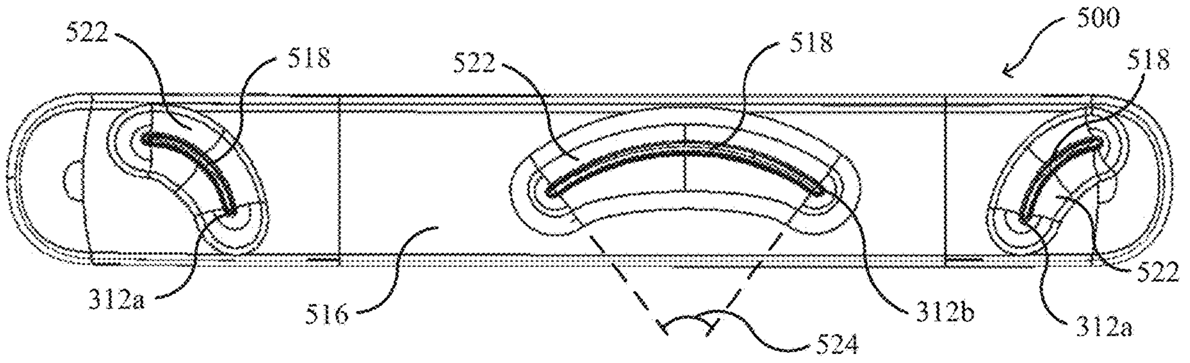

FIG. 18D is a simplified view of a side of the air directing device 500 including the blade nozzles 312. The blade nozzles 312 can receive air through the lower aperture 518 and output an air curtains 400 into the aircraft environment 300 (e.g., the blade nozzles 312 can be or include a means for outputting the air curtain 400). For example, the blade nozzles 312 can be positioned on the lower surface 516 to output the air curtains 400 between passenger seats positioned below the air directing device 500. In various embodiments, the number of blade nozzles 312 can be equal to the number of seats positioned beneath the air directing device 500 (e.g., if there are three passenger seats positioned beneath the air directing device 500 there can be three blade nozzles 312 on the lower surface 516). In further embodiments, the number of blade nozzles 312 can differ from the number of seats positioned beneath the air directing device 500 (e.g., there can be three seats positioned beneath the air directing device 500 which can have five blade nozzles 312 on the lower surface 516). In some embodiments, the air directing device 500 can have a number of blade nozzles 312 such that multiple air curtains 400 are positioned between passenger seats (e.g., adjacent passenger seats in the same row are separated by multiple air curtains 400, adjacent passenger seats in different rows are separated by multiple air curtains 400, and/or passenger seats are separated from a walkway by multiple air curtains 400).

The blade nozzles 312 can be sized and shaped (e.g., straight or curved) to output the air curtains 400 into the aircraft environment 300. For example, the blade nozzles 312 can be an arc shape with an arc angle in a range between 10 degrees and 120 degrees (e.g., 10 degrees, 30 degrees, 40 degrees, 40 degrees, 50 degrees, 70 degrees, 90 degrees, or 120 degrees). In various embodiments, the blade nozzles 312 can be a straight opening, have an S-shape, a C-shape, a U-shape, a J-shape, and/or have any suitable shape for outputting the air curtains 400.

Figure 19A:
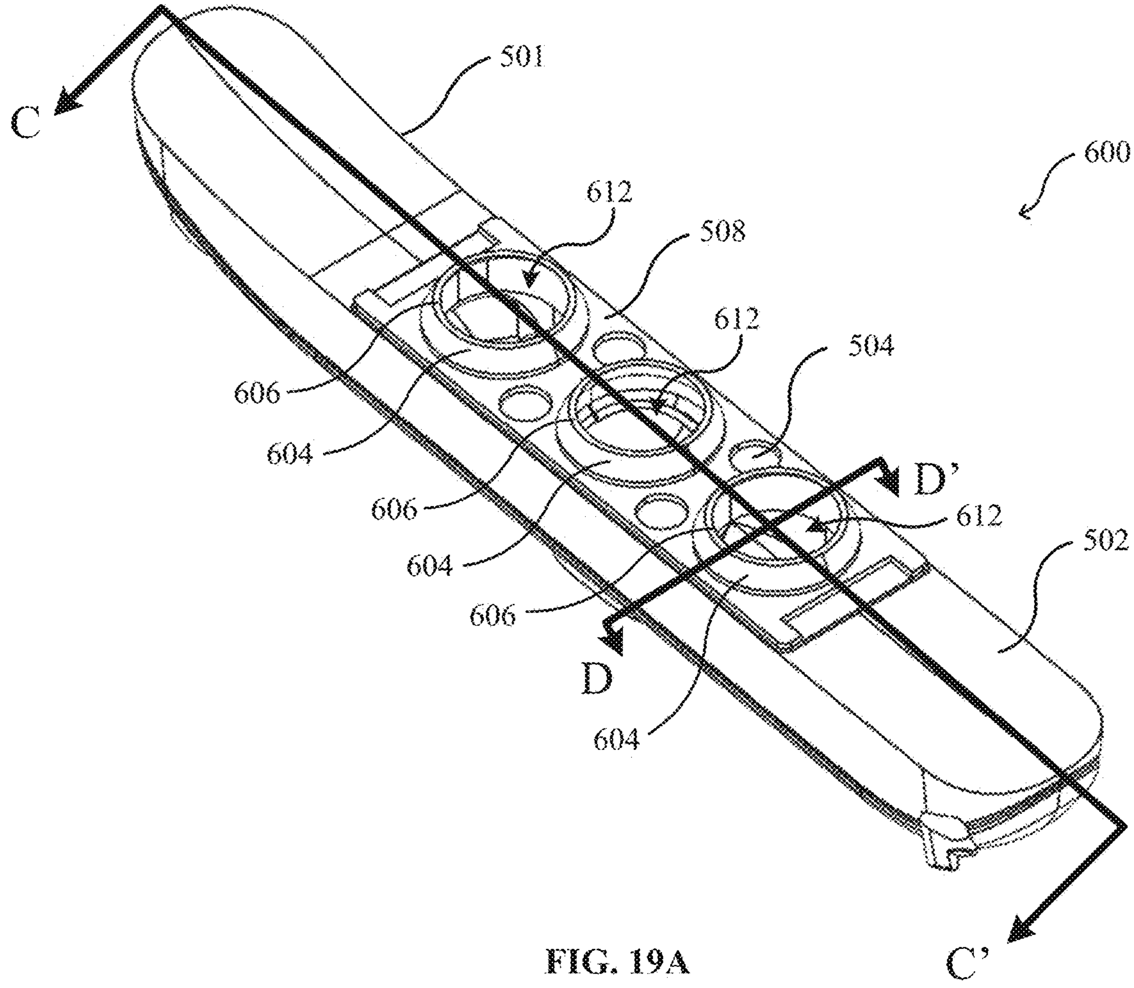
FIGS. 19A, 19B, 19C, and 19D show various views of another example air directing device that can be included in particular embodiments of the aircraft environment of FIG. 16A.

Turning to FIGS. 19A, 19B, 19C, and 19D various views of another example air directing device 600 are shown. The air directing device 600 can be or include a means for receiving air from a PSU 318, a means for outputting the air curtain 400, a means for directing the received air to the means for outputting the air curtain 400, and a means for engaging the air directing device 600 with the PSU system 306 (e.g., engaging with the PSU 318). FIG. 19A is a simplified perspective view of the air directing device 600. The air directing device 600 includes housing 301 with multiple upper apertures 606 through the upper surface 502. The upper apertures 606 can be or include the means for receiving air from the PSU 318. The seal 508 can be positioned on the upper surface 502 such that a portion of the seal 508 is positioned between the upper apertures 606. Multiple vent mechanical interfaces 504 (e.g., the means for engaging the air device with the PSU 318) can be positioned on the seal 508 for engagement with the PSU system 306 (e.g., with the PSUs 318). The upper apertures 606 can include a ridge 604 around the periphery of the upper apertures 606 that extends away from the upper surface 502. The ridge 604 can engage with a portion of the PSU 318. For example, the ridge 604 can engage with the air outlets 308. In various embodiments, a portion of the ridge 604 can be inserted into the air outlets 308.

Figure 19B:
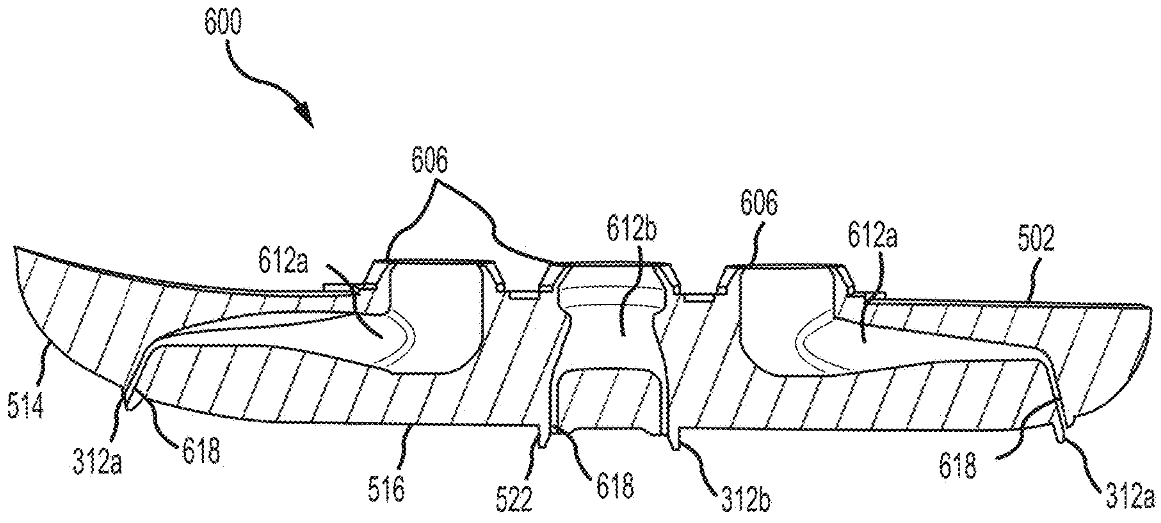
Figure 19C:
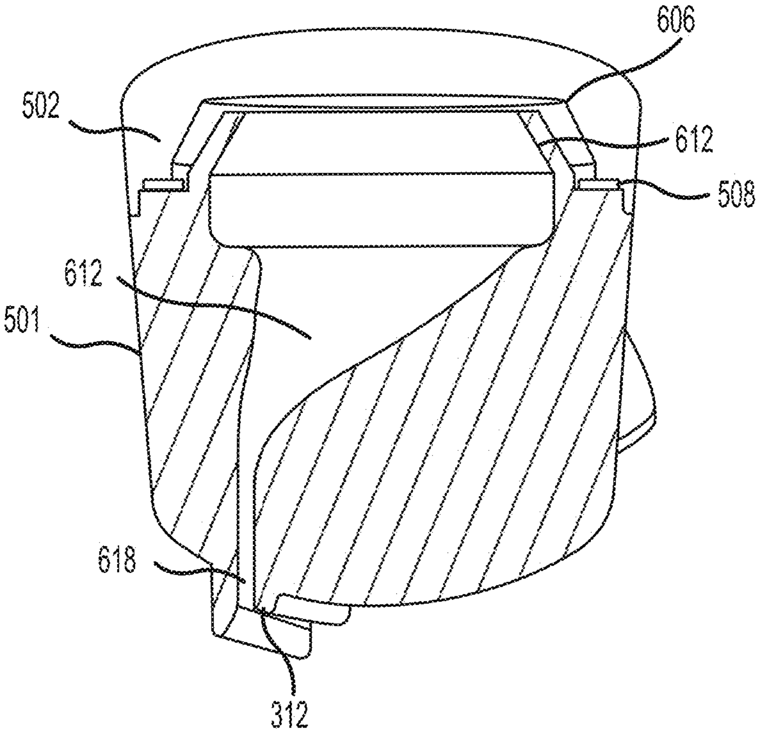

FIG. 19B is a simplified cross-sectional view of the air directing device 600. FIG. 19B is a cross-section taken through line C-C' and FIG. 19C is a cross-section taken through line D-D'. Multiple air reservoirs 612 (e.g., channels or volumes) can be positioned in housing 301. The air reservoirs 612 can be or include a means for directing the received air to the means for outputting the air curtain 400. In various embodiments, each of the upper apertures 606 can be coupled with a separate air reservoir 612 (e.g., each air reservoir 612 receives air through a different upper aperture 606). However, the upper apertures 606 may be coupled with a common air reservoir 612 (e.g., a single air reservoir 612 receives air through multiple upper apertures 606). The air reservoirs 612 can be sized and shaped to direct air from the upper apertures 606 to the lower apertures 618. For example, the outer air reservoirs 612*a* can direct air towards the outer blade nozzles 312*a* and the middle air reservoir 612*b* can direct air towards the middle blade nozzle 312*b*. In various embodiments, the air reservoirs 612 can be optimized to have the smallest air reservoirs 612 possible while still delivering balanced flow to the blade nozzles 312. For example, the air reservoirs 612 can be sized to deliver balanced flow to the blade nozzles 312 such that the air curtains 400 have the same or similar size and/or shape.

Figure 19D:
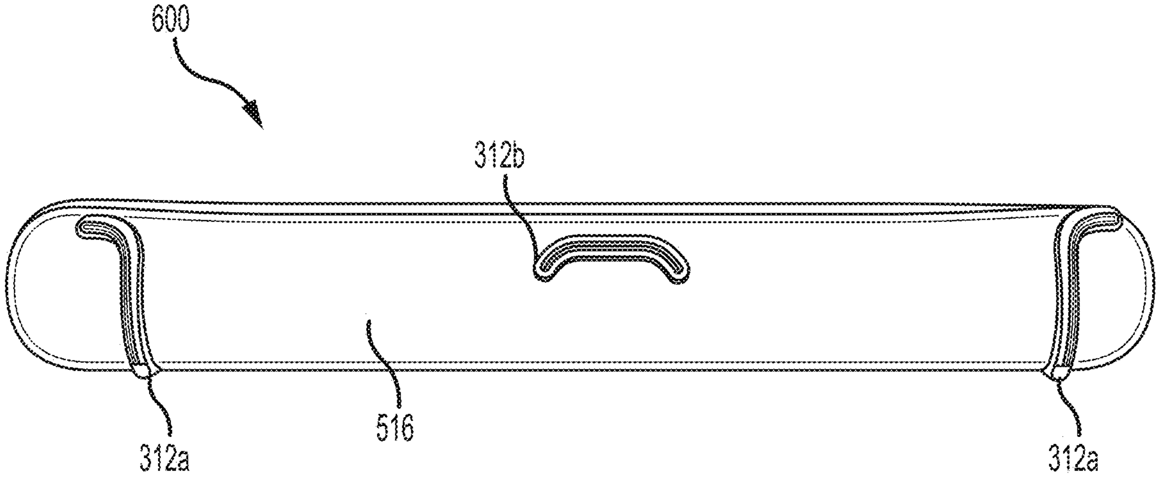

FIG. 19D is a simplified view of a side of the air directing device 600 including the blade nozzles 312 (e.g., the means for engaging the air directing device 600 with the PSU system 306). In various embodiments, the blade nozzles 312 can have different sizes and/or shapes, however, the blade nozzles 312 can have the same size and shape. For example, the outer blade nozzles 312*a* can have different sizes and shapes as the middle blade nozzle 312*b* may have a larger size than the outer blade nozzles 312*a*. The size of the blade nozzle 312 may correspond to the size of the air curtain 400 output by the blade nozzle 312. For example, a larger blade nozzle 312 may output a larger air curtain 400. In further embodiments, the blade nozzles 312 may be positionable by a passenger. For example, the blade nozzles 312 may be moveable and/or the size of the lower aperture 518 adjusted to adjust the size and/or the position of the air curtain 400.

Figure 20:
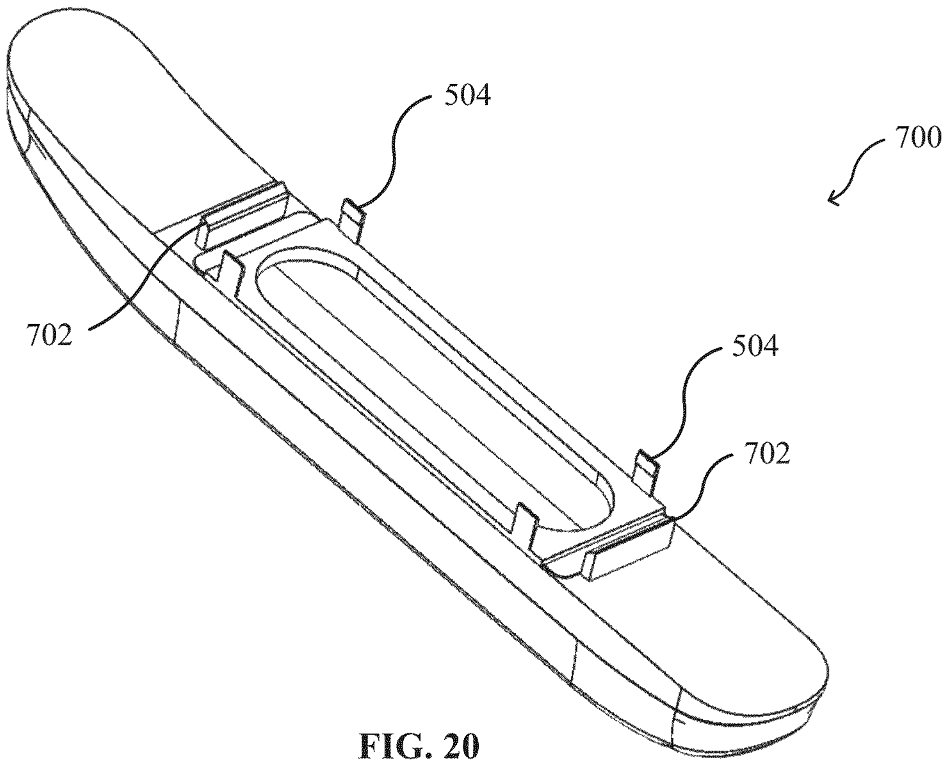
FIG. 20 shows an additional example air directing device that can be included in particular embodiments of the aircraft environment of FIG. 16A.

Turning to FIG. 20 an additional example air directing device 700 is shown. The air directing device 700 can be or include a means for receiving air from the PSU 318, a means for outputting the air curtain 400, a means for directing the received air to the means for outputting the air curtain 400, and a means for engaging the air directing device 700 with the PSU system 306 (e.g., engaging with the PSU 318). The air directing device 700 can include aligners 702 to aid in aligning the air directing device 700. For example, the aligners 702 can be positioned in gaps 310 to laterally align the air directing device 700. The aligners 702 and/or the vent mechanical interface 504 can be or include the means for engaging the air directing device 700 with the PSU system 306. The vent mechanical interface 504 can engage with the PSU system 306 to affix the air directing device 700 in place. The aligners 702 can be or include a protrusion with a chamfered edge to aid in engaging the aligners with the gaps 310.

Figure 21A:
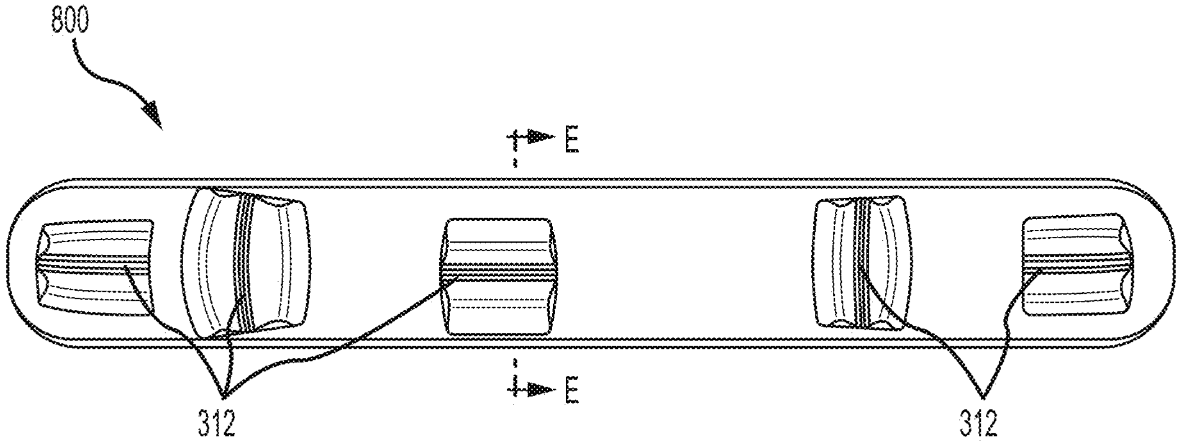
FIG. 21A shows another example air directing device that can be included in particular embodiments of the aircraft environment of FIG. 16A.
Figure 21B:
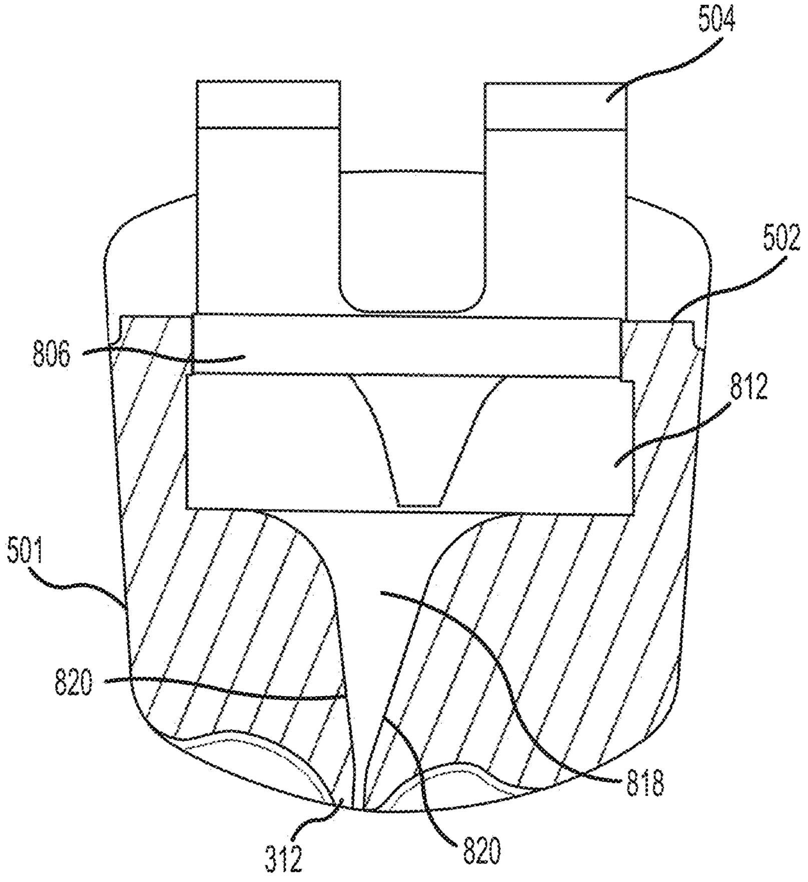
FIG. 21B shows a cross-section view of the air directing device of FIG. 21A.

FIGS. 21A and 21B show another example air directing device 800 that can be used in particular embodiments of the aircraft environment 300 of FIG. 16A. FIG. 21A shows an arrangement of the blade nozzles 312 on the air directing device 800. The blade nozzles 312 can be oriented in multiple directions on the air directing device 800. For example, the air directing device 800 can include five blade nozzles with three of the blade nozzles oriented along the same axis and the remaining two nozzles oriented along another axis. The different orientations of the blade nozzles 312 can produce air curtains 400 at different positions in the aircraft environment. For example, some of the blade nozzles 312 can produce air curtains 400 between passengers seated in the same row and some of the blade nozzles 312 can produce air curtains 400 between passengers seated in multiple rows and/or between passengers in a row and a portion of the aircraft. The blade nozzles 312 can include nozzles with a straight shape and/or nozzles with a curved shape.

FIG. 21B shows a cross-section view of the air directing device 800 taken through line E-E'. The air directing device 800 can include an air reservoir 812 that can receive air through upper aperture 806. The air reservoir 812 can direct air to lower aperture 818 and through blade nozzle 312. Blade nozzles 312 can produce air curtains 400. In various embodiments, lower aperture 818 can include sloped sidewalls 820. The distance between sidewalls 820 can decrease to narrow the lower aperture 818. For example, the sidewalls 820 can have a larger separation near the air reservoir 812 than near the blade nozzle 312.

Figure 22A:
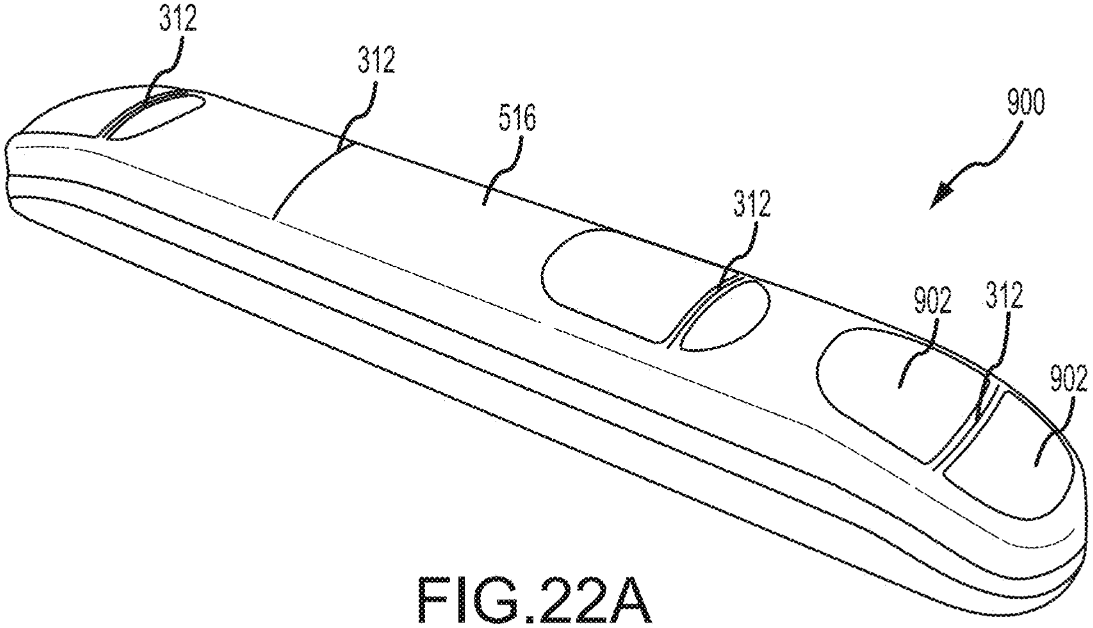
FIG. 22A shows another example air directing device that can be included in particular embodiments of the aircraft environment of FIG. 16A.
Figure 22B:
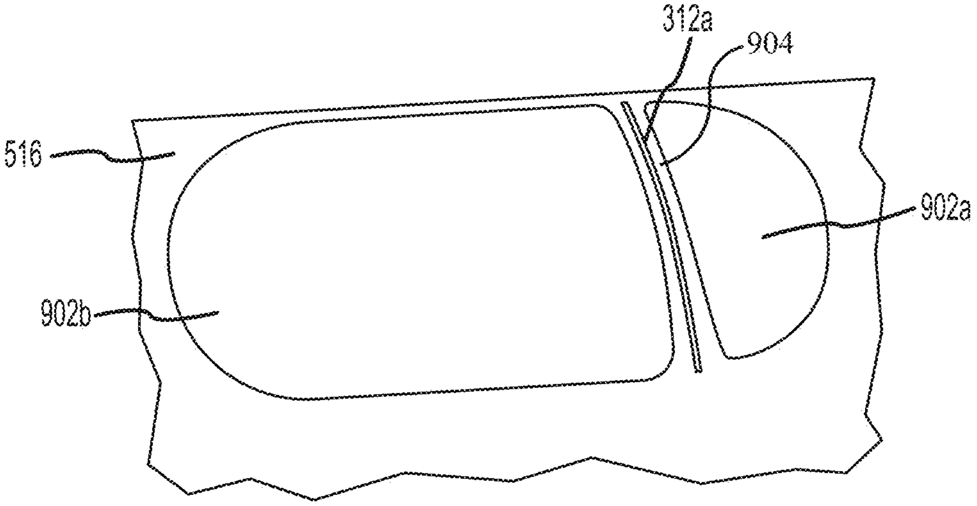
FIG. 22B shows a detailed portion of the air directing device of FIG. 22A.

FIGS. 22A and 22B show another example air directing device 900 that can be used in particular embodiments of the aircraft environment 300 of FIG. 16A. FIG. 22A shows an arrangement of the blade nozzle 312 can be at least partially surrounded by a recessed portion 902. In some embodiments, the blade nozzle 312 can be an opening in the surface 516 such that the blade nozzle 312 does not extend beyond the surface 516. FIG. 22B illustrates a detailed portion of the air directing device 900 including blade nozzle 312*a* and recessed portions 902*a* and 902*b* positioned on opposing sides. The blade nozzle 312*a* can extend from the recessed portion 902*a* and 902*b* such that an upper surface 904 of the blade nozzle 312*a* can be relatively in-line with surface 516 (e.g., such that the blade nozzle 312*a* does not extend beyond surface 516). For example, the recessed portions 902*a*, 902*b* can allow the blade nozzle 312*a* to have a defined shape (e.g., extend from a surface) while still being below or substantially in-line with surface 516.

Figure 23:
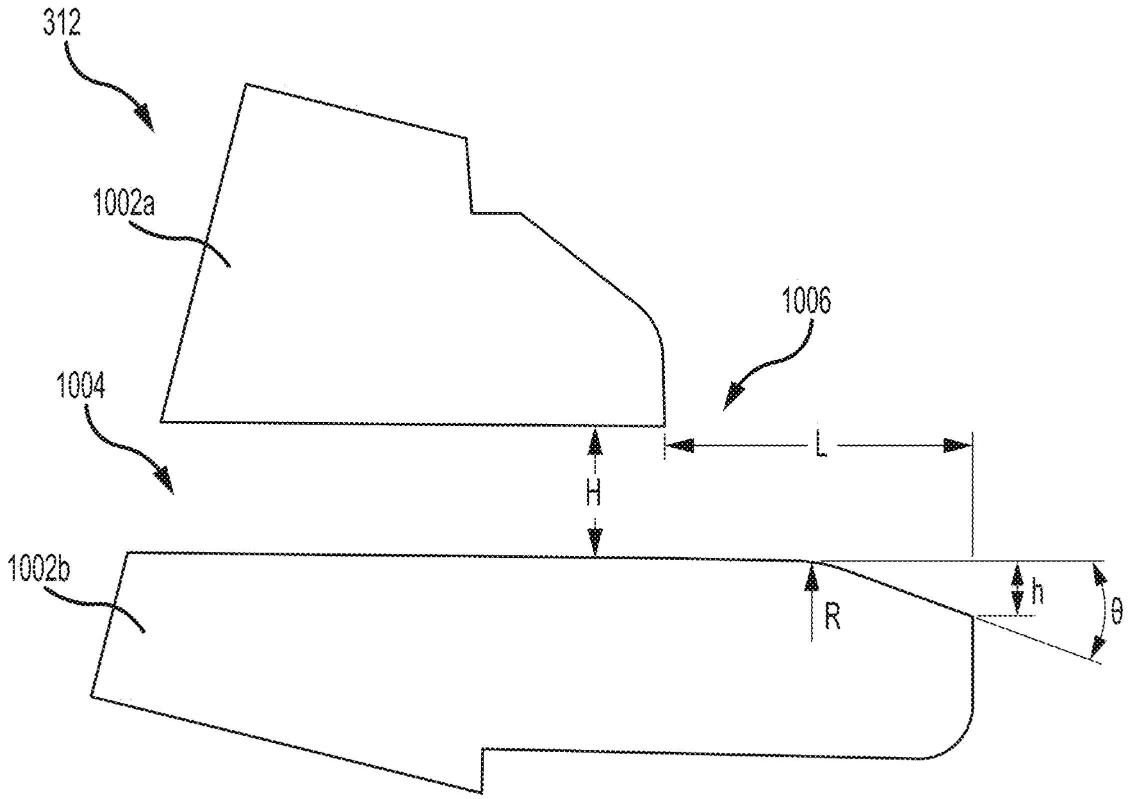
FIG. 23 shows a detailed portion of a blade nozzle for use with the example air directing device of FIG. 16A.

FIG. 23 shows a detailed portion of a blade nozzle 312 for use with the example air directing device of FIG. 16A. The blade nozzle 312 can include sidewalls 1002 surrounding an aperture 1004. The aperture 1004 can receive air from air outlets 308 and direct the air to produce an air curtain 400. The geometry of the external opening 1006 of the aperture 1004 can affect the air curtain 400 that is produced. For example, the geometry of the external opening 1006 can change the size, shape, and/or strength of the air curtain 400.

In various embodiments, the aperture 1004 can have a diameter of H, a difference between the lengths of the first sidewall 1002*a* and a second sidewall 1002*b* can be L, a change in height at the edge of the second sidewall 1002*b* can be h, the angle of the slope of the change in height can be θ, and the radius of the curve at the edge of the second sidewall 1002*b* can be R. Using table 1 below, a geometry can be calculated for the external opening 1006. In particular embodiments, the θ can be in a range between θ degrees and 45 degrees, the H can be 1.5 mm, and L, R, and h can depend on θ.

TABLE 1

| θ (degrees) | H (mm) | L (mm) | R (mm) | h (mm) |
|---|---|---|---|---|
| 0 | 1.5 | 0 | 0 | 0.0 |
| 9 | | 6 | 10 | 0.8 |
| 12 | | | | 1.1 |
| 15 | | | | 1.3 |
| 30 | | | | 1.9 |
| 45 | | | | 2.9 |

Figure 24:
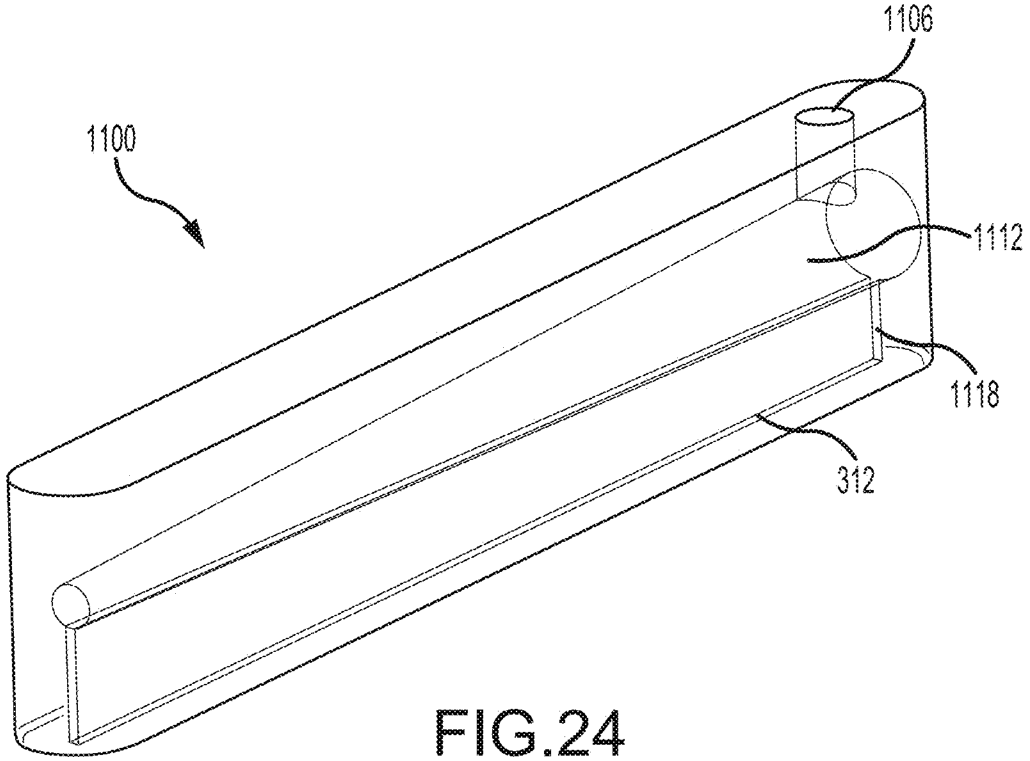
FIG. 24 shows another example air directing device that can be included in particular embodiments of the aircraft environment of FIG. 16A.

Turning to FIG. 24 another example air directing device 1100 that can be included in particular embodiments of the aircraft environment 300 of FIG. 16A. The air directing device 1100 can include an upper aperture 1106 that can direct air into air reservoir 1112. Air reservoir 1112 can receive the air and direct the air through lower aperture 1118 to blade nozzle 312. In various embodiments, the air reservoir 1112 can have a variable cross-section (e.g., a cross section that has a larger diameter at one end than the other end). The variable cross-section can aid in directing air through the lower aperture 1118. For example, the upper aperture 1106 can direct air into one end of the air reservoir 1112 having a larger diameter and the variable diameter of the air reservoir 1112 can aid in directing the air to the opposing end having a smaller diameter. The lower aperture 1118 can extend along the length of the air reservoir 1112. For example, the lower aperture 1118 can extend along some or all of the length of the air reservoir 1112 to receive air from the air reservoir 1112. The lower aperture 1118 can direct air to blade nozzle 312 which can produce an air curtain 400 having a length that is the same as or similar to the length of the air directing device 1100. The air curtain 400 can be used, for example, to separate different rows of passengers in the aircraft environment 300.

Figure 25:
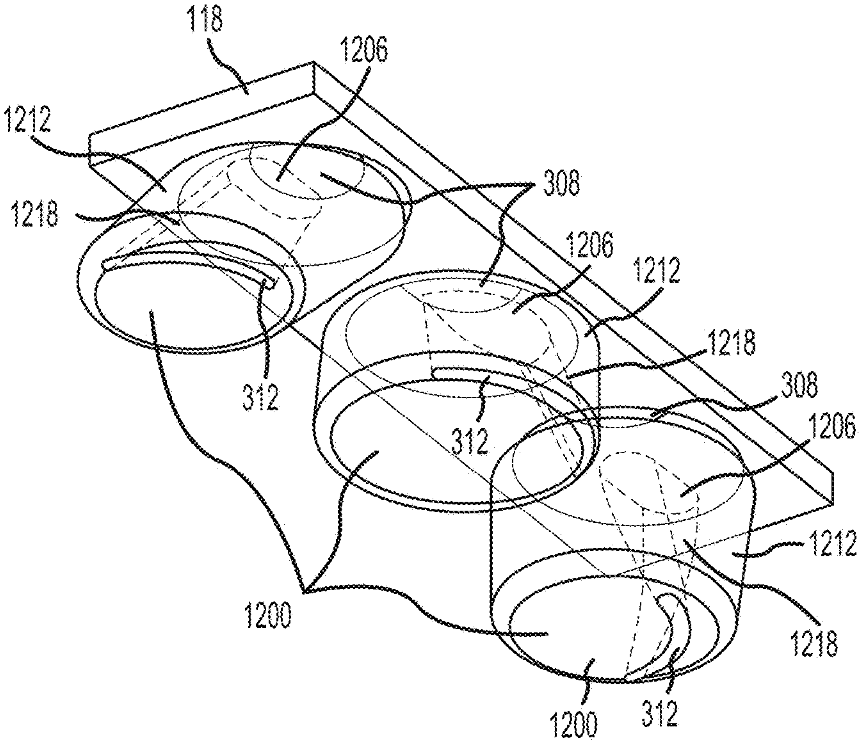
FIG. 25 shows another example air directing device that can be included in particular embodiments of the aircraft environment of FIG. 16A.
Figure 26:
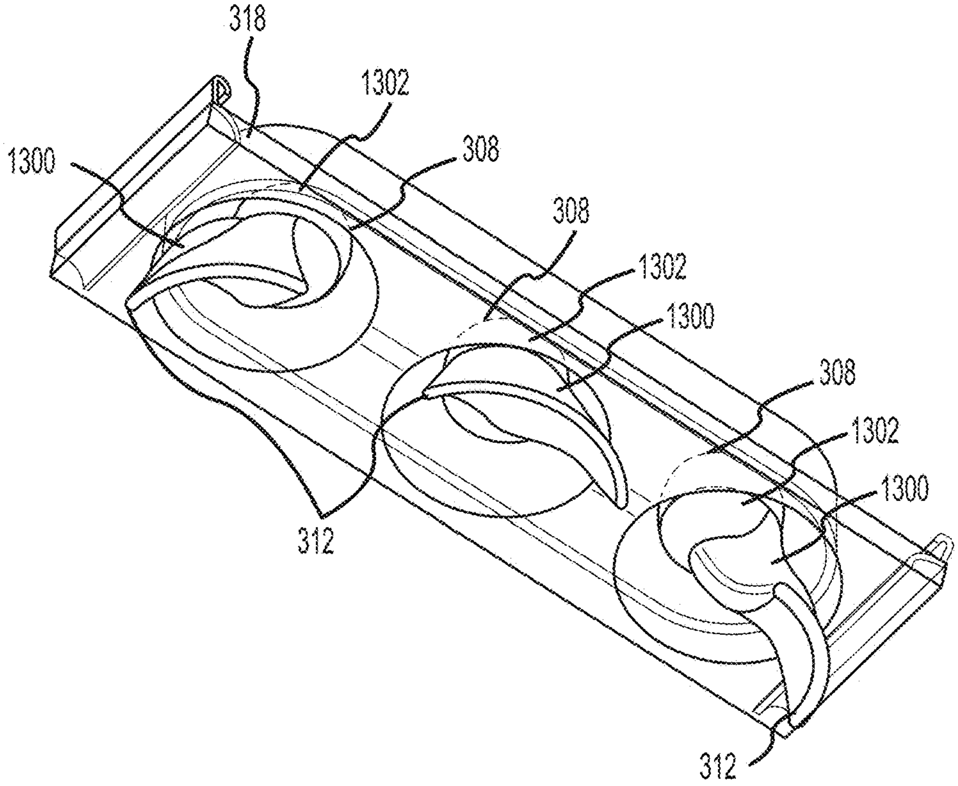
FIG. 26 shows another example air directing device that can be included in particular embodiments of the aircraft environment of FIG. 16A.
Figure 27:
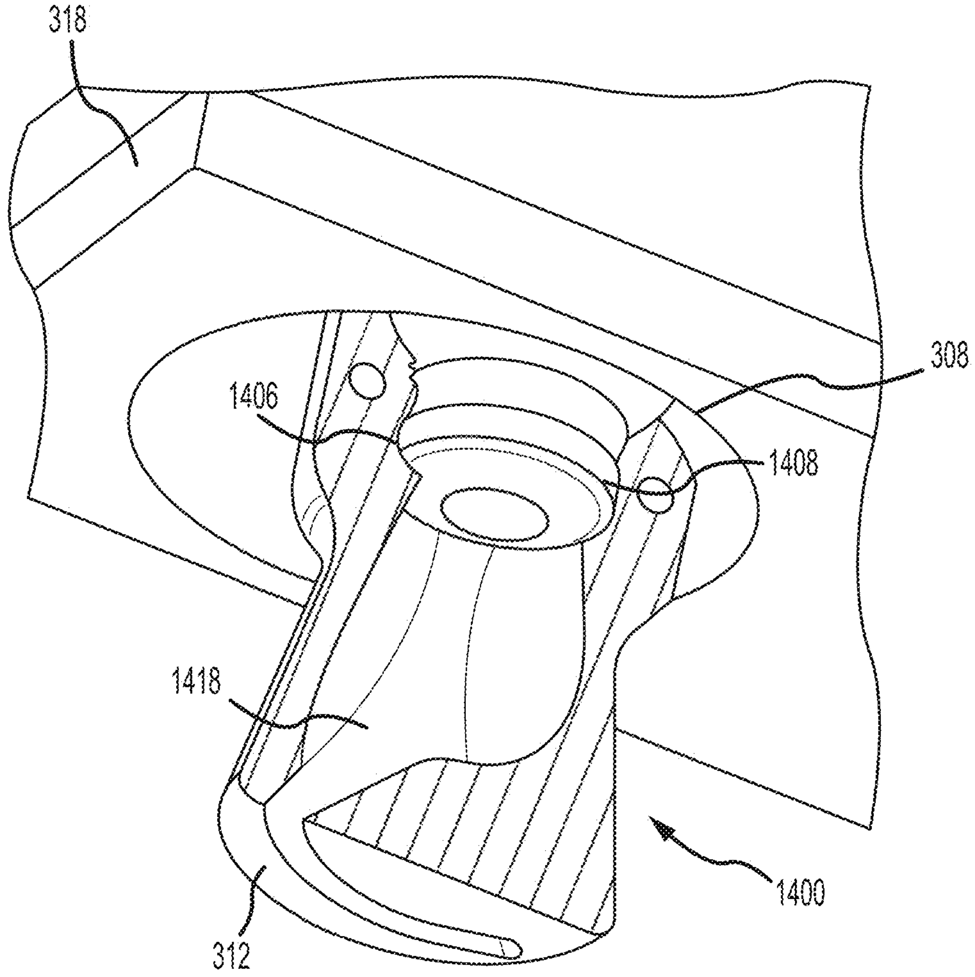
FIG. 27 shows another example air directing device that can be included in particular embodiments of the aircraft environment of FIG. 16A.

FIGS. 25 through 27 show additional example air directing devices 1200, 1300, 1400 that can be included in particular embodiments of the aircraft environment 300 of FIG. 16A. FIG. 25 includes air directing device 1200. The air directing device 1200 can include an upper aperture 1206 a lower aperture 1218 and a blade nozzle 312. The air directing device 1200 can attach to a single air outlet 308 (e.g., each air outlet 308 can be attached to an air directing device 1200), however, air directing device 1200 can attach to multiple air outlets 308. The air directing device 1200 can receive air from the air outlet 308 through the upper aperture 1206. The upper aperture 1206 can direct air to air reservoir 1212. Air reservoir 1212 can be or include a channel that directs the air to lower aperture 1218. The lower aperture can direct air to the blade nozzle 312 that can produce air curtain 400. The air directing device 1200 can be installed in the PSU 318. The air directing device 1200 can be installed to direct the air curtains 400 between passengers below the PSU 318. In some embodiments, the air directing device 1200 can be installed such that they can be adjusted after installation (e.g., rotated and/or pivoted).

FIG. 26 shows air directing device 1300. The air directing device 1300 can attach to an air outlet 308. For example, the air directing device 1300 can attach to the air outlet 308 using a ball joint 1302. The ball joint 1302 can allow the air directing device 1300 to be positioned after installation into the air outlet 308. For example, the air directing device 1300 can be pivoted and/or rotated relative to the air outlet 308. In some embodiments, the air directing device 1300 can include a locking feature that prevents the air directing device 1300 from being rotated and/or pivoted (e.g., the air directing device 1300 can be locked in place).

FIG. 27 shows an air directing device 1400. The air directing device 1400 can be attached to a nozzle 1408 of the air outlet 308. The air directing device 1400 can include an upper aperture 1406. The upper aperture 1406 can include an attachment mechanism that can attach the air directing device 1400 with the nozzle 1408. The upper aperture 1406 can additionally and/or alternatively include a locking mechanism that locks the air directing device 1400 in place relative to the air outlet 308. For example, the locking mechanism can prevent the air directing device 1400 from being rotated and/or pivoted. The air can flow through the air directing device 1400 through air channel 1410 and out blade nozzle 312.

In various embodiments, the air directing device 1400 can include an airflow control device. The airflow control device can be used to adjust the air flowing through the air directing device 1400. For example, the airflow control device can be or include a louver. The louver can adjust the airflow through the air directing device 1400 and change the intensity of the blade nozzle 312. In various embodiments, the airflow control device can be adjusted by a passenger (e.g., passenger 402).

Figure 28:
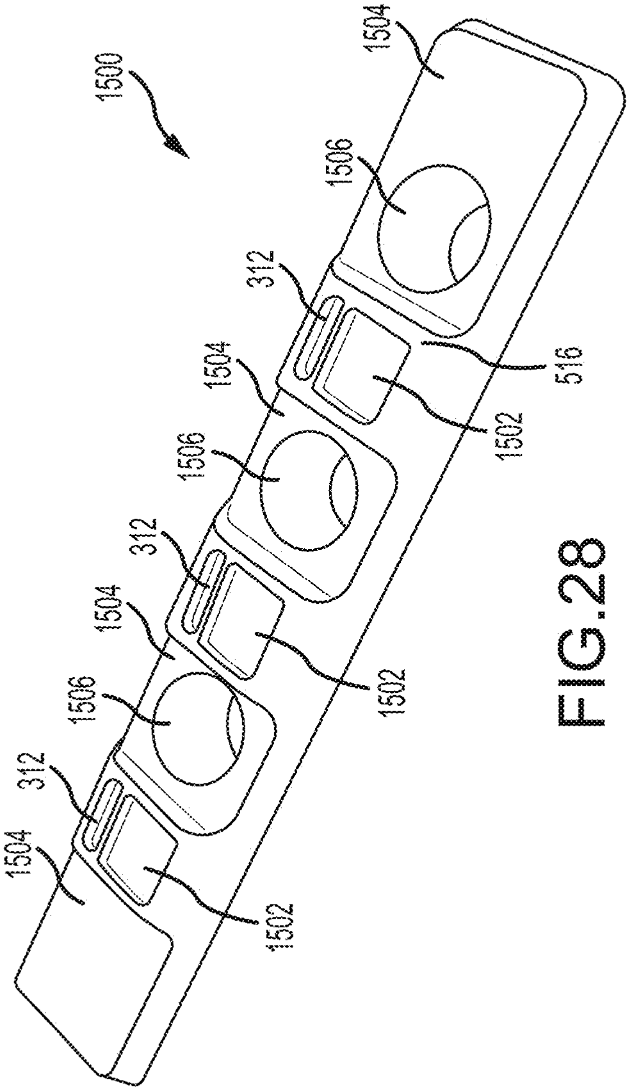
FIG. 28 shows another example air directing device that can be included in particular embodiments of the aircraft environment of FIG. 16A.

FIG. 28 illustrates another example air directing device 1500 that can be used in particular embodiments of the aircraft environment 300 of FIG. 16A. The air directing device 1500 can include blade nozzles 312 and openings 1506. Recessed portions 1502 can be positioned around the blade nozzles 312. For example, the recessed portions 1502 can allow the blade nozzles 312 to have a defined shape (e.g., extend from a surface) while still being below or substantially in-line with surface 516. Portions of the air directing device 1500 can be recessed (e.g., portions 1504) such that they are below surface 516. In various embodiments, the recessed portions 1502 and 1504 can be recessed to be substantially in-line with one another. One or more openings 1506 can be positioned along the air directing device 1500. The openings 1506 can be positioned along the length based on the position of components of the PSU system 306. For example, the openings 1506 can be positioned such that when the air directing device is mounted in position the openings 1506 are aligned with air outlets 308 and/or lights 314.

Figure 29:
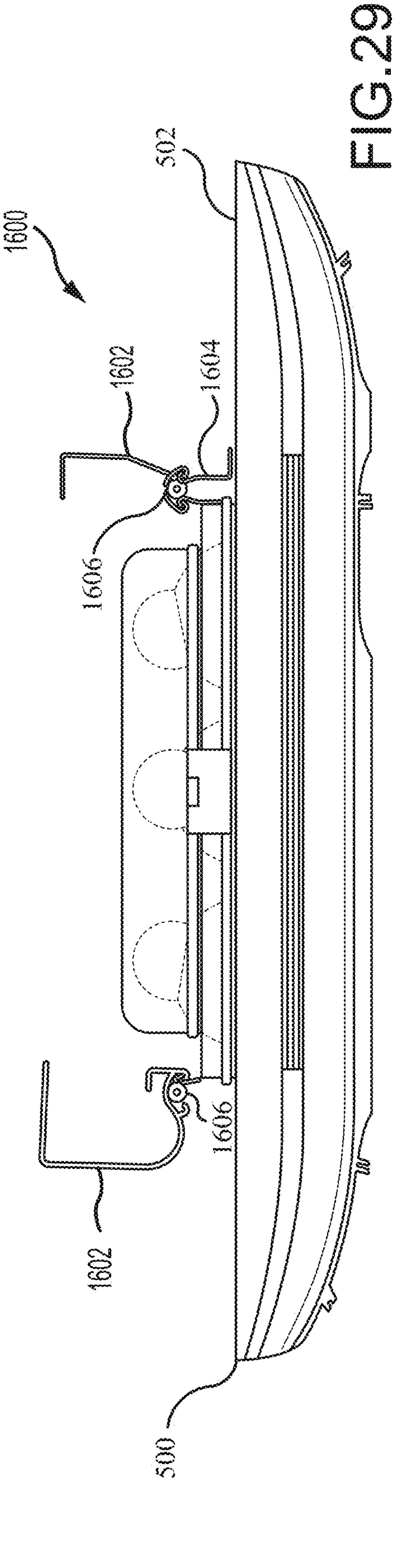
FIG. 29 shows an additional example air directing device that can be included in particular embodiments of the aircraft environment of FIG. 16A.

FIG. 29 illustrates a vent mechanical interface 1600 connected to air directing device 500. However, the vent mechanical interface 1600 can be connected to any of the air directing devices described herein. The vent mechanical interface 1600 can include an upper portion 1602 and a lower portion 1604. The upper portion 1602 can include a means for engaging the air device 500 with the PSUs 318. For example, the upper portion 1602 can be curved and/or can include a clip for engaging with the PSUs 318. In various embodiments, the upper portion 1602 can engage with gaps 310 (e.g., such as railing in the overhead area above the PSU system 306). In some embodiments, the vent mechanical interface 504 can be or include an attachment mechanism that can engage with a lower surface of the PSU system 306 (e.g., the PSUs 318). The vent mechanical interface 1600 can have a thickness that allows for a portion to extend through the gaps 310. For example, the vent mechanical interface 1600 can have a thickness that can be inserted into the gaps 310.

In various embodiments, the vent mechanical interface 1600 can include a portion that allows for movement of the vent mechanical interface 1600 relative to the air directing device 500. For example, the vent mechanical interface 1600 can include a rotation point 1606 that allows the upper portion 1602 to rotate relative to the air directing device 500. The upper portion 1602 can rotate to be inserted and/or engage with the gaps 310. The lower portion 1604 can engage with the upper surface 502 of the air directing device 500, for example, to fix the vent mechanical interface 1600 in an engagement position. For example, the lower portion 1604 can be engaged with the upper surface 502 and prevent the upper portion 1602 from rotating about rotation point 1606.

Figure 30:
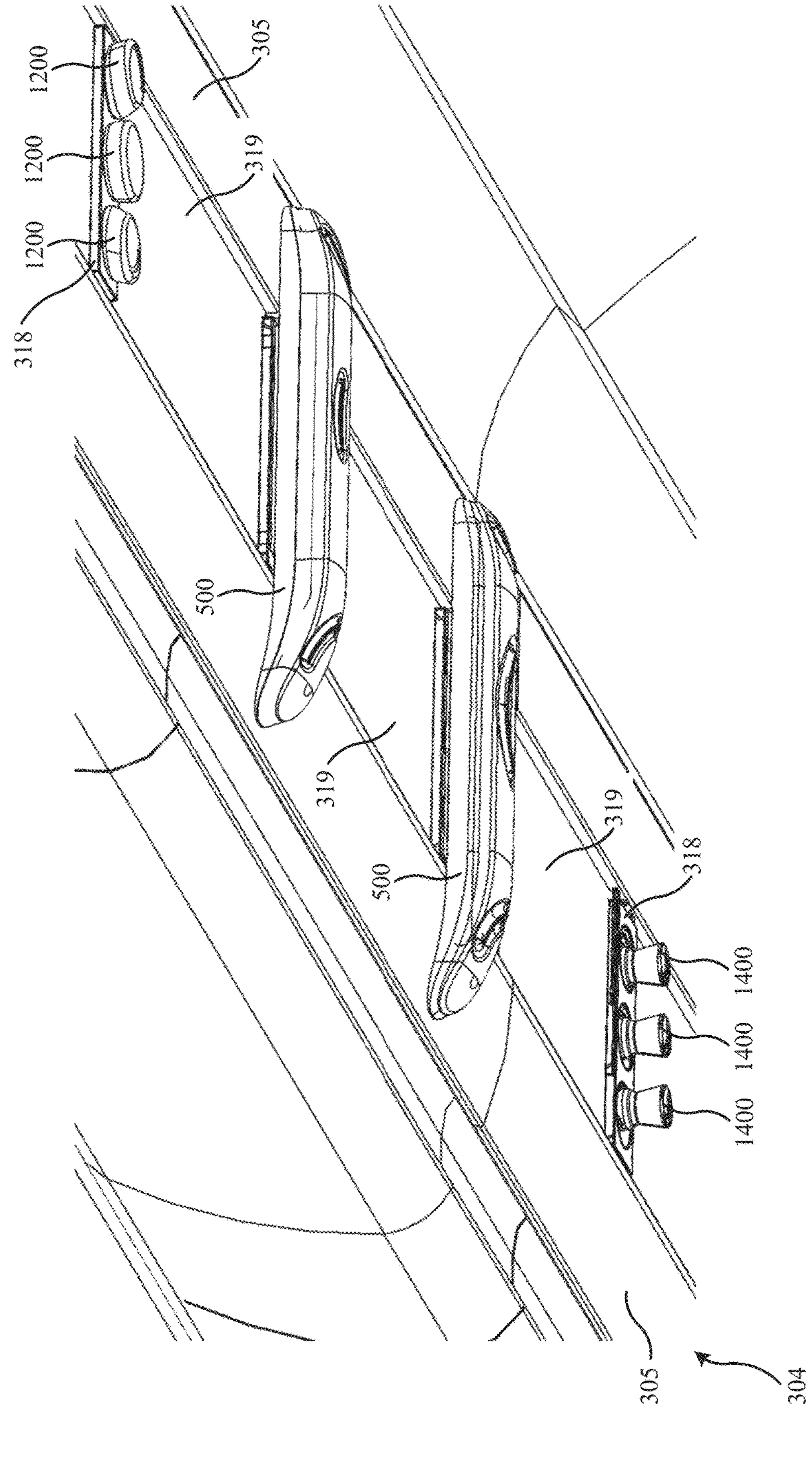
FIG. 30 shows a portion of the aircraft environment, including various example air directing devices that can be included in particular embodiments of the aircraft environment of FIG. 16A.

FIG. 30 shows a portion of the aircraft environment 300, including various example air directing devices 302 that can be included in particular embodiments of the aircraft environment 300 of FIG. 16A. For example, FIG. 30 shows air directing devices 500, 1200, and 1400 installed in the aircraft environment 300. However, a single type of air directing device 302 may be installed in the aircraft environment 300. The air directing devices 500, 1200, and 1400 have been installed to receive air from air outlets 308. Air directing devices 500 have been installed to receive air from multiple air outlets 308 and air directing devices 1200 and 1400 have been installed to receive air from a single air outlet 308. The air directing devices 500, 1200, and 1400 can be installed in the aircraft environment with an upper surface of the air directing devices 500, 1200, and, 1400 contacts a PSU 318. However, the air directing devices 500, 1200, and 1400 may be installed in the aircraft environment 300 by removing a PSU 318 and contacting an upper surface of the air directing devices 500, 1200, and 1400 with a portion of the air distribution system (e.g., distributor 322).

Figure 31A:
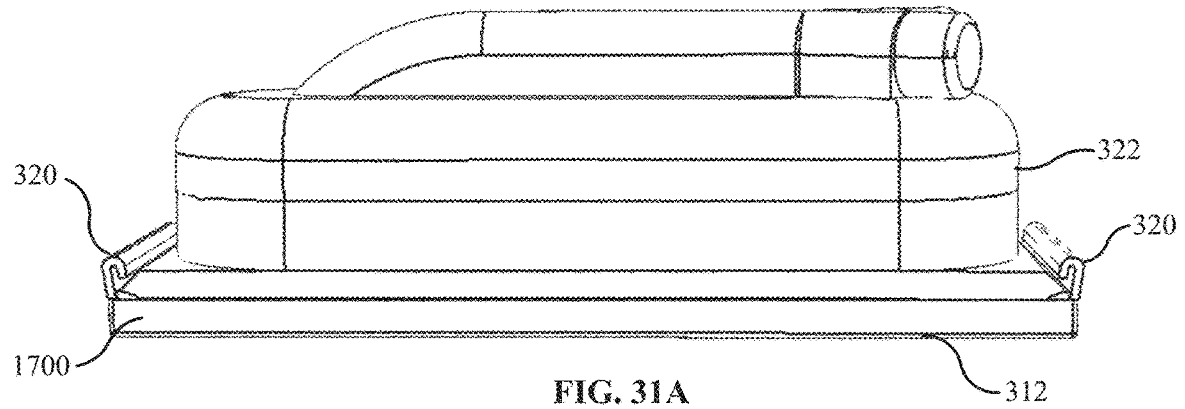
FIGS. 31A and 31B show another example air directing device that can be included in particular embodiments of the aircraft environment of FIG. 16A.
Figure 31B:
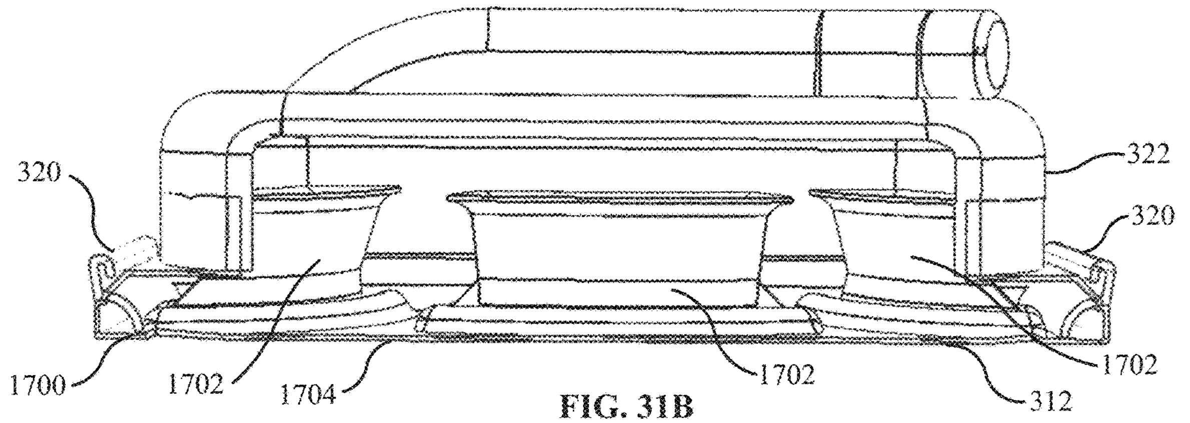

FIGS. 31A and 31B show another example air directing device 1700 that can be included in particular embodiments of the aircraft environment 300 of FIG. 16A. FIG. 31A is a side view of the air directing device 1700. The air directing device 1700 can be sized and/or shaped to fit in an opening in the PSU system 306 created by removing a PSU 318. For example, as shown in FIG. 16, a PSU 318 can be removed and the air directing device 1700 can be sized and/or shaped to fit in the opening left in the removed PSU 318.

The air directing device 1700 can be engaged with the distributor 322. For example, the vent mechanical interface 320 can engage with a portion of the distributor 322 and an upper portion of air directing device 1700 can engage with a lower portion of the distributor 322. In various embodiments, a portion of the air directing dive 1700 can be positioned in distributor 322. For example, FIG. 31B shows a cross-section of the air directing device 1700 and distributor 322 with air channels 1702 positioned within the distributor 322. The air channels 1702 extend upward from a bottom surface 1704 of the air directing device 1700 (e.g., from blade nozzles 312) to a position within the distributor 322. The air directing device 1700 can receive air from the distributor 322 (e.g., via the air channels 1702) and direct the air to the blade nozzles 312 to produce the air curtains 400. The air directing device 1700 can have a height that can allow the air directing device to be installed in the aircraft environment 300 with the bottom surface of the air directing device 1700 generally aligned along a common plane with the bottom surface of the PSU system 306. For example, the air directing device 1700 can be installed such that the blade nozzles 312 are generally aligned along the same plane with the bottom surface of the PSU system 306.

Figure 32:
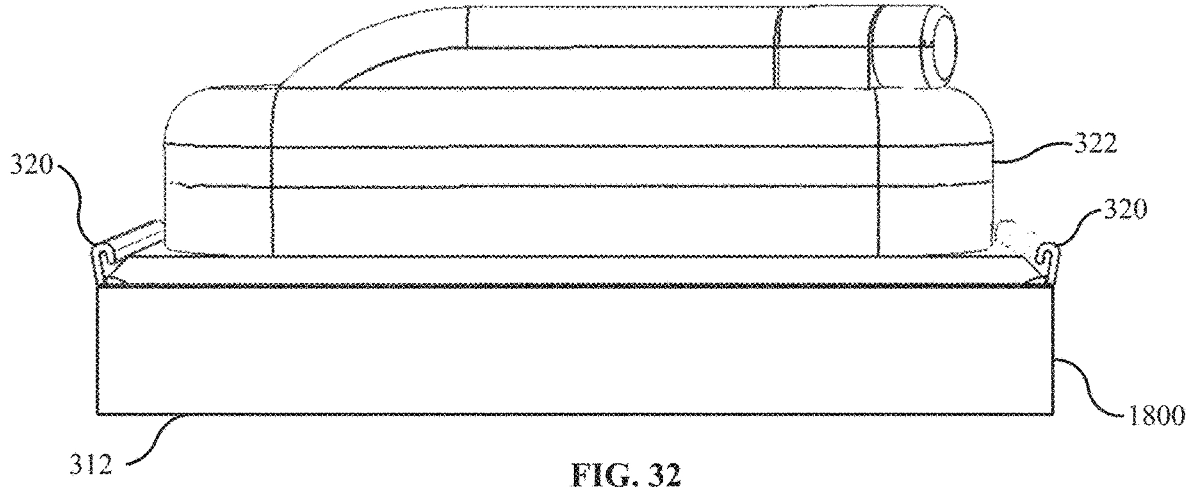
FIG. 32 shows another example air directing device that can be included in particular embodiments of the aircraft environment of FIG. 16A.

FIG. 32 shows another example air directing device 1800 that can be included in particular embodiments of the aircraft environment 300 of FIG. 16A. Similar to the air directing device 1700, the air directing device 1800 can be sized and/or shaped to fit in an opening left by removing a PSU 318 from the PSU system 306. The air directing device 1800 can be engaged with the distributor 322 such that the distributor does not receive a portion of the air directing device 1800. The air directing device 1800 can be installed in the aircraft environment 300 such that the bottom surface of the air directing device 1800 extends beyond the bottom surface of the PSU system 306 (e.g., blank panels 319). For example, the blade nozzles 312 can be positioned beneath the bottom surface of the PSU system 306 (e.g., beneath the bottom surface of the blank panels 319).

Figure 33A:
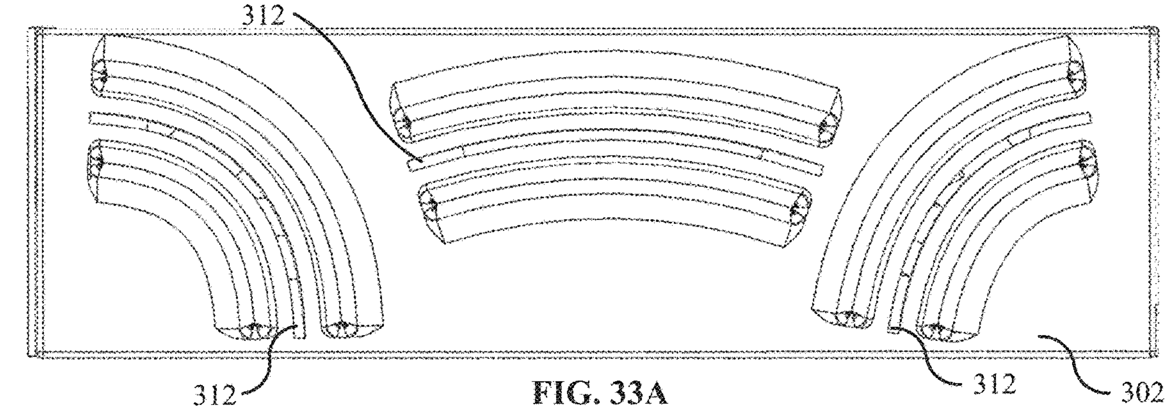
FIGS. 33A and 33B show example blade nozzles that can be included in particular embodiments of the air directing device of FIG. 16A.
Figure 33B:
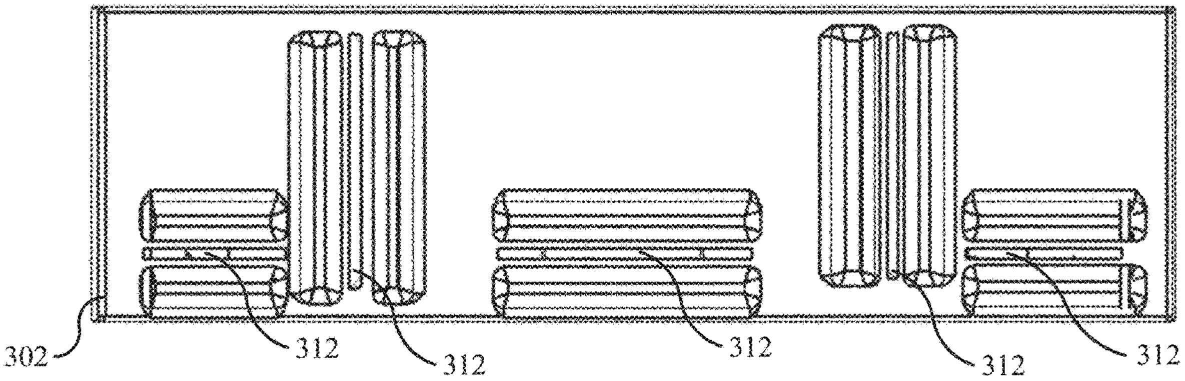

FIGS. 33A and 33B show example blade nozzles 312 that can be included in particular embodiments of the air directing device 302 of FIG. 16A. For example, the arrangement of blade nozzles 312 can be used with air directing devices 1700 and/or 1800. The blade nozzles 312 can be arranged to produce air curtains 400 at various positions in the aircraft environment 300. For example, the blade nozzles 312 can be arranged to produce air curtains 400 between passengers in the same row and/or between passengers in different rows. The blade nozzles 312 can include various designs, for example, to produce air curtains 400 having different sizes and shapes. For example, the blade nozzles 312 can have a curved shaped or a straight shape. In some embodiments, blade nozzles 312 having different shapes can be used with the same air directing device 302.

Figure 34:
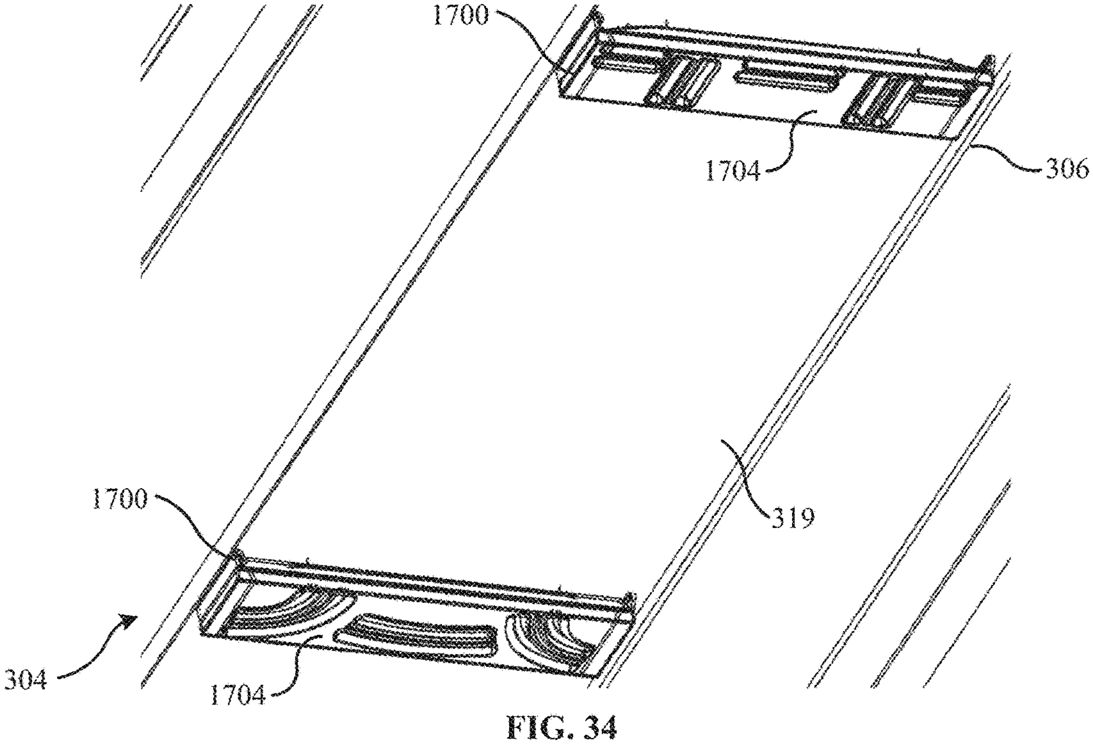
FIG. 34 shows a portion of the aircraft environment, including various example air directing devices that can be included in particular embodiments of the aircraft environment of FIG. 16A.

FIG. 34 shows a portion of the aircraft environment 300, including various example air directing devices 1700 that can be included in particular embodiments of the aircraft environment 300 of FIG. 16A. The air directing device 1700 can be installed in the PSU system 306 after a PSU 318 has been removed. The bottom surface 1704 of the air directing device 1700 can be generally aligned with the bottom surface of the PSU system 306. For example, the bottom surface 1704 can be aligned with or slightly protrude beyond the bottom surface of the blank panels 319. However, the bottom surface 1704 can protrude beyond the bottom surface of the PSU system 306.

Figure 35B:
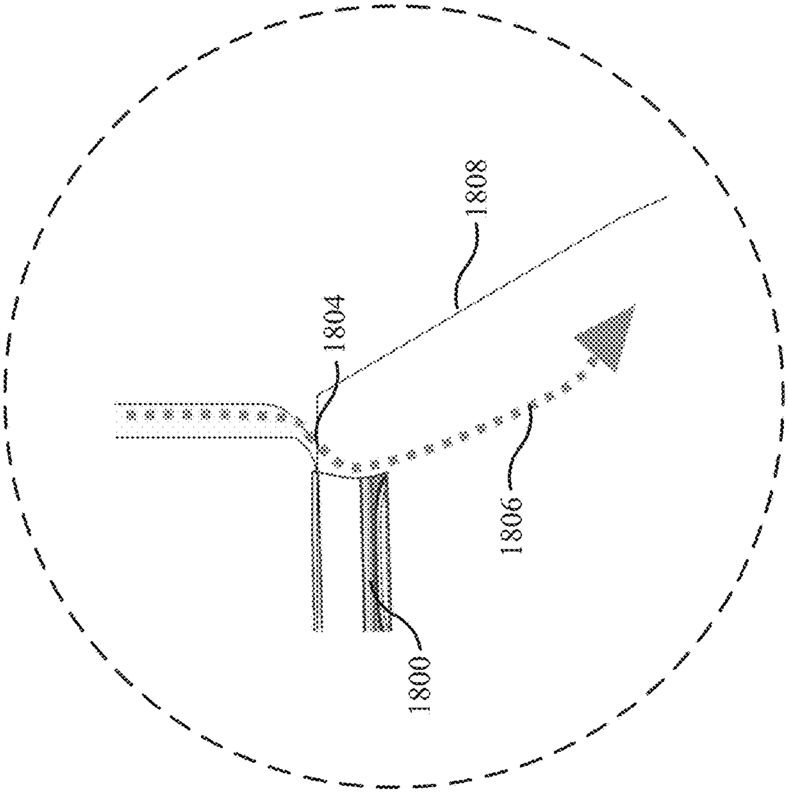
FIGS. 35A and 35B show another example air directing device that can be included in particular embodiments of the aircraft environment of FIG. 16A.
Figure 35A:
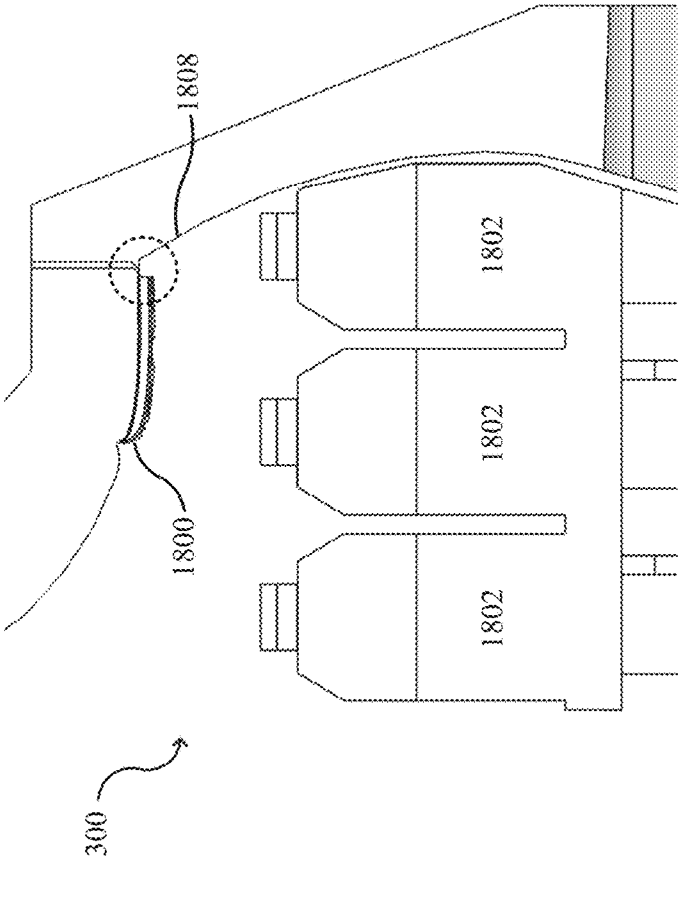

FIGS. 35A and 35B show an example air directing device 1800 that can be included in particular embodiments of the aircraft environment 300 of FIG. 16A. The air directing device 1800 can be positioned above seats 1802 (e.g., a row of seats). The air directing device 1800 can include one or more blade nozzles. The blade nozzles can direct air to form one or more blade curtains (e.g., between seats 1802). In various embodiments, the air distribution system can include an outlet 1804 that outputs air into the aircraft environment 300 outside of the air directing device 1800. The air directing device 1800 can be positioned in the aircraft environment 300 to deflect a portion of the air output by the outlet 1804. For example, the air directing device 1800 can be positioned such that an end of the air directing device 1800 deflects airflow 1806 from the outlet 1804 adjacent to a sidewall 1808 of the aircraft. In some embodiments, the airflow 1806 can be directed down the sidewall 1808 to create an air curtain between a seat 1802 and the sidewall 1808. In further embodiments, the end of the air directing device 1800 can be shaped to deflect the airflow 1806. For example, the air directing device 1800 can have a curved end that deflects the airflow 1806.

Figure 36A:
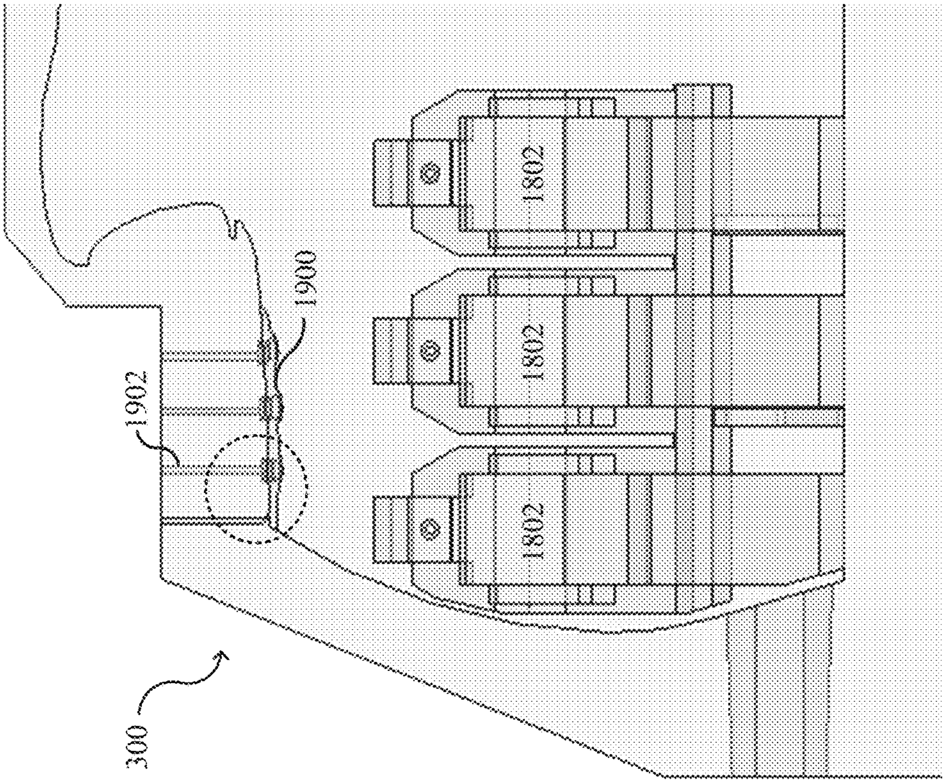
FIGS. 36A and 36B show another example air directing device that can be included in particular embodiments of the aircraft environment of FIG. 16A.
Figure 36B:
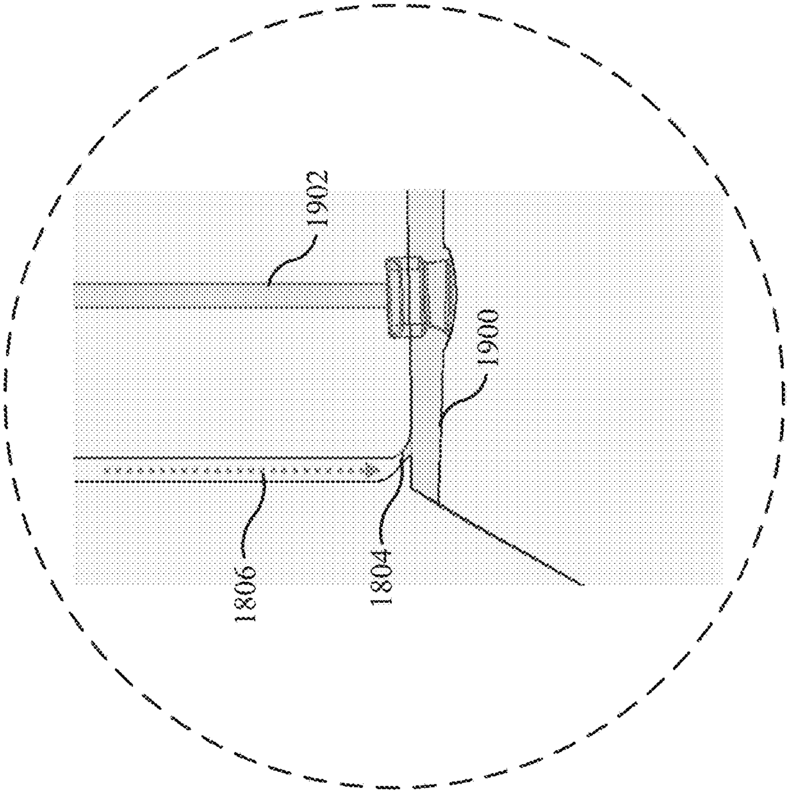

FIGS. 36A and 36B show an example air directing device 1900 that can be included in particular embodiments of the aircraft environment 300 of FIG. 16A. The air directing device 1900 can be positioned above seats 1802. The air directing device 1900 can receive air from the air distribution system (e.g., via channels 1902). The air directing device 1900 can receive the air and output the air to form air curtains.

In various embodiments, the air directing device 1900 can be positioned to obstruct the outlet 1804. For example, the air directing device 1900 can reduce the airflow 1806 from the outlet 1804 (e.g., the air directing device 1900 can block the airflow 1806). In some embodiments, a portion of the air directing device 1900 can protrude into the outlet 1804. For example, the air directing device 1900 can include a protrusion that is received by the outlet 1804. However, the air directing device 1900 can include a substantially flat surface that can obstruct the outlet 1804.

Figure 37B:
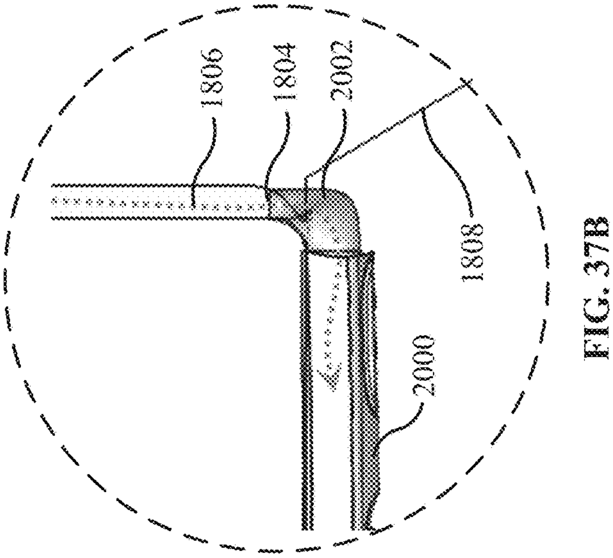
FIGS. 37A through 37C show another example air directing device that can be included in particular embodiments of the aircraft environment of FIG. 16A.
Figure 37C:
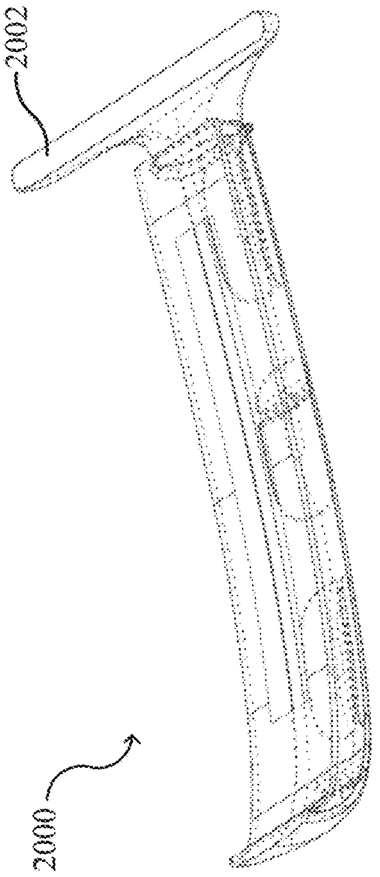
Figure 37A:
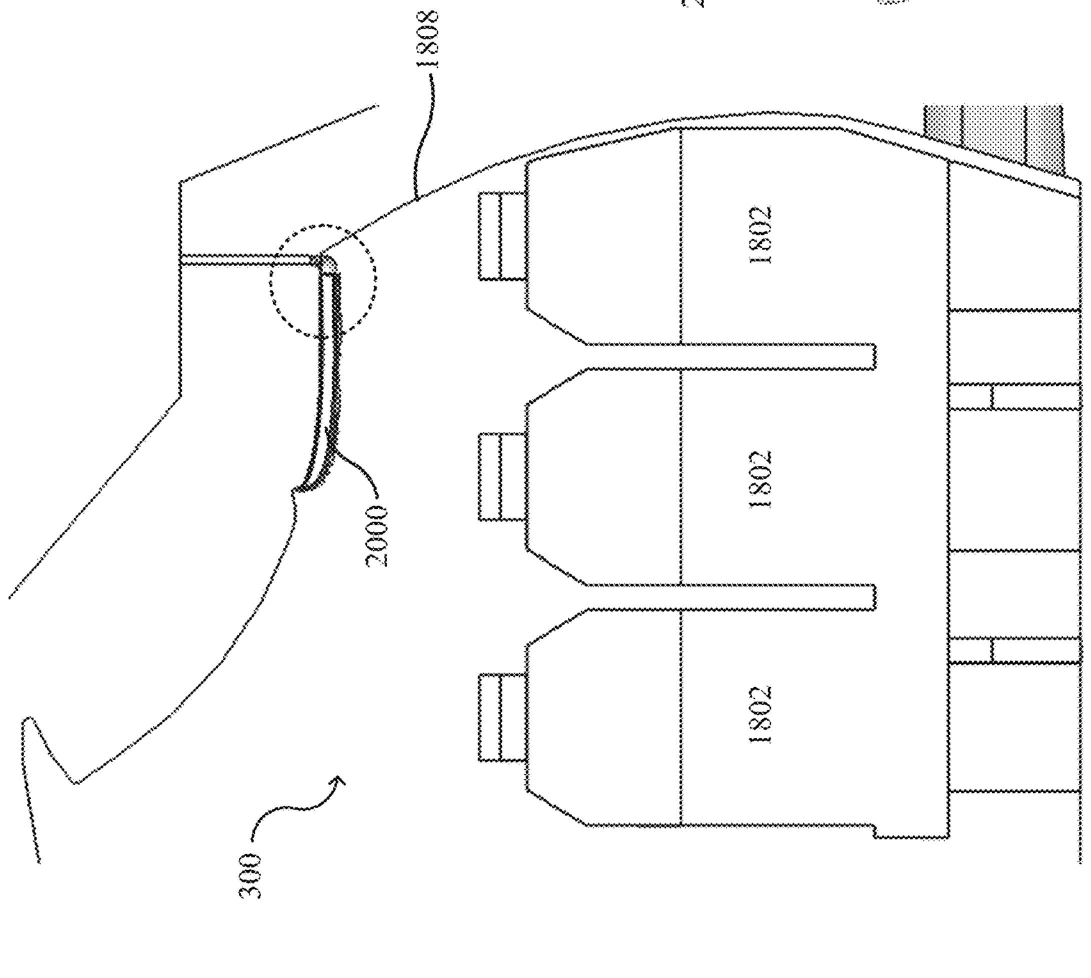

FIGS. 37A through 37C show another example air directing device 2000 that can be included in particular embodiments of the aircraft environment 300 of FIG. 16A. The air directing device 2000 can be positioned above seats 1802. The air directing device 2000 can receive air (e.g., airflow 1806) from the air distribution system. The airflow 1806 can be received from the air distribution system via a connector 2002. The connector 2002 can change the direction of the airflow 1806, for example, to direct the airflow 1806 into the air directing device 2000. The connector 2002 can be part of the air directing device 2000, however, the connector 2002 may be a separable piece. The connector 2002 can be shaped to engage with outlet 1804. For example, connector 2002 can be elongated to receive the airflow 1806 from the outlet 1804.

In various embodiments, the air distribution system can include gaspers positioned above the seats 1802 and an outlet 1804 positioned adjacent to the sidewall 1808. The air directing device 2000 can include multiple intakes which can receive airflow from the air distribution system. For example, the air directing device 2000 can include an intake from the gaspers (e.g., a vent) and from the outlet 1804. The intake from the gasper can be that same as or similar to the embodiments described herein (e.g., 506 or 612). For example, the intake can be an opening in the top surface of the air directing device 2000. The intake from the outlet 1804 can be or include an opening on the side of the air directing device 2000 which can receive airflow 1806 from the outlet 1804. For example, the intake from the outlet 1804 can be or include the connector 2002 which can direct airflow 1806 into the intake of the air directing device 2000. However, the intake may be similar to the intake from the gaspers (e.g., similar to 506 or 612).

In one or more embodiments, vent adapters are provided that transform air flows from passenger air conditioning ducts or vents into air curtains that reduce transmission of bacteria or viruses between passengers.

In one or more embodiments, vent adapters are provided that generate air curtains that achieve the above object and that also facilitate simple and non-invasive installation.

In one or more embodiments, vent adapters are provided that generate air curtains that achieve the above objects and that also are power efficient on a per-passenger basis.

In one or more embodiments, vent adapters are provided that generate air curtains that achieve the above objects and that also do not reduce features or access to such features in the environment in which the devices are installed.

In one or more embodiments, vent adapters are provided that generate air curtains that achieve the above objects and that also notify passengers of the boundaries of their respective protected spaces.

In one or more embodiments, vent adapters are provided that generate air curtains that achieve the above objects and that also transfer the control of the protective quality of cabin air flows from the passenger to the airline or aircraft crew, thereby providing peace of mind to passengers due to the knowledge that the system is fixed and that other passengers will not compromise the integrity of such air flows.

In one or more embodiments, vent adapters are provided that generate air curtains that achieve the above objects and that also shape or form the air curtain to blow mostly around the passenger rather than on the passenger, thereby alleviating the passenger from air flow disturbance or irritation throughout the duration of the flight.

In one or more embodiments, vent adapters are provided that generate air curtains that achieve the above objects and that also shape or form the air curtain such that fresh air is introduced into the passenger air space from external to the aircraft or from a filtered air flow in a manner that causes air currents in the aircraft to direct airborne contaminants away from passengers' faces, such as by providing controlled breaks or gaps in the flow or entrained differential flow to control the air currents in the aircraft.

In one or more embodiments, vent adapters are provided that generate air curtains that achieve the above objects and that also tailor the shape of the nozzle based on the expected distance from such nozzle of the nearest surface impacted by the generated air curtain.

In one or more embodiments, vent adapters are provided that achieve the above objects, as well as other objects and advantages, for example, in one or more embodiments, a vent adapter is provided for transforming an air flow of an air conditioning system of a passenger vehicle into an air curtain that separates two passengers from each other. The vent adapter can include an air-supply interface and a blade nozzle coupled to the air-supply interface. The air-supply interface can be configured to couple to the air conditioning system. The air-supply interface can be configured to receive an air flow from the air conditioning system. The blade nozzle can be configured to generate the air curtain from the received air flow. The blade nozzle can be configured to direct the air curtain between two adjacent seats in the vehicle.

In one or more embodiments, a vent mechanical interface is coupled to one or more of the air-supply interface or the blade nozzle. In some examples, the vent mechanical interface is configured to secure the air-supply interface in fluid communication with the vent. The vent mechanical interface can be configured to couple to a vent cover, valve, or valve receiver of the vent. In some examples, the vent mechanical interface defines a gasper mechanical interface. The gasper mechanical interface can be configured to be received by a gasper socket defined by or in an overhead passenger service unit. In some examples, the gasper mechanical interface is configured to be received by or receive a gasper vent in the overhead passenger service unit.

In one or more embodiments, the vent mechanical interface can be coupled to an overhead passenger service unit. The vent mechanical interface preferably includes one or more hooks or clamps configured to be received in respective slots on opposite sides of the passenger service unit or to receive opposite edges of the passenger service unit.

In one or more embodiments, the vent adapter can be integrated with an overhead passenger service unit.

In one or more embodiments, the vent can be or include a gasper duct of an overhead passenger service unit. In some examples, the vent can be or include a gasper vent of an overhead passenger service unit.

In one or more embodiments, the air-supply interface can receive multiple discrete air flows from separate vents or vent ducts. In some examples, the air curtain can be a single continuous air curtain generated from each of the discrete air flows.

In one or more embodiments, the air curtain can be at least partially curved. The air curtain can extend approximately 90° around a seat.

In one or more embodiments, a light can generate a projection that indicates a location of the air curtain on a solid surface onto which the air curtain lands.

In one or more embodiments, the vent adapter may be installed by removing a gasper vent from an overhead passenger service unit in an aircraft and coupling the air-supply interface to a gasper duct of the air conditioning system.

In one or more embodiments, the nozzle can be created from manufacturing techniques that allow creation of the required output air curtain of predetermined shape, form, mass flow rate, or velocity, such as three-dimensional printing.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "air curtain" as used herein refers to a blade of air emitted at a higher velocity than the ambient air in the environment in which the generating vent adapter is installed, with such blade of air being emitted at a sufficient velocity to have a higher velocity than such ambient air when each portion of the blade of air contacts its closest respective surface, such as a seat armrest, seat cushion, passenger arm, passenger lap, passenger leg, passenger foot, or vehicle floor. Air curtains are planar air flows (even if such planar shape is curved) and are distinguished herein from solid shapes such as conical shapes or pyramidal shapes. The term "passenger vent" refers to a vent that emits air from a vehicle air conditioning system directly onto a passenger or between adjacent passenger seats. The term "air conditioning system" refers to a system that provides temperature-controlled air to a passenger compartment of a vehicle, including but not limited to systems that use refrigerant to cool air (also including systems that do not use refrigerant or cool air). The term "air conditioning system" does not include after-market air pumps that supplement air conditioning systems in the vehicle. However, the vent adapters of the present disclosure may instead be driven by such supplemental air systems and may transform air flows of such supplemental systems into the disclosed air curtains. The term "blade nozzle" refers to a nozzle that generates one or more blades of air, with such blades being generally planar (even if curved) as opposed to solid shapes such as a solid conical frustum (a circular or conical blade forms a hollow cone or hollow conical frustum).

The term "adjacent seats" refers to seats in the same row that are immediately next to each other. Features such as air curtains that are described herein as being between adjacent seats may also be employed between a seat and another passenger area such as an aisle. The term “adjacent rows” refers to rows of seats that are immediately forward or rearward of each other with respect to the directions that the passengers are facing when normally sitting in such seats (they may be facing the same direction or toward each other). The term “approximately” refers to the described value or a range of values that include all values within 5, 10, 20, 30, 40, or 50 percent of the described value. The term “near” refers to a distance that is within 5, 10, 20, 30, 40, or 50 percent of a corresponding dimension of a described element or component. The term “coverage” refers to the number of degrees around a passenger in a preselected location such as a seat that an air curtain extends as measured in a horizontal cross-section of the air curtain.

Example embodiments of this disclosure are described herein, including the best mode known to the inventors for carrying out the disclosure. Variations of those example embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An air directing device for interfacing with an airplane interior air system, the air directing device comprising:

a housing defining an interior volume comprising an air reservoir, the housing having an upper surface including a first upper aperture, a lower surface including a first lower aperture, and sidewalls extending between the upper and lower surfaces, wherein the first upper aperture is proportioned to receive a portion of an aircraft overhead system comprising at least a passenger service unit (PSU) having gaspers that direct air to the air reservoir through the first upper aperture, and the air reservoir is fluidly coupled to the first upper aperture and the first lower aperture, the first lower aperture having an interior edge that includes a curved edge, and an exterior edge that includes a sloped portion that forms a protrusion extending away from the lower surface, wherein the exterior edge forms a blade nozzle having a fixed position, and wherein the air reservoir is configured to, upon receiving air by the air reservoir through the first upper aperture, direct the air to the blade nozzle through the first lower aperture to output a first air curtain between passengers seated below the PSU; and a vent mechanical interface projecting upward from the upper surface and configured to engage the upper surface with the PSU such that the first upper aperture receives a portion of the PSU.

2. The air directing device of claim 1, further comprising second and third lower apertures, each of the lower apertures comprising blade nozzles defined by an exterior edge of the respective lower aperture.

3. The air directing device of claim 2, wherein the second and third lower apertures each have an interior edge that includes a curved edge, and an exterior edge that includes a sloped portion that forms a protrusion extending away from the lower surface, the exterior edges forming the respective blade nozzles.

4. The air directing device of claim 2, wherein the air reservoir defines a volume coupled to first, second, and third air channels, each of the channels coupled to a lower aperture and the air reservoir is further configured to direct the air to the blade nozzles through the first, second, and third lower apertures to output first, second, and third air curtains.

5. The air directing device of claim 4, wherein the air directing device is positionable above a row of seats in the aircraft, the row of seats comprising first, second, and third seats, and wherein upon positioning the air directing device over the row of seats: the first air curtain is output between at least the first and second seats, the second air curtain is output between at least the second and third seats, and the third air curtain is output between at least the third seat and a sidewall of the aircraft.

6. The air directing device of claim 1, wherein the first upper aperture has dimensions equal to or larger than dimensions of the portion of the PSU such that the first upper aperture is proportioned to receive the portion of the PSU comprising one or more air outlets.

7. The air directing device of claim 1, further comprising second and third upper apertures, each of the upper apertures dimensioned to be equal to or larger than air outlets of the PSU such that the first, second, and third upper apertures are proportioned to receive a portion of one or more air outlets, wherein the air reservoir is coupled to and receives air through the first, second, and third upper apertures.

8. The air directing device of claim 7, further comprising second and third lower apertures, each of the lower apertures comprising a sloped portion extending from the lower surface around an exterior edge of the respective lower aperture, wherein the air reservoir comprises first, second, and third air channels coupling the respective upper and lower apertures.

9. An air directing device for interfacing with an airplane interior air system, the air directing device comprising:

a housing defining an interior volume comprising an air reservoir, the housing having an upper surface including a first upper aperture, a lower surface including a plurality of lower apertures, and sidewalls extending between the upper and lower surfaces, wherein the first upper aperture is proportioned to receive a portion of an aircraft overhead system comprising at least a passenger service unit (PSU) having gaspers that direct air to the air reservoir through the first upper aperture, and the air reservoir is fluidly coupled to the first upper aperture and the plurality of lower apertures, each of the plurality of lower apertures having an interior edge that includes a curved edge and an exterior edge that includes a sloped portion that forms a protrusion extending away from the lower surface, wherein each of the exterior edges forms a blade nozzle having a fixed position, and wherein the air reservoir is configured to, upon receiving air by the air reservoir through the first upper aperture, direct the air to the blade nozzle through the respective lower aperture to output a respective air curtain between passengers seated below the PSU; and a vent mechanical interface projecting upward from the upper surface and configured to engage the upper surface with the PSU such that the first upper aperture receives a portion of the PSU.

10. The air directing device of claim 9, wherein the plurality of lower apertures includes four lower apertures, each of the four lower apertures comprising one of the blade nozzles.

11. An air directing device for interfacing with an airplane interior air system, the air directing device comprising:

a housing defining an interior volume comprising an air reservoir, the housing having an upper surface including a first upper aperture, a lower surface including a first lower aperture and a second lower aperture, and sidewalls extending between the upper and lower surfaces, wherein the first upper aperture is proportioned to receive at least two gaspers of a passenger service unit (PSU) of an aircraft overhead system that direct air to the air reservoir through the first upper aperture, and the air reservoir is fluidly coupled to the first upper aperture and the first lower aperture, wherein the first and second lower apertures each have an interior edge that includes a curved edge, and an exterior edge that includes a sloped portion that forms a protrusion extending away from the lower surface, wherein the exterior edge of the first lower aperture forms a first blade nozzle having a fixed position and the exterior edge of the second lower aperture forms a second blade nozzle having a fixed position relative to the first blade nozzle, and wherein the air reservoir is configured to direct air to the first and second blade nozzles through the first and second lower apertures to output first and second air curtains between passengers seated below the PSU; and a vent mechanical interface projecting upward from the upper surface.

12. The air directing device of claim 11, wherein the first upper aperture has dimensions equal to or larger than dimensions of the portion of the PSU such that the first upper aperture is proportioned to receive the portion of the PSU comprising one or more air outlets.

13. The air directing device of claim 11, further comprising a third lower aperture having an interior edge that includes a curved edge, and an exterior edge that includes a sloped portion that forms a protrusion extending away from the lower surface, wherein the exterior edge of the third lower aperture forms a blade nozzle having a fixed position.

14. The air directing device of claim 13, further comprising a fourth lower aperture having an interior edge that includes a curved edge, and an exterior edge that includes a sloped portion that forms a protrusion extending away from the lower surface, wherein the exterior edge of the fourth lower aperture forms a blade nozzle having a fixed position.

* * * * *